United States Patent
Pais et al.

(10) Patent No.: US 12,370,544 B2
(45) Date of Patent: Jul. 29, 2025

(54) SAMPLE-TO-ANSWER MICROFLUIDIC SYSTEM AND METHOD INCLUDING VERTICAL MICROFLUIDIC DEVICE AND AUTOMATED ACTUATION MECHANISMS

(71) Applicant: Novel Microdevices, Inc., Baltimore, MD (US)

(72) Inventors: Andrea Maria Dominic Pais, Annapolis, MD (US); Rohan Joseph Alexander Pais, Annapolis, MD (US); Nicholas Watkins, Pasadena, MD (US); Hamdi Joda, Baltimore, MD (US)

(73) Assignee: NOVEL MICRODEVICES, INC., Baltimore, MD (US)

( * ) Notice: Subject to any disclaimer, the term of this patent is extended or adjusted under 35 U.S.C. 154(b) by 970 days.

(21) Appl. No.: 17/272,231

(22) PCT Filed: Aug. 27, 2019

(86) PCT No.: PCT/US2019/048418
§ 371 (c)(1),
(2) Date: Feb. 26, 2021

(87) PCT Pub. No.: WO2020/047000
PCT Pub. Date: Mar. 5, 2020

(65) Prior Publication Data
US 2021/0178392 A1 Jun. 17, 2021

Related U.S. Application Data

(60) Provisional application No. 62/723,474, filed on Aug. 27, 2018.

(51) Int. Cl.
*B01L 3/00* (2006.01)
*B01L 7/00* (2006.01)
*B01L 9/00* (2006.01)

(52) U.S. Cl.
CPC ... *B01L 3/502715* (2013.01); *B01L 3/502761* (2013.01); *B01L 7/52* (2013.01);
(Continued)

(58) Field of Classification Search
None
See application file for complete search history.

(56) References Cited

U.S. PATENT DOCUMENTS 9,803,238 B1  10/2017  Koh
2010/0317093 A1  12/2010  Turewicz
(Continued)

FOREIGN PATENT DOCUMENTS

CN  104748814  7/2015
CN  108136392  6/2018
(Continued)

OTHER PUBLICATIONS

Zhou et at., "Sample-to-Answer Molecular Diagnostic Platform for Rapid Point-of-Care Detection of Chlamydia", Novel MicroDevices, LLC., Presented at Point of Care Technology Research Network Science Symposium, Bethesda, MD, Jun. 9, 2016, p. 1 of 1, Left Column, Introduction Section, Step 2; p. 1 of 1, Middle Column, Materials and Methods section, Figure; p. 1 of 1, Middle Column, Materials and Methods section, Figure-caption; p. 1 of 1, Middle Column, Materials and Methods section, First Paragraph.
(Continued)

*Primary Examiner* — Lore R Jarrett
(74) *Attorney, Agent, or Firm* — FISHERBROYLES, LLP

(57) ABSTRACT

A sample-to-answer microfluidic system and method including vertical microfluidic device and automated actuation mechanisms, such as, but not limited to, automated mechanical and/or magnetic actuation, is disclosed. In some embodiments, the sample-to-answer microfluidic system
(Continued)

includes a vertically oriented microfluidic device and a rotating actuator in relation to the microfluidic device, and wherein the microfluidic device and the rotating actuator are operating in the XZ plane. Additionally, methods of using the sample-to-answer microfluidic system are provided.

20 Claims, 63 Drawing Sheets

(52) U.S. Cl.
CPC ........... *B01L 9/527* (2013.01); *B01L 2200/04* (2013.01); *B01L 2200/0684* (2013.01); *B01L 2300/022* (2013.01); *B01L 2300/069* (2013.01); *B01L 2300/0816* (2013.01); *B01L 2300/087* (2013.01); *B01L 2300/161* (2013.01); *B01L 2300/1827* (2013.01); *B01L 2400/0406* (2013.01); *B01L 2400/043* (2013.01); *B01L 2400/0478* (2013.01); *B01L 2400/0481* (2013.01); *B01L 2400/0688* (2013.01)

(56) References Cited

U.S. PATENT DOCUMENTS

| | | |
|---|---|---|
| 2014/0186935 A1 | 7/2014 | Yoo |
| 2015/0290639 A1 | 10/2015 | Evtodienko |
| 2018/0305135 A1* | 10/2018 | Kim ................. B65G 47/06 |
| 2019/0201898 A1* | 7/2019 | Cucchi ............. B01L 3/502753 |
| 2022/0042983 A1* | 2/2022 | Harder ............. G01N 33/54388 |

FOREIGN PATENT DOCUMENTS

| | | |
|---|---|---|
| EP | 3325159 | 5/2018 |
| JP | 2008061649 | 3/2008 |
| JP | 2014097080 | 5/2014 |
| JP | 2016524145 | 8/2016 |
| WO | 2010144747 A2 | 12/2010 |
| WO | 2014066704 | 5/2014 |
| WO | 2014138563 | 9/2014 |
| WO | 2018102783 | 6/2018 |

OTHER PUBLICATIONS

PCT/US2019/048418 International Search Report dated Nov. 15, 2019.

* cited by examiner

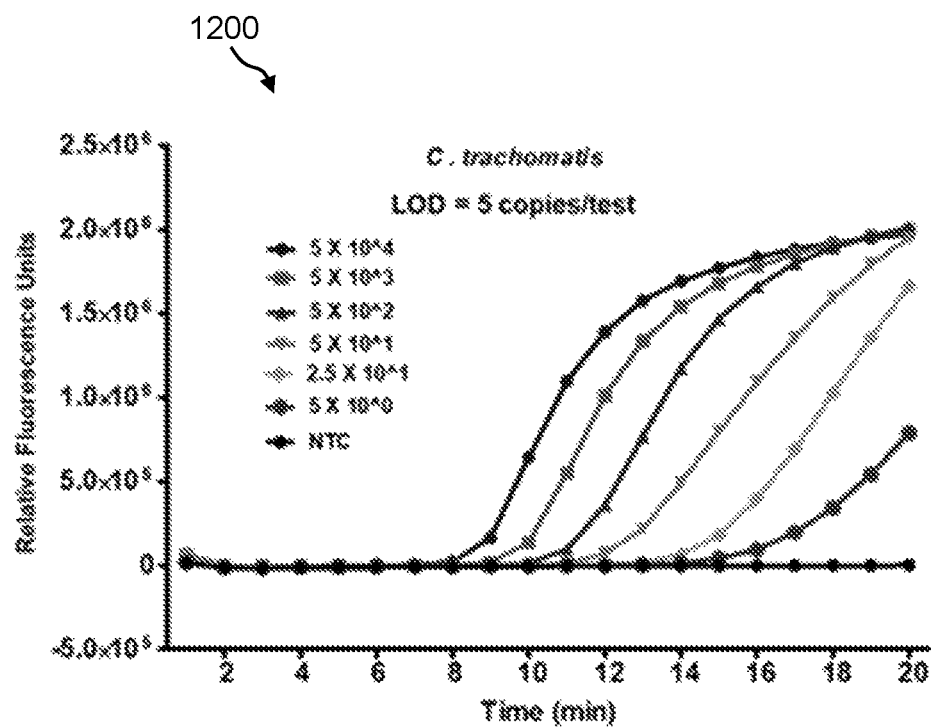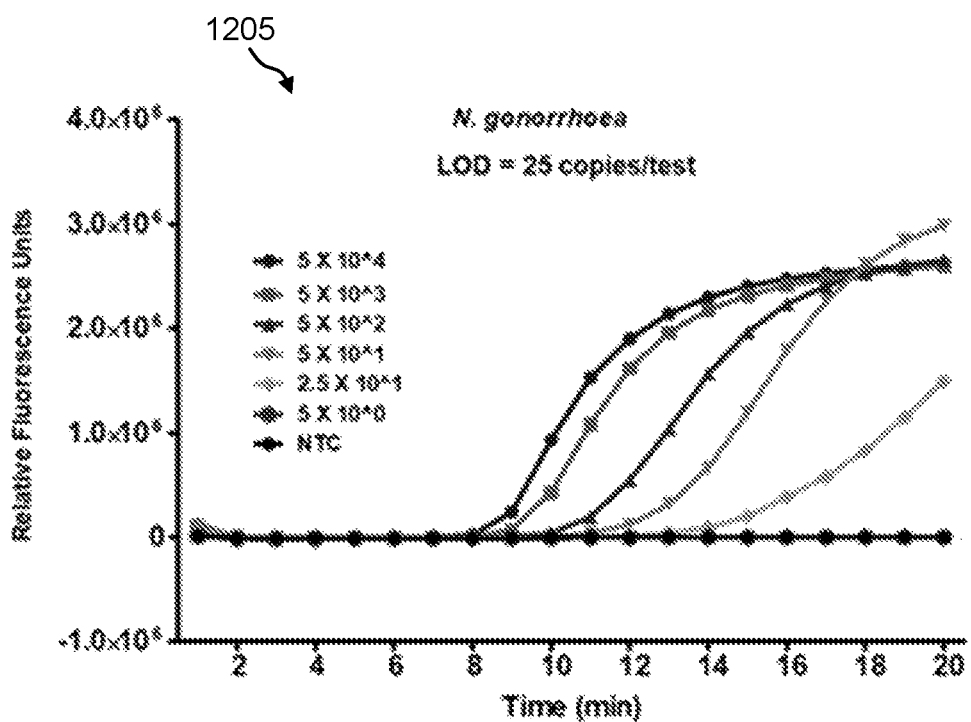
FIG. 54

Table 17

| Organism | LAMP-NAAT result | |
|---|---|---|
| | CT | NG |
| A. vaginae | − | − |
| G. vaginalis | − | − |
| M. mullineris | − | − |
| L. brevi | − | − |
| E. coli | − | − |
| S. epidermidis | − | − |
| B. Fragilis | − | − |
| T. vaginalis | − | − |
| N. gonorrhoeae ATCC 49226 | − | + |
| N. gonhoroeae strain FA1090 | − | + |
| N. gonorrhoeae ATCC 43069 | − | + |
| N. gonorrhoeae strain who K | − | + |
| S. pneumoniae | − | − |
| F. nucleatum | − | − |
| F. necrophorum | − | − |
| Herpes Simplex Virus 1 | − | − |
| Herpes Simplex Virus 2 | − | − |
| U. ureliticum | − | − |
| C. suis | − | − |
| C. abortus | − | − |
| C. muriderum | − | − |
| C. trachomatis serovar B | + | − |
| C. trachomatis serovar C | + | − |
| C. trachomatis serovar D | + | − |
| C. trachomatis serovar E | + | − |
| C. trachomatis serovar F | + | − |
| C. trachomatis serovar G | + | − |
| C. trachomatis serovar J | + | − |
| C. trachomatis serovar L2 | + | − |
| N. sicca | − | − |
| N. subflava | − | − |
| N. meningitidis | − | − |

FIG. 55

In house developed nucleic lateral flow assay. (A) is a schematic of the lateral flow showing the test and control lines. (B) Analysis of synthetic DNA. (C) Analysis of LAMP products.

Table 18

Novel Dx CT/NG Assay for CT Detection

| Sample | Novel Dx CT/NG Test | Hologic Aptima Combo 2 Assay for CT/NG | | Total |
|---|---|---|---|---|
| | | CT POS | CT NEG | |
| Urine | Positive | 5 | 0 | 5 |
| | Negative | 0 | 3 | 3 |
| | Total | 5 | 3 | 8 |
| | | Sensitivity: 100% | Specificity: 100% | |

| Sample | Novel Dx CT/NG Test | Hologic Aptima Combo 2 Assay for CT/NG | | Total |
|---|---|---|---|---|
| | | CT POS | CT NEG | |
| Vaginal Swabs | Positive | 22 | 0 | 22 |
| | Negative | 0 | 24 | 24 |
| | Total | 22 | 24 | 46 |
| | | Sensitivity: 100% | Specificity: 100% | |

Note: All samples were NG negative on the Aptima Combo 2 CT/NG and NG was not detected in all cases by Novel Dx CT/NG Test.

We are awaiting positive NG samples from our collaborator to evaluate NG Detection of our assay.

FIG. 59

SAMPLE-TO-ANSWER MICROFLUIDIC SYSTEM AND METHOD INCLUDING VERTICAL MICROFLUIDIC DEVICE AND AUTOMATED ACTUATION MECHANISMS

RELATED APPLICATIONS

This disclosure is related to U.S. Provisional Patent Application 62/723,474, entitled "Vertical Chip Sample-To-Answer Microfluidic Device Using Mechanical and Magnetic Actuation," filed on Aug. 27, 2018; the entire disclosure of which is incorporated herein by reference.

TECHNICAL FIELD OF THE INVENTION

The presently disclosed subject matter relates generally to systems and methods of processing assays and more particularly to a sample-to-answer microfluidic system and method including vertical microfluidic device and automated actuation mechanisms, such as, but not limited to, automated mechanical and/or magnetic actuation.

BACKGROUND

Microfluidic systems can include, for example, a microfluidic device and/or cartridge that is used for processing biological materials. In some cases, microfluidic devices may include a primary fluid channel containing the oil/immiscible phase and wherein the channel is situated in in the XY plane. The primary channel connects fluid wells (or reservoirs) in a fluidic circuit and is the conduit through which, for example, magnetic beads are transferred and resuspended between wells. Namely, microfluidic devices may include one or more reaction (or assay) chambers in combination with, for example, reagent pouches, reagent wells, sample input ports, sample wells, waste wells, detection wells, detection arrays, detection spots, lateral flow strips, and the like. Combinations of multiple of these elements may be interconnected through the primary fluid channel.

In such microfluidic devices, to enable smooth, bubble-free filling of the oil/immiscible liquid overlay, which overflows from well to well through the primary channel, to create a fluidic circuit, a pressure head is generated by employing an oil reagent container that is taller or situated at a height greater than that of the primary channel. The oil emptying out of the oil reagent container is driven by the pressure head to sequentially fill each well on the microfluidic device until it finds its level. This pressure head coupled with the head height, the well and primary channel geometry, and the hydrophobic coating layer on the walls of the microfluidic device can be optimized to result in a controlled and bubble-free filling of the primary channel with an oil interconnect layer.

Microfluidic devices that have the primary channel oriented in the XY plane are inserted and operated horizontally (i.e., in the XY plane) in a microfluidics instrument. However, in order to generate the pressure head required to fill the microfluidic device with oil, the height of the oil reagent container must be significantly larger in the Z plane (i.e., perpendicular to the fluid channel) than the depth of the fluid channel. Additionally, since the depth of the container is along the Z axis with the reagents situated at the bottom of the well and the immiscible fluid (if lighter than the reagents) situated on the top of the well in the primary channel, a minimum of two actuator plates is required (i.e., at least a top and bottom actuator plate). That is, two actuator plates are required in order to spatially orient, for example, magnets such that the magnetic particles can be resuspended in the reagent at the bottom of the well and transferred through the immiscible medium on the top of well and through the primary channel.

Accordingly, current microfluidic devices require an out of plane oil reagent container for increasing the height of the oil pressure head, which increases the overall height of the microfluidic device. This complicates the assembly and manufacturing processes due to an increase in the number of components or pieces required to implement an out-of-plane oil reagent container in the system and/or device. Therefore, new approaches are needed for processing biological materials in a microfluidic system and/or device.

SUMMARY

To be filled in by attorney. The present invention relates to a microfluidic cartridge including a primary channel containing an oil/immiscible reagent phase situated in an XZ plane, a plurality of wells interconnected by said primary channel to form a fluidic circuit, and magnetic beads that are moved through said primary channel and resuspended sequentially in said plurality of wells at various stages of operation. In one embodiment, the microfluidic cartridge can include an oil/immiscible reagent container, in plane with the primary channel. In another embodiment, the oil/immiscible reagent container is positioned at a height along a Z axis sufficient to generate a pressure head required to drive the flow of the oil into the microfluidic cartridge. In yet another embodiment, the oil/immiscible reagent container and pressure head are positioned above the wells along the Z axis to drive the contents of the oil/immiscible reagent container into the wells of the microfluidic cartridge. The microfluidic cartridge can be configured such that increasing the height of the oil/immiscible reagent container and pressure head does not increase the dimensions of the cartridge in a Y axis. In some embodiments, the microfluidic cartridge is configured such that the oil/immiscible reagent phase is bubble free. The microfluidic cartridge may further be configured to interact with one or more actuator plates oriented in the XZ plane. In one embodiment, there is only one actuator plate. In one embodiment, the one or more actuator plates comprise a plurality of transfer magnets oriented spatially and configured to be able to resuspend magnetic particles in a reagent at the bottom of a well and transfer the magnetic particles through the oil/immiscible reagent on the top of the well and through the primary channel. The microfluidic cartridge can be configured to perform a sample-to-answer nucleic acid amplification test (NAAT). In another embodiment, the microfluidic cartridge can be configured such that on-chip magnetic particle-based sample processing is performed using a single rotational motion during which capture, resuspension and transfer of magnetic particles takes place. In yet another embodiment, the primary channel can include one or more baffles configured to act as a physical barrier to constrain the magnetic particles in a desired location and prevent them from moving towards a magnetic field when the transfer magnets move them from one well to the next. The one or more baffles may comprise protrusions extending into an interior space of the primary channel that temporarily restrain further movement of the magnetic particles. The one or more actuator plates can also include a plurality of reagent capture/resuspension magnets are configured to pull the magnetic beads down into the well such that they are suspended in the reagent in that well. In one embodiment, the cartridge includes a wick valve configured to dispense/transfer liquid in the microfluidic cartridge with zero dead volume/loss of the dispensed/transferred liquid. In yet another embodiment, the present invention relates to a portable instrument configured to receive the microfluidic cartridge described above. In one embodiment, the portable instrument can include a lever arm configured to open and close the instrument as well as move a crush plate forward and backward so as to crush reagent pouches on the microfluidic cartridge when the instrument is closed. In yet another embodiment, the portable instrument can comprise a hinged door comprising protrusions on the inside such that when the door is closed, the protrusions come in contact with reagent pouches on the microfluidic cartridge inserted in the instrument and crush them. The portable instrument can be configured such that after the microfluidic cartridge is inserted into the instrument and the instrument is closed, one or more actuator plates comprising spatially oriented magnets and/or mechanical elements rotates to complete a series of sample processing steps in a precise sequence.

BRIEF DESCRIPTION OF THE DRAWINGS

The features and advantages of the present invention will be more clearly understood from the following description taken in conjunction with the accompanying drawings, which are not necessarily drawn to scale, and wherein:

FIG. 54 shows a first plot and second plot of real-time LAMP amplification curves of various amounts of initial DNA template of trachomatis and *N. gonorrhoeae*, respectively;

FIG. 55 shows a Table 17 indicating the analytical specificity of the Novel Dx CT/NG LAMP Assay showing organisms tested and test line results for CT and NG;

FIG. 59 shows a Table 18 indicating the on-chip sample-to-answer Novel Dx CT/NG assay performance for the detection of CT.

DETAILED DESCRIPTION OF EXEMPLARY EMBODIMENTS

Figure 1:
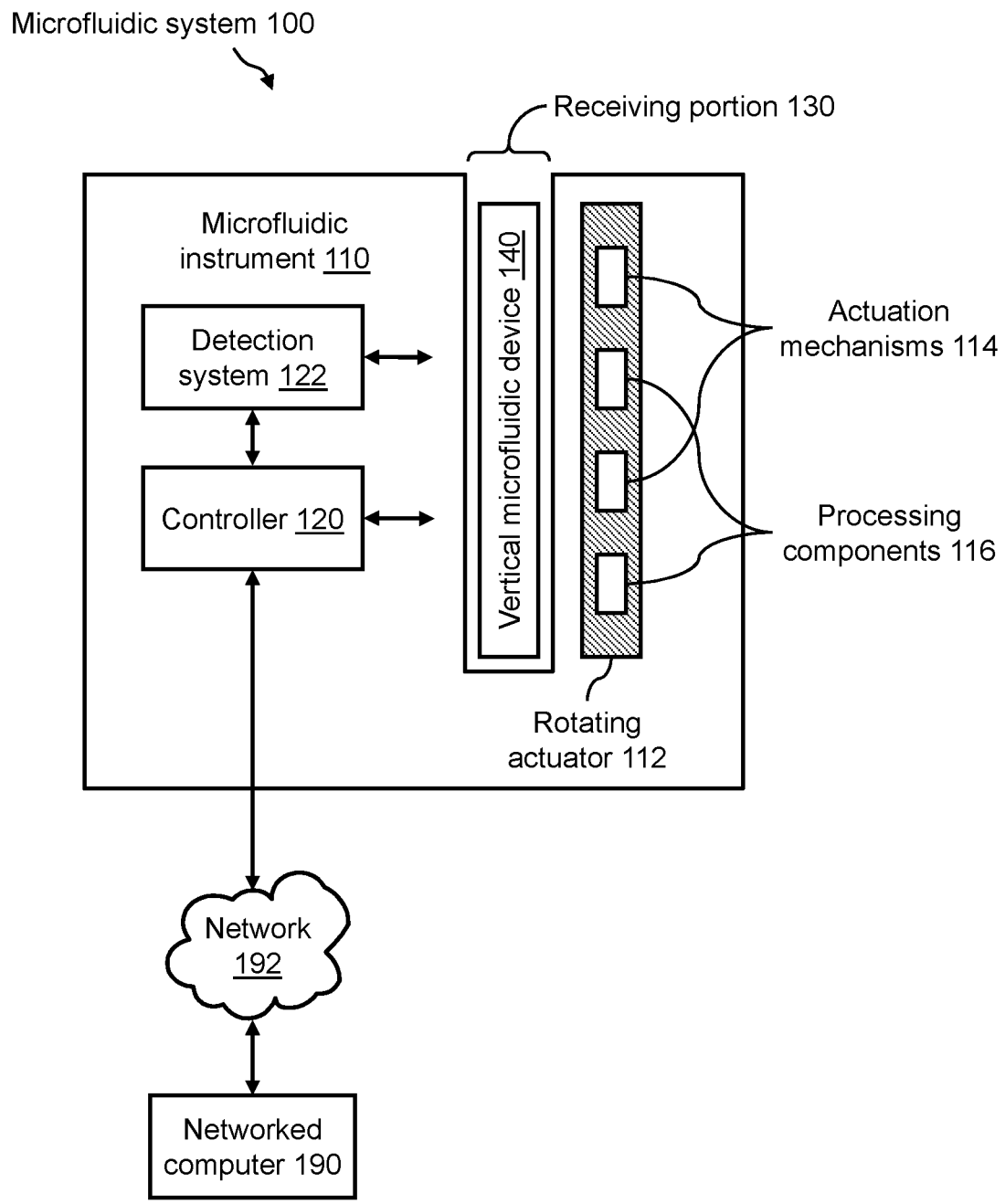
FIG. 1 illustrates a block diagram of an example of the presently disclosed microfluidic system including a vertically oriented microfluidic device and actuator for operation in the XY plane.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a sample-to-answer microfluidic system and method including vertical microfluidic device and automated actuation mechanisms, such as, but not limited to, automated mechanical and/or magnetic actuation.

The presently disclosed sample-to-answer microfluidic system provides a sample-to-answer microfluidic device and/or cartridge using mechanical and magnetic actuation, wherein a single rotational motion is used to perform multiple actuation steps that define a sample-to-answer assay sequence. Because the sample-to-answer microfluidic system and microfluidic device are designed to operate efficiently in the XZ plane, the number of components and/or assembly steps required for the microfluidic cartridge and actuation instrument may be reduced as compared with conventional microfluidic systems and/or devices that are operating in the XY plane.

In some embodiments of the microfluidic device, the primary channel and baffles required to constrain the magnetic particles to a particular well in the presence of a magnetic field, is oriented in the XZ plane. As such the microfluidic cartridge is loaded and operated vertically in the instrument (i.e., in the XZ plane). Here the oil reagent container height in the Z axis is still employed to generate the pressure head required for drive the flow of the oil into the microfluidic cartridge. Unlike conventional microfluidic cartridges and/or devices where increasing the height of the oil pressure head required an out of plane oil reagent container which increases the overall height of the microfluidic cartridge, in this unique embodiment because the oil reagent container is in plane with the primary channel it makes it easier to increase the height of the pressure head without increasing the dimensions of the cartridge in the Y axis. This greatly simplifies the assembly and manufacturing processes for microfluidic cartridges compared with conventional microfluidic cartridges. Additionally, this embodiment requires a minimum of only one actuator plate in the XZ plane, with magnets oriented spatially on it, to be able to resuspend the magnetic particles in the reagent at the bottom of the well and transfer them through the immiscible medium situated on the top of the well and through the primary channel.

In some embodiments, the presently disclosed subject matter provides a sample-to-answer microfluidic system and method including a vertical microfluidic device that is held stationary so as to maintain the pressure head and orientation of the fluids in the wells.

Additionally, the presently disclosed subject matter provides methods of designing Loop Mediated Isothermal Amplification (LAMP) primers and more particularly of designing *Chlamydia trachomatis* (CT)/*Neisseria gonorrhoeae* (NG) LAMP primers (or CT/NG LAMP primers).

Referring now to FIG. 1 is a block diagram of an example of the presently disclosed microfluidic system 100 that includes a vertically oriented microfluidic device in relation to an automated actuation mechanism. Microfluidic system 100 may be, for example, a microfluidic system that supports point of care (POC), sample-to-answer applications and/or devices.

For example, microfluidic system 100 may include a microfluidics instrument 110 that, optionally, may be connected to a network. For example, a controller 120 of microfluidics instrument 110 may be in communication with a networked computer 190 via a network 192. Networked computer 190 may be, for example, any centralized server or cloud server. Network 192 may be, for example, a local area network (LAN) or wide area network (WAN) for connecting to the internet. Controller 120 may, for example, be a general-purpose computer, special purpose computer, personal computer, microprocessor, or other programmable data processing apparatus. Controller 120 serves to provide processing capabilities, such as storing, interpreting, and/or executing software instructions, as well as controlling the overall operations of microfluidic system 100.

Microfluidics instrument 110 of microfluidic system 100 is designed to receive, hold, and/or process a vertically oriented microfluidic device and/or cartridge. In one example, microfluidics instrument 110 receives, holds, and/or processes a vertical microfluidic device 140. Accordingly, microfluidics instrument 110 includes a receiving portion 130 for receiving and holding vertical microfluidic device 140. Additionally, microfluidics instrument 110 includes a rotating actuator 112 in relation to vertical microfluidic device 140. Namely, vertical microfluidic device 140 means a microfluidic device that is oriented and operating in the XZ plane. Similarly, rotating actuator 112 is oriented in the XZ plane and in relation to vertical microfluidic device 140.

Rotating actuator 112 may include one or more actuation mechanisms 114 and/or one or more processing components 116. Actuation mechanisms 114 may include, but are not limited to, magnetic and/or mechanical actuation mechanisms. Processing components 116 may be any components needed for processing biological materials in microfluidic system 100 and/or vertical microfluidic device 140. Processing components 116 may include, for example, heating elements, mixers, vibrating elements, and the like.

Additionally, microfluidics instrument 110 may include a detection system 122. Detection system 122 may include, for example, an illumination source, optical filters such as interference filters or colored glass filters, beam-splitters or dichroic mirrors, and an optical measurement device. The illumination source (not shown) may be, for example, a light source in the ultraviolet (UV) to visible range (200-800 nm), such as, but not limited to, a UV light source, a white light source, or any other color light source, or a combination of multiple light sources. The optical measurement device (not shown) may be, for example, a charge coupled device (CCD), a photodetector, a spectrometer, a photodiode array, or any combinations thereof. The optical measurement device may be used to obtain light intensity readings from designated detection regions of vertical microfluidic device 140.

Controller 120 is electrically coupled to the various components of microfluidic system 100, such as rotating actuator 112 with actuation mechanisms 114 and processing components 116, detection system 122, and/or vertical microfluidic device 140. Controller 120 may be configured and programmed to control data and/or power aspects of any devices.

In microfluidic system 100 and microfluidics instrument 110, a main feature is that vertical microfluidic device 140 is loaded and operated vertically in the instrument (i.e., in the XZ plane). Accordingly, the primary fluid channel (see FIG. 25 through FIG. 34) of vertical microfluidic device 140 is oriented in the XZ plane. Likewise, any baffles of vertical microfluidic device 140 that are required to constrain, for example, magnetic particles to a particular well in the presence of a magnetic field are oriented in the XZ plane. In vertical microfluidic device 140, the oil reagent container height in the Z axis is still employed to generate the pressure head required for driving the flow of the oil into the microfluidic device. However, because the oil reagent container (see FIG. 25 through FIG. 34) is in plane with the primary fluid channel it makes it easier to increase the height of the pressure head without increasing the dimensions of the microfluidic device in the Y axis. As compared with conventional microfluidic devices that are oriented and operated in the XY plane, the assembly and manufacturing processes are greatly simplified.

Additionally, this vertical configuration in microfluidics instrument 110 allows operation with the use a minimal of one rotating actuator 112 only, wherein the one rotating actuator 112 is also oriented in the XZ plane and in relation to vertical microfluidic device 140. In one example, rotating actuator 112 may include magnets oriented spatially thereon (see FIG. 25 through FIG. 34) that may be used to resuspend the magnetic particles in the reagent at the bottom of the oil reagent container or well and transfer them through the immiscible medium on the top of well and through the primary channel into subsequent wells and reaction chambers on the microfluidic device. In another example, rotating actuator 112 may include spatially oriented mechanical crushing features that protrude from the surface thereof for crushing, for example, blister packs or balloons in order to dispense a certain fluid at a certain step of the assay.

In microfluidic system 100, the vertically oriented microfluidics instrument 110 is held stationary so as to maintain the pressure head and orientation of the fluids in the wells while rotating actuator 112 is rotatable with respect to microfluidics instrument 110.

A main feature of rotating actuator 112 of microfluidic system 100 and microfluidics instrument 110 is that it may use rotational motion to perform multiple actuation steps that define a sample-to-answer assay sequence. For example, a single rotational motion of rotating actuator 112 may be used to manipulate the spatially oriented magnets in relation to vertical microfluidic device 140 in order to perform the multiple actuation steps. Accordingly, benefits of microfluidic system 100 that includes an actuator (e.g., rotating actuator 112) and a microfluidic device (e.g., vertical microfluidic device 140) oriented in the XZ plane may be the reduced number of components and assembly steps that are required for manufacturing the microfluidic device and/or cartridge and the microfluidics instrument.

Figure 2A:
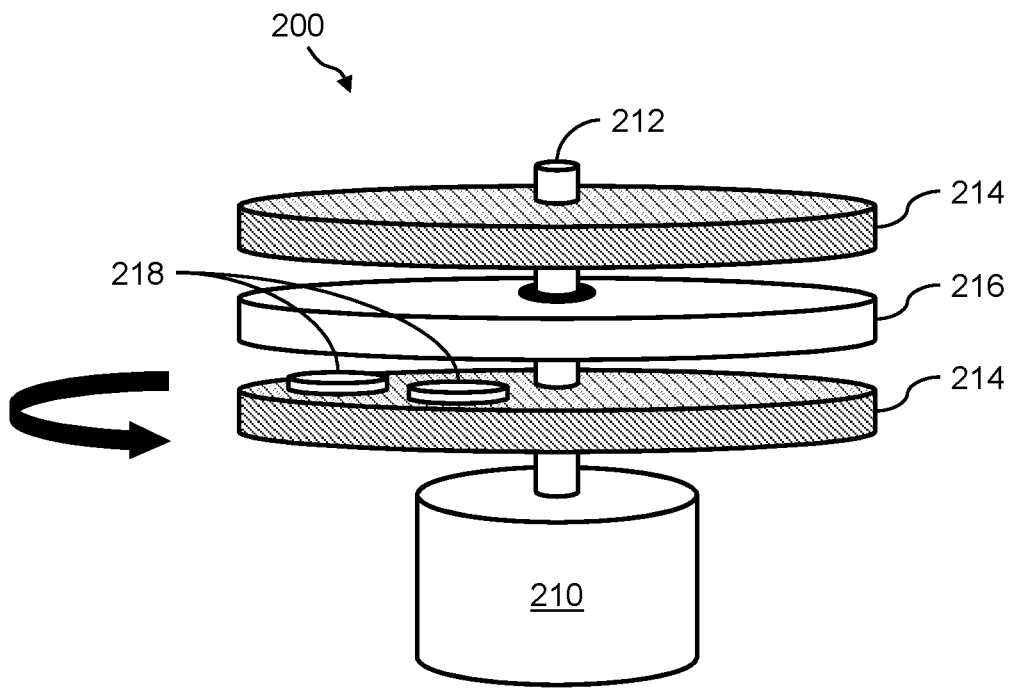
FIG. 2A, FIG. 2B, and FIG. 3 illustrate perspective views of examples of rotatable actuators in relation to a stationary microfluidic device for performing an automatic assay sequence.
Figure 2B:
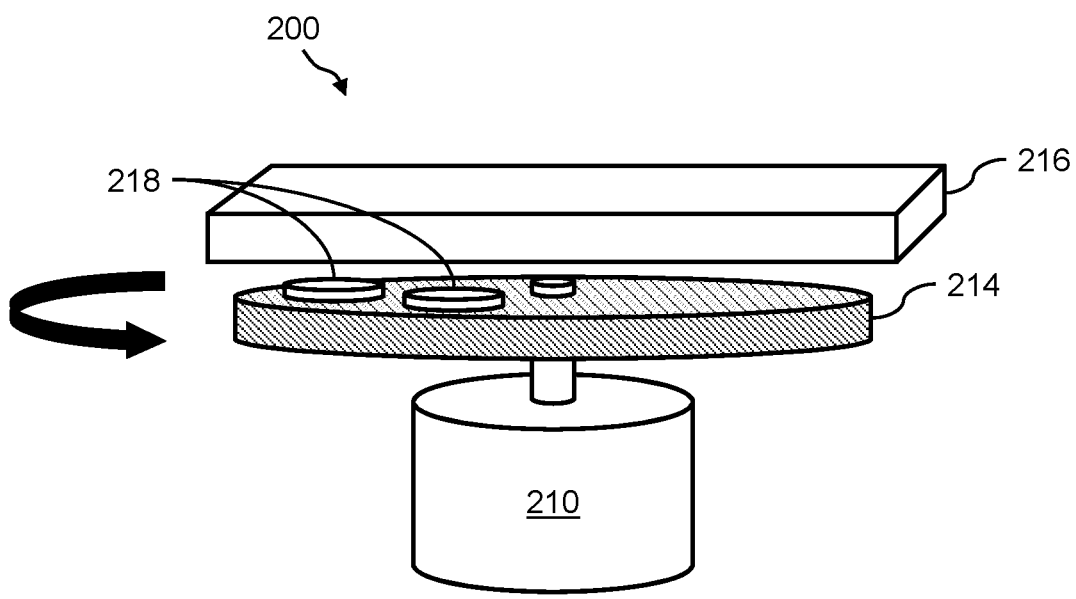

Referring now to FIG. 2A and FIG. 2B is perspective views of examples of rotatable actuators in relation to a stationary microfluidic device for performing an automatic assay sequence. In one example, FIG. 2A shows an actuator assembly 200 that includes a DC motor 210 driving a shaft 212. Actuator assembly 200 includes, for example, two rotatable actuators 214, which may be, for example, disc-shaped plates. Additionally, a microfluidic device 216 (e.g., a microfluidic cartridge) is arranged between the two rotatable actuators 214, wherein microfluidic device 216 is also disc-shaped. Shaft 212 of DC motor 210 passes through microfluidic device 216 without connecting thereto such that microfluidic device 216 can be held stationary with respect to the two rotatable actuators 214. Namely, DC motor 210 can be used to rotate rotatable actuators 214 without rotating microfluidic device 216. Certain actuation mechanisms 218 are spatially oriented on or near the surfaces of rotatable actuators 214 that are nearest microfluidic device 216. Actuation mechanisms 218 may include passive actuation mechanisms (e.g., magnets and crushing features) and/or active actuation mechanisms (e.g., resistive heaters). In another example, actuator assembly 200 of FIG. 2B includes one rotatable actuator 214 only in relation to a stationary microfluidic device 216 that is square- or rectangular-shaped.

In either example, actuator assembly 200 may be oriented horizontally (in XY plane) or vertically (in XZ plane). Additionally, instead of applying rotational motion to rotatable actuators 214, linear motion may be applied to move any spatially oriented actuation mechanisms 218. In any case, actuator assembly 200 provides a miniaturized assay automation actuator that can be used to complete multiple actuation steps that correspond to an assay sequence using a simple rotating or sliding motion. For example, rotatable actuators 214 may be used for on-chip fluid handling/valving to transfer fluids around microfluidic device 216 in order to perform different operations including, but not limited to, (1) lysis, sample processing, purification, filtering, amplification and detection, (2) capture, transfer, and re-suspension of magnetic beads between chambers, (3) mixing and washing, and (4) sample heating.

Figure 3:
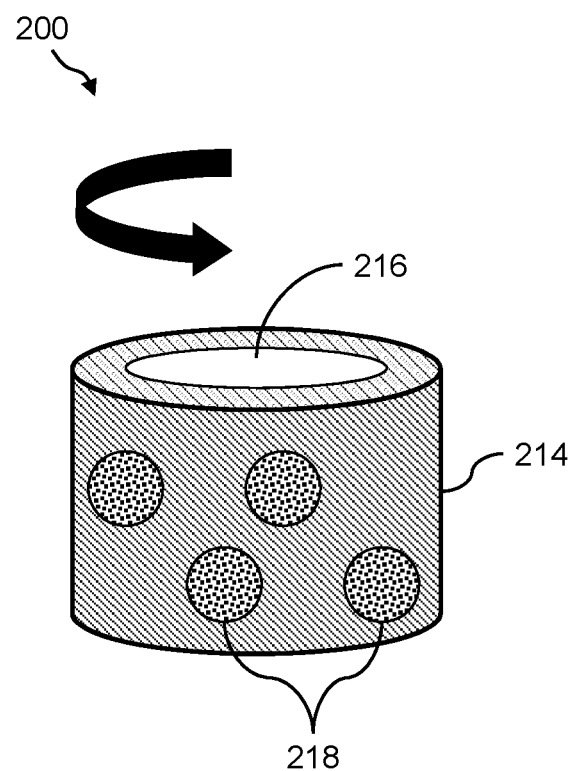

In another example, FIG. 3 shows an example of actuator assembly 200 that includes microfluidic device 216 in combination with a doughnut-shaped rotatable actuator 214. Namely, microfluidic device 216 is held stationary inside the center hole of the doughnut-shaped rotatable actuator 214, while rotatable actuator 214 can rotate around microfluidic device 216.

While FIG. 2A, FIG. 2B, and FIG. 3 show examples of a microfluidic device 216 in combination with one or more rotatable actuators 214, these are exemplary only. Any motion in the XY plane wherein one element moves relative to the other is possible. That is, either the microfluidic device or the actuator can be the moving part. For example, in any horizontal configuration either or both the microfluidic device and the actuators may be movable, and wherein the motion may be rotating motion and/or linear motion (not shown). Additionally, a microfluidic device such as the one that would be used in FIG. 3 may be configured such that certain components of the device such as the reagent pouches may be oriented in the XY plane, with the wells and primary channel oriented along the circumferential portion of the cylinder.

Figure 4:
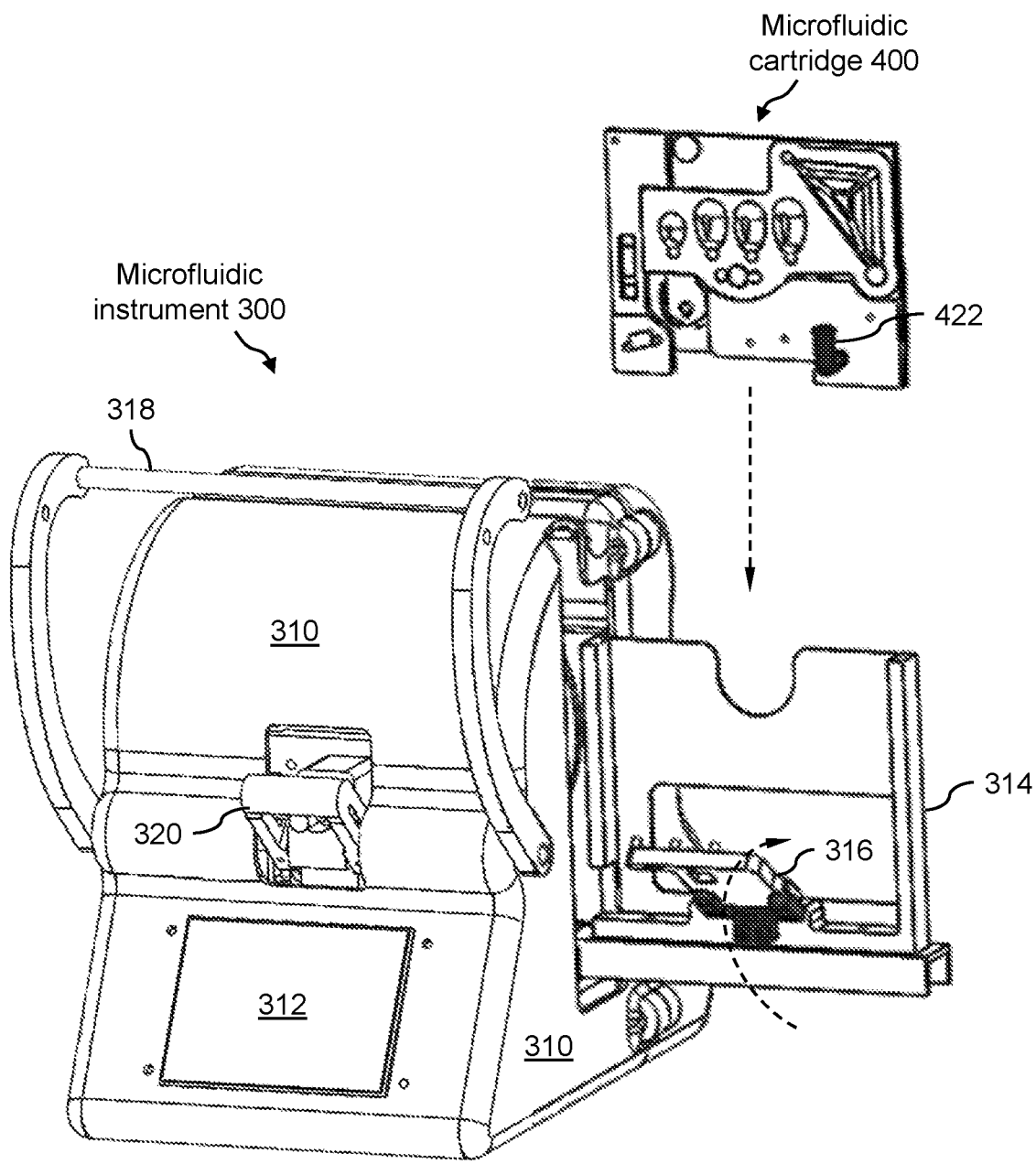
FIG. 4, FIG. 5, and FIG. 6 illustrate perspective views of an example of a microfluidic instrument of the presently disclosed microfluidic system and a process of loading a vertically oriented microfluidic device therein.
Figure 5:
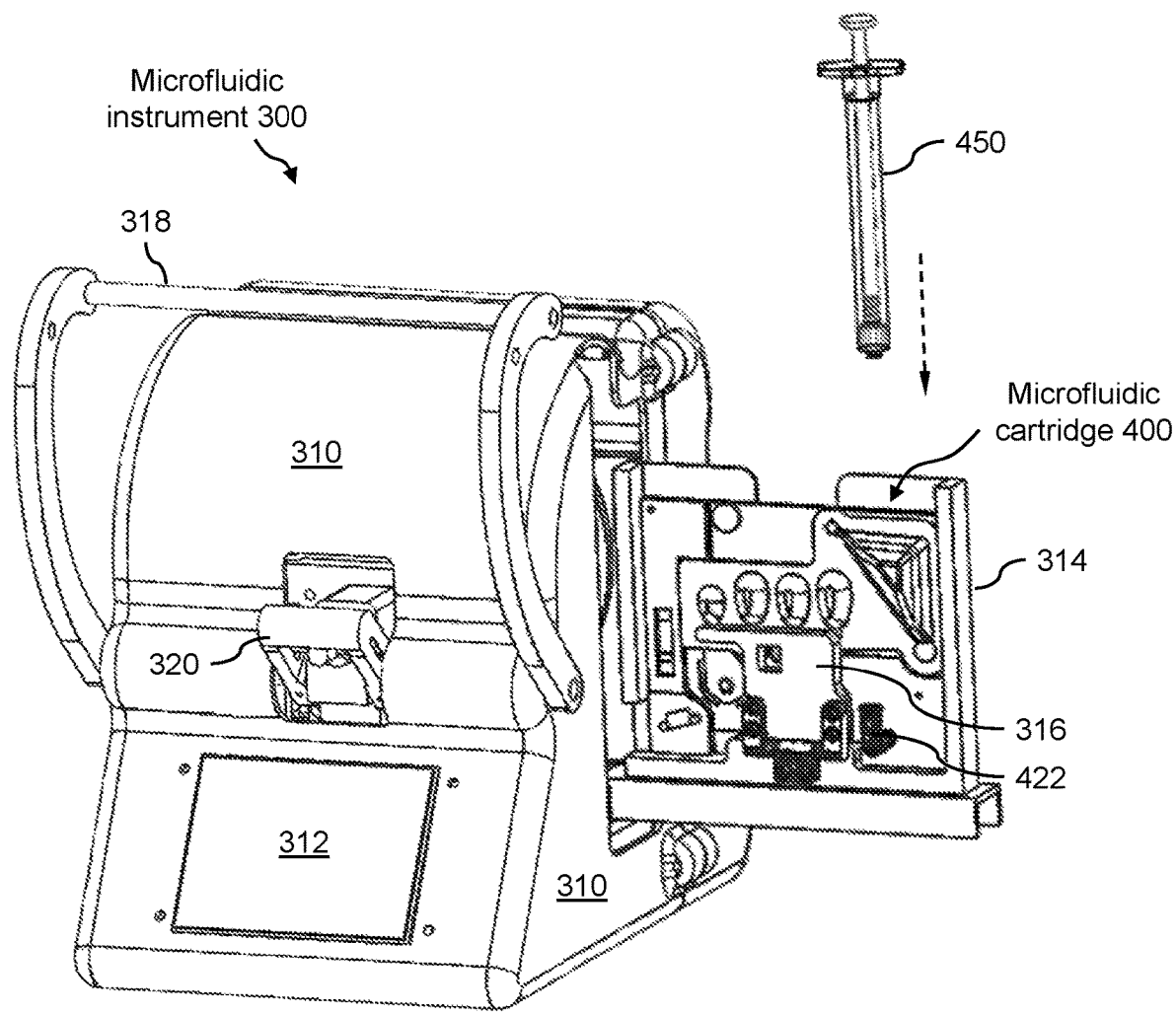
Figure 6:
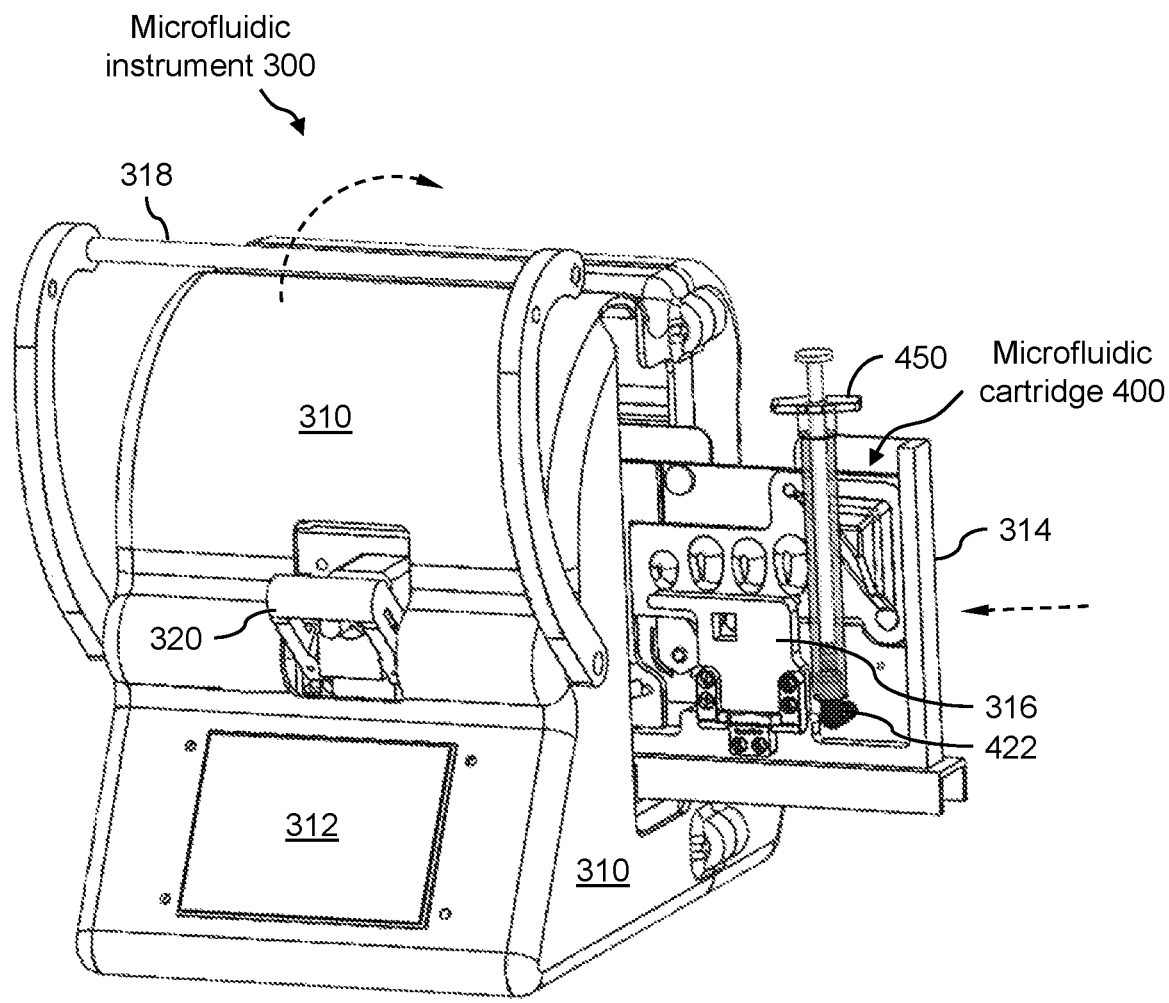

Referring now to FIG. 4, FIG. 5, and FIG. 6 is perspective views of an example of a microfluidic instrument 300 of the presently disclosed microfluidic system 100 and a process of loading a vertically oriented microfluidic cartridge 400 therein. Microfluidic instrument 300 is an example of microfluidic instrument 110 of the presently disclosed microfluidic system 100 shown in FIG. 1. In this example, microfluidic instrument 300 may include a housing 310 (e.g., a plastic two-piece housing), a digital display 312 (e.g., a LCD display), a loading station 314 for receiving microfluidic cartridge 400 and wherein loading station 314 is slidably coupled to microfluidic instrument 300, a locking hinge 316 for securing microfluidic cartridge 400 in loading station 314, a locking handle 318 for engaging the internal components of microfluidic instrument 300 with microfluidic cartridge 400, and a handle shaft and yolk assembly 320 for manipulating locking handle 318 and wherein locking handle 318 is a bail style of handle that swings outward and inward. Locking handle 318 is one example of a locking/clamping mechanism of the microfluidic instrument. Another example of a locking/clamping mechanism is shown and described hereinbelow with reference to FIG. 8 through FIG. 15 and FIG. 39 through FIG. 51B.

Loading station 314 may be customized to the type of cartridge or cassette that is being used in the system. In one example, loading station 314 may be customized to fit a lateral flow immunoassay cassette such that when it is inserted into the instrument, it is aligned and positioned in front of the optical detection system so as to be able to perform a qualitative or quantitative digital read-out of the strip held in the cartridge to display the test results on the screen and save them on the instrument or the cloud. In another example, loading station 314 may be customized to fit a Direct-to-Amplification Sample-to-Answer NAAT cartridge where the sample preparation and purification steps may be bypassed, and the crude lysate or diluted lysate may be directly made to enter the amplification well for amplification and subsequent detection of the amplified products the lateral flow strip. The sample may either be bound to magnetic beads that are then transferred through the primary channel into the amplification well or the sample well may be filled such that it overflows and it is metered into the amplification well where it rehydrates a lyophilized pellet of amplification mix. In yet another example, loading station 314 may be customized to input a immunoassay based microfluidic cartridge where the cartridge contains one or more reagent pouches containing buffers that need to be introduced to the sample to condition the sample prior to automatically dispensing the sample onto the lateral flow strip. In still another embodiment (not shown), loading station 314 may comprise adjustable sliders so as to slide and lock microfluidic cartridges or cassettes of different sizes. In some embodiments, the loading station may comprise sensors to automatically detect the type of cartridge inserted into it. This may be through the use of a RFID or NFC tag on the cartridge or a barcode or QR code which may be read automatically by the loading station when it the cartridge is inserted into it. These customizable features of loading station 314 make the microfluidic assay automation system described herein extremely versatile so as to be able to run a plethora of different types of lab tests from a comprehensive test menu.

In a first step of loading microfluidic cartridge 400 into microfluidic instrument 300 in a vertically oriented fashion, microfluidic instrument 300 is opened and microfluidic cartridge 400 is loaded therein. For example, FIG. 4 shows locking handle 318 pulled outward away from housing 310 and loading station 314 slide fully out of housing 310. Additionally, locking hinge 316 is in the fully open or unlatched state. Microfluidic cartridge 400 is positioned for inserting into the rails of loading station 314.

In a next step of loading microfluidic cartridge 400 into microfluidic instrument 300 in a vertically oriented fashion, the sample is loaded into microfluidic cartridge 400. For example, FIG. 5 shows microfluidic cartridge 400 installed into the rails of loading station 314 and locking hinge 316 in the latched state and fully engaged with microfluidic cartridge 400. Additionally, a syringe 450 is positioned for inserting into a loading port 422 of microfluidic cartridge 400.

In a next step of loading microfluidic cartridge 400 into microfluidic instrument 300 in a vertically oriented fashion, microfluidic instrument 300 is closed and the assay sequence is initiated. For example, FIG. 6 shows the tip of syringe 450 inserted into and fluidly coupled to loading port 422 of microfluidic cartridge 400. Loading station 314, which is holding microfluidic cartridge 400 and syringe 450, is slide inward and into housing 310. Once the full inward travel of loading station 314 is reached, locking handle 318 pushed inward and locked. In this state of locking handle 318, handle shaft and yolk assembly 320 causes certain internal components of microfluidic instrument 300 to engage with certain features of microfluidic cartridge 400. Microfluidic cartridge 400 is now held vertically and in relation to a rotatable actuator plate (see FIG. 7 through FIG. 15) and wherein an automatic assay sequence can occur in the XZ plane. Using controls of microfluidic instrument 300, a user may now initiate an assay sequence. More details of microfluidic instrument 300 are shown and described hereinbelow with reference to FIG. 7 through FIG. 15.

Figure 7:
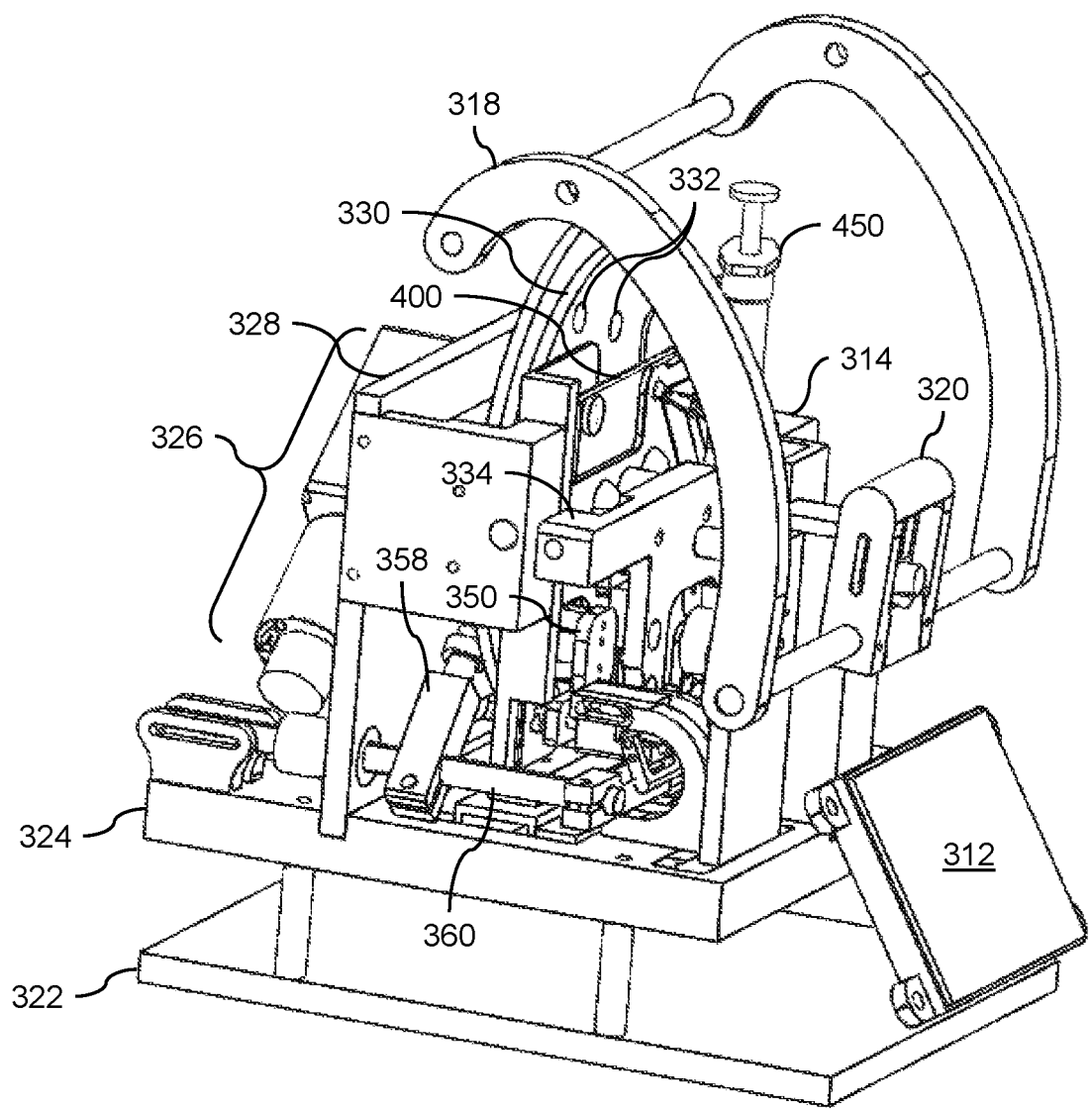
FIG. 7 illustrates an isometric view of the microfluidic instrument shown in FIG. 4, FIG. 5, and FIG. 6 absent the housing and showing more details thereof.

Referring now to FIG. 7 is an isometric view of microfluidic instrument 300 shown in FIG. 4, FIG. 5, and FIG. 6 absent housing 310 and showing more details thereof. In addition to digital display 312, loading station 314, locking hinge 316, locking handle 318, handle shaft and yolk assembly 320, microfluidic instrument 300 further includes a lower base plate 322; an upper base plate 324; motor assembly 326 that includes, for example, a DC motor, a gearbox, a shaft, and a drive hub mounted on a motor plate 328; an actuator plate 330 with openings 332; a crusher plate 334 for crushing balloons and blister packs; a cam follower 358; and a sequential burst plunger 360.

Actuator plate 330 with openings 332 is an example of rotating actuator 112 of the presently disclosed microfluidic system 100 shown in FIG. 1, wherein openings 332 are locations for installing actuation components 114 and/or processing components 116.

Several other components of microfluidic instrument 300 are not visible in FIG. 7. Some of the primary components, may include, but are not limited to, an LED light source, a camera, heaters, a control printed circuit board (PCB), a sequential burst cam, and the like. Generally, microfluidic instrument 300 may include a wide variety of components, such as, but not limited to, handles, plates, panels, bars, rods, shafts, brackets, blocks, spacers, hubs, collars, clamps, bushings, bearings, pins, dowels, cams, aligners, screws, nuts, bolts, washers, springs, clips, any types of mechanical connectors, any types of electrical connectors, sensors, actuators, and the like.

Referring now to FIG. 8 through FIG. 15 is various views of another example of microfluidic instrument 300 of the presently disclosed microfluidic system 100 for processing a vertically oriented microfluidic device (e.g., microfluidic cartridge 400) therein. Microfluidic instrument 300 shown in FIG. 8 through FIG. 15 is substantially the same as microfluidic instrument 300 shown in FIG. 7 except for the implementation of the handle and display, among a few other slight differences.

Figure 8:
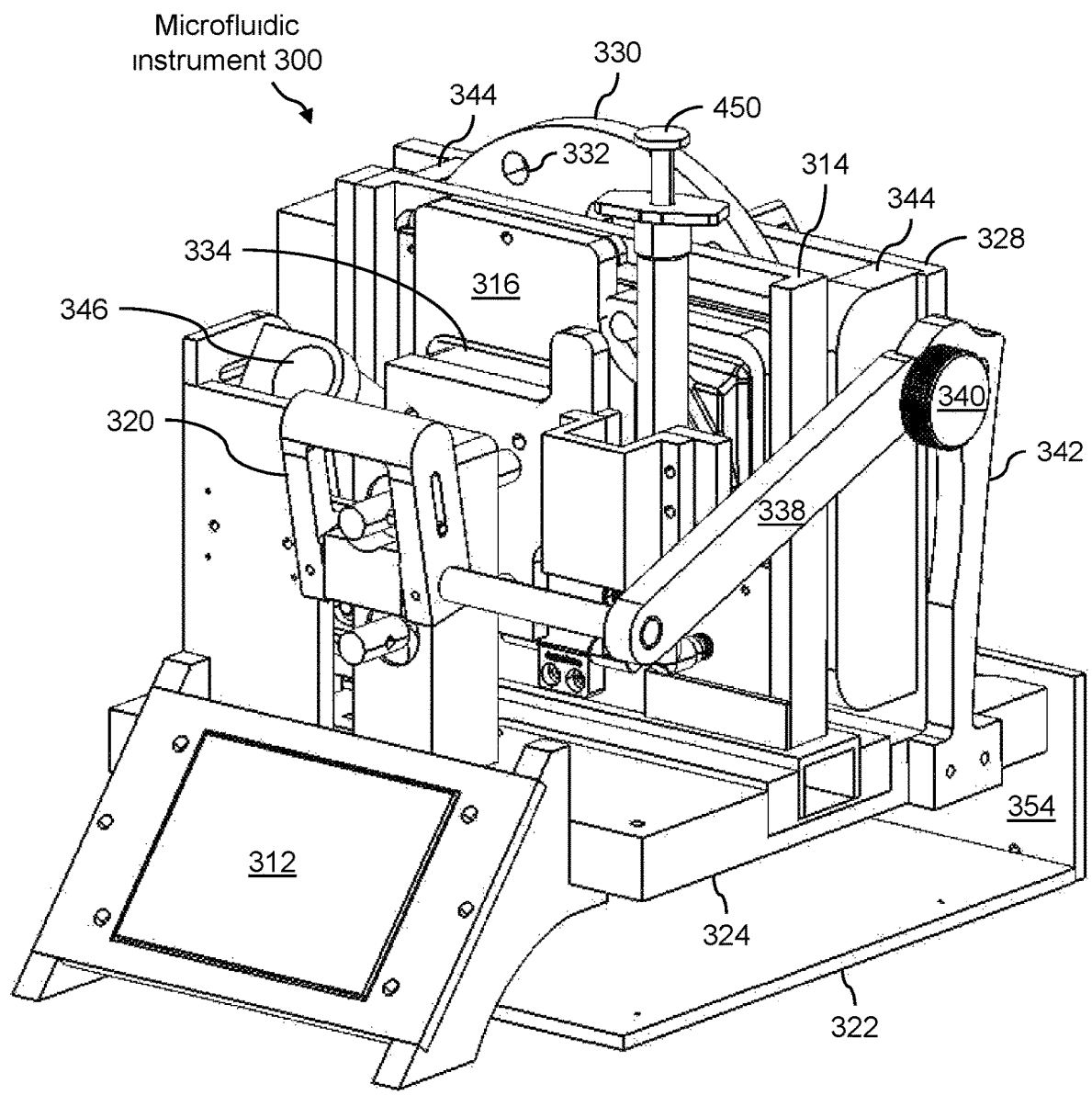
FIG. 8 through FIG. 15 illustrate various views of another example of the microfluidic instrument of the presently disclosed microfluidic system for processing a vertically oriented microfluidic device therein.
Figure 9:
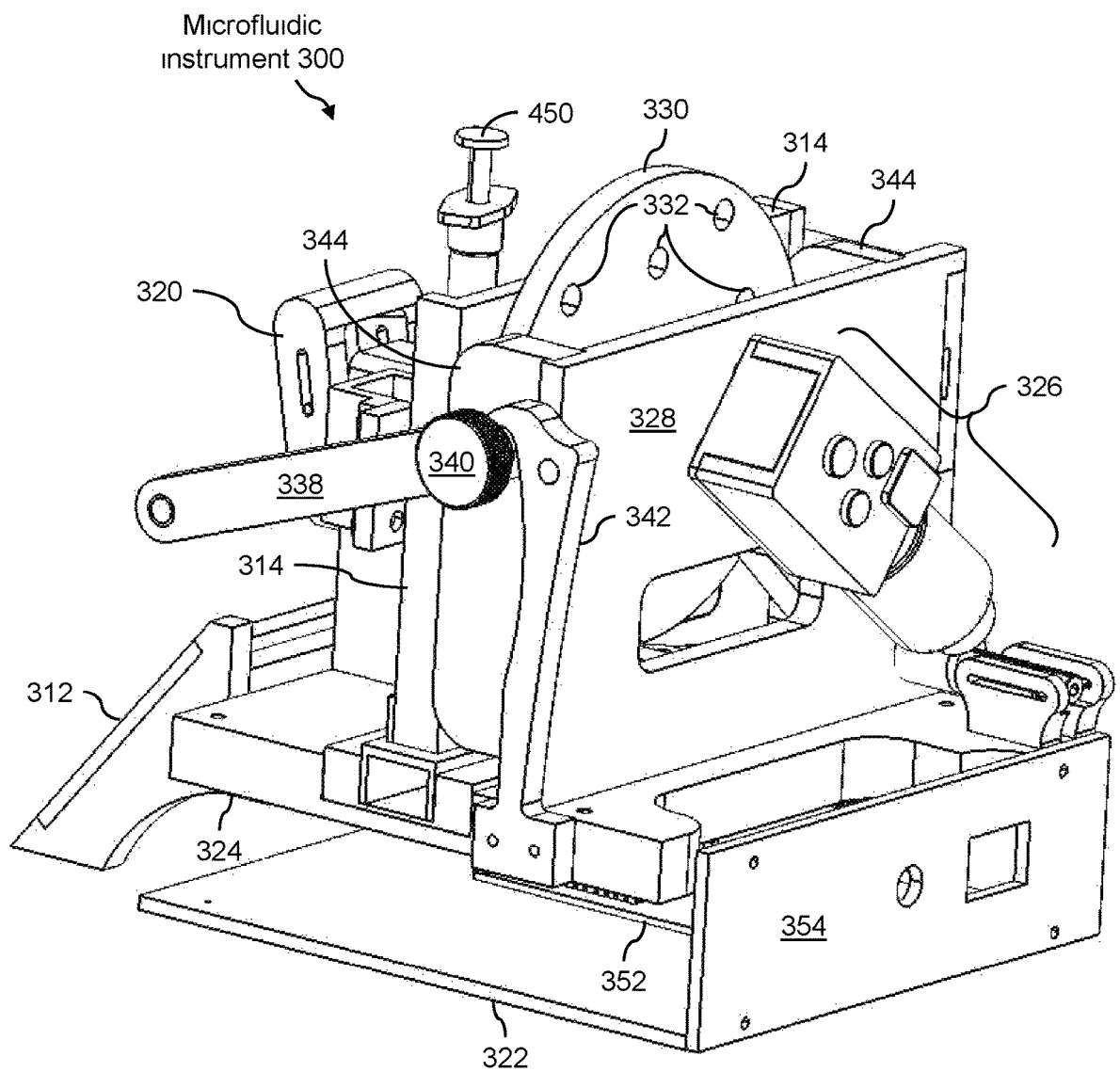
Figure 10:
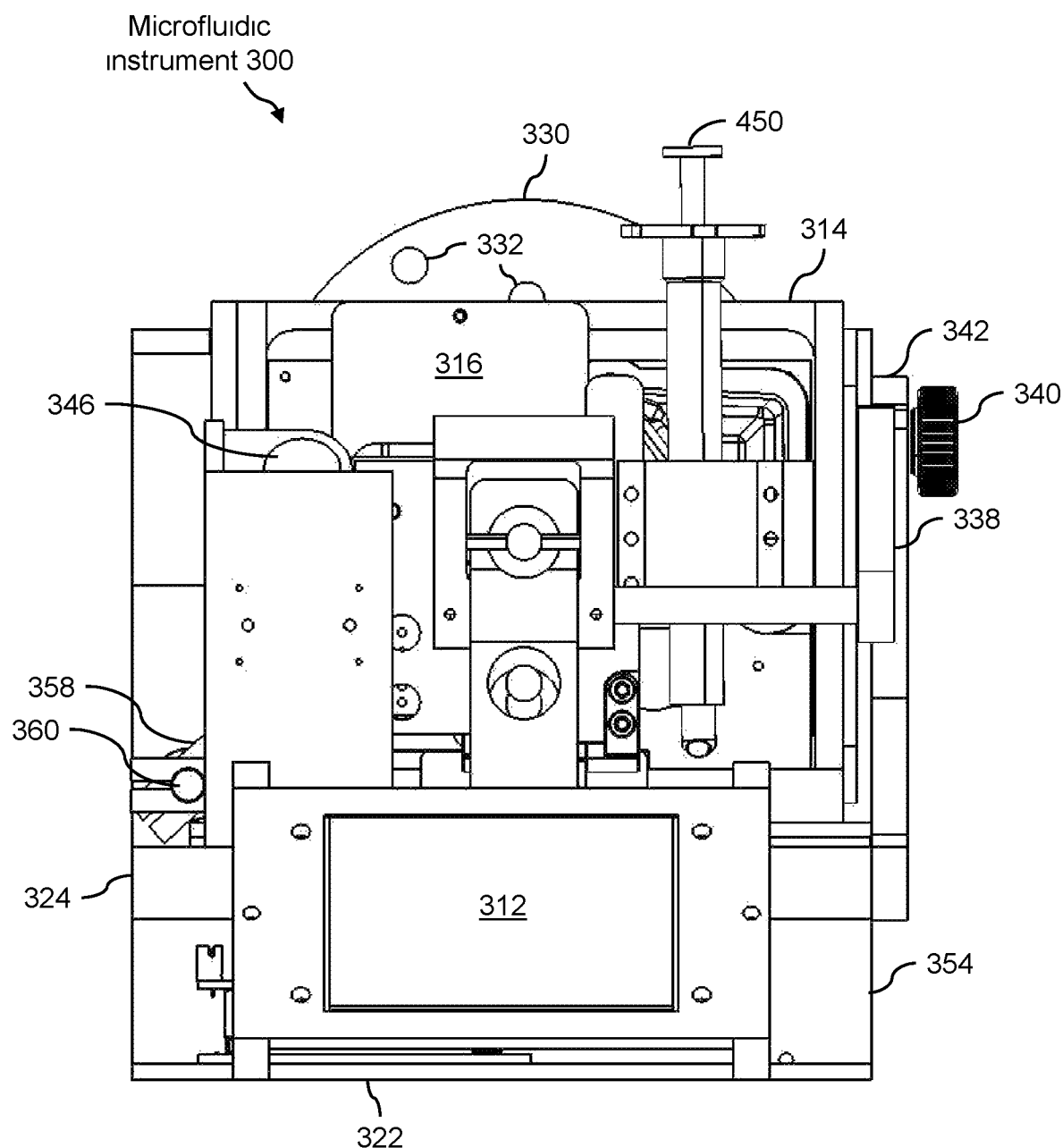
Figure 11:
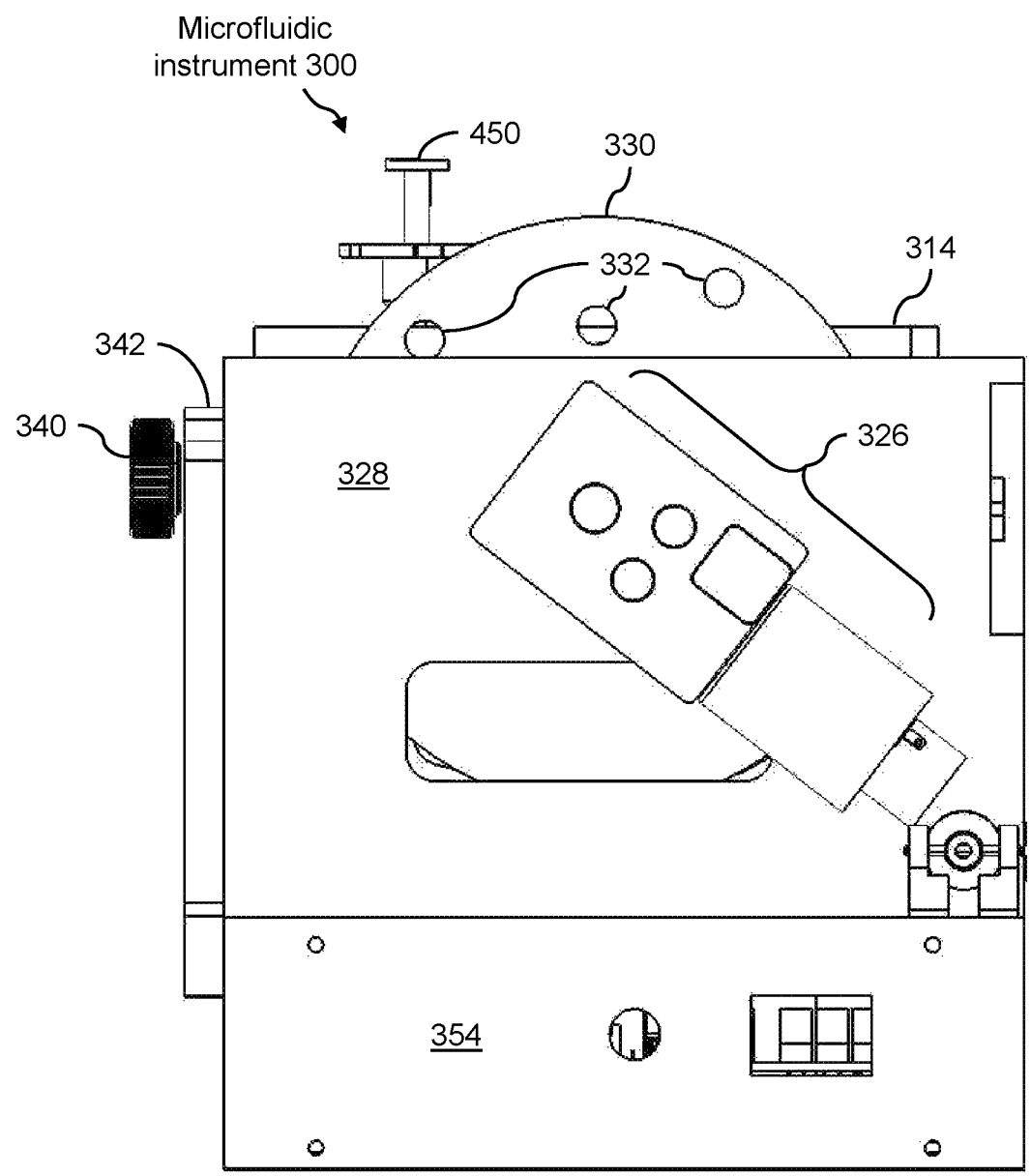
Figure 12:
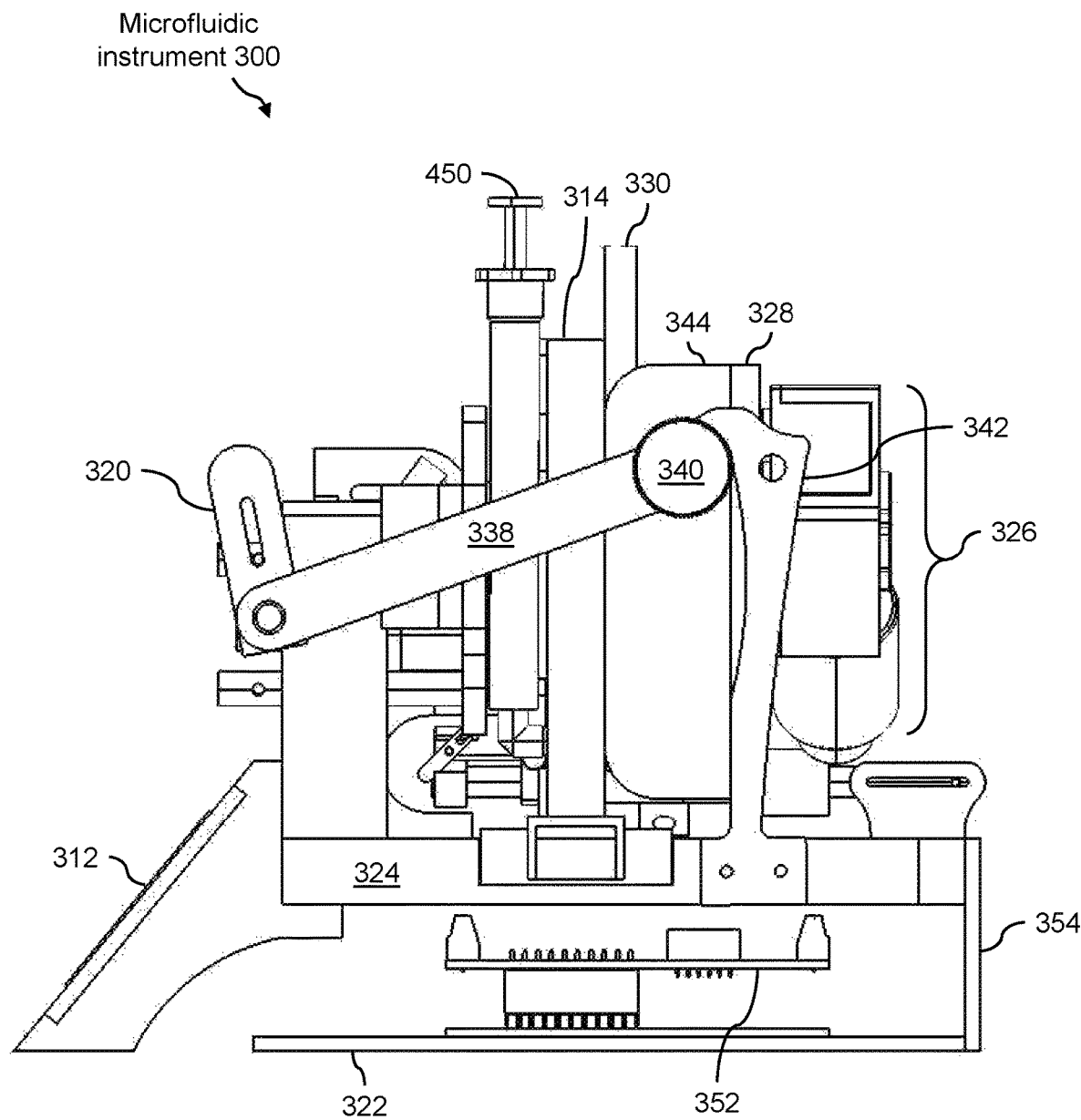
Figure 13:
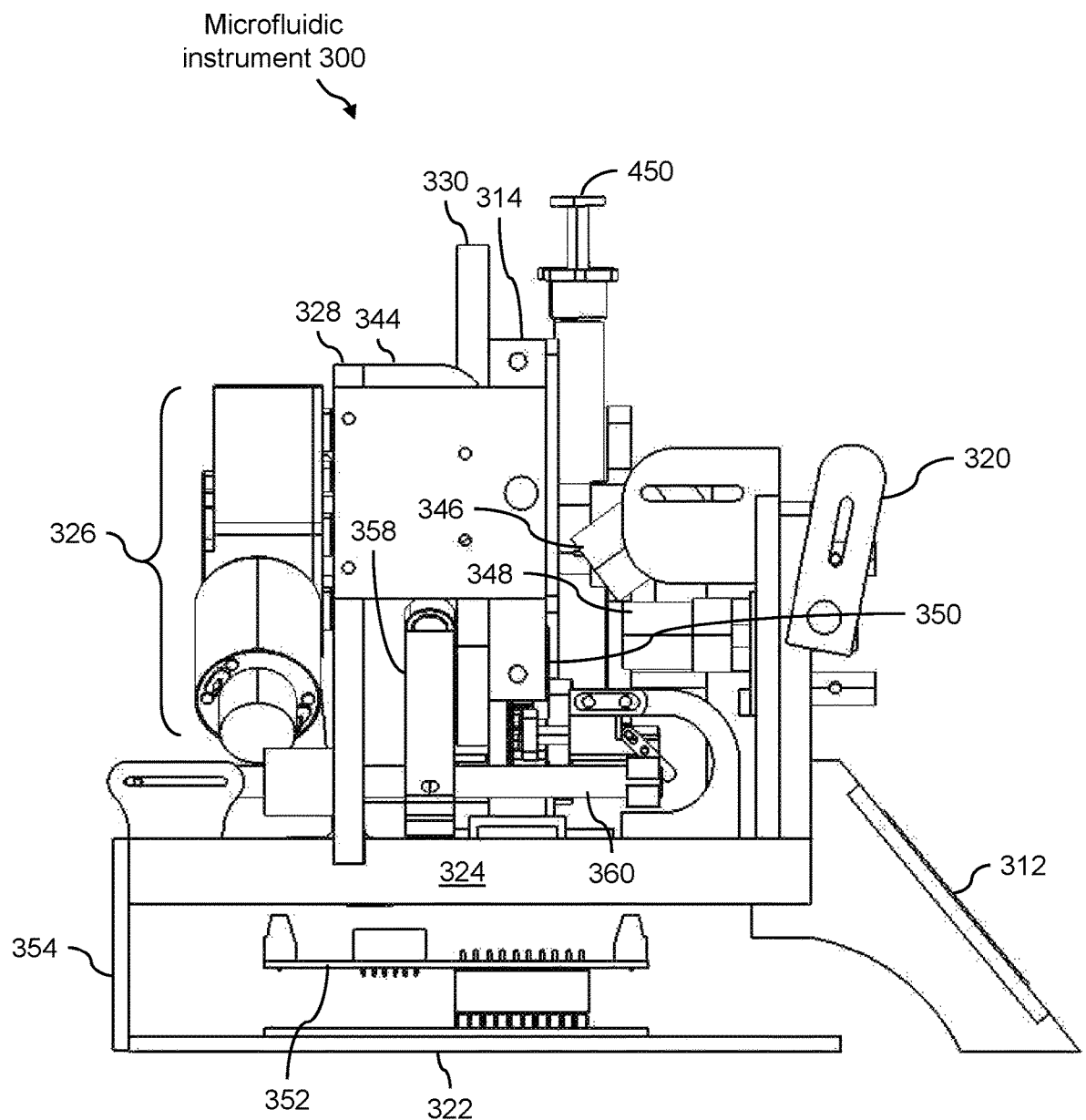
Figure 14:
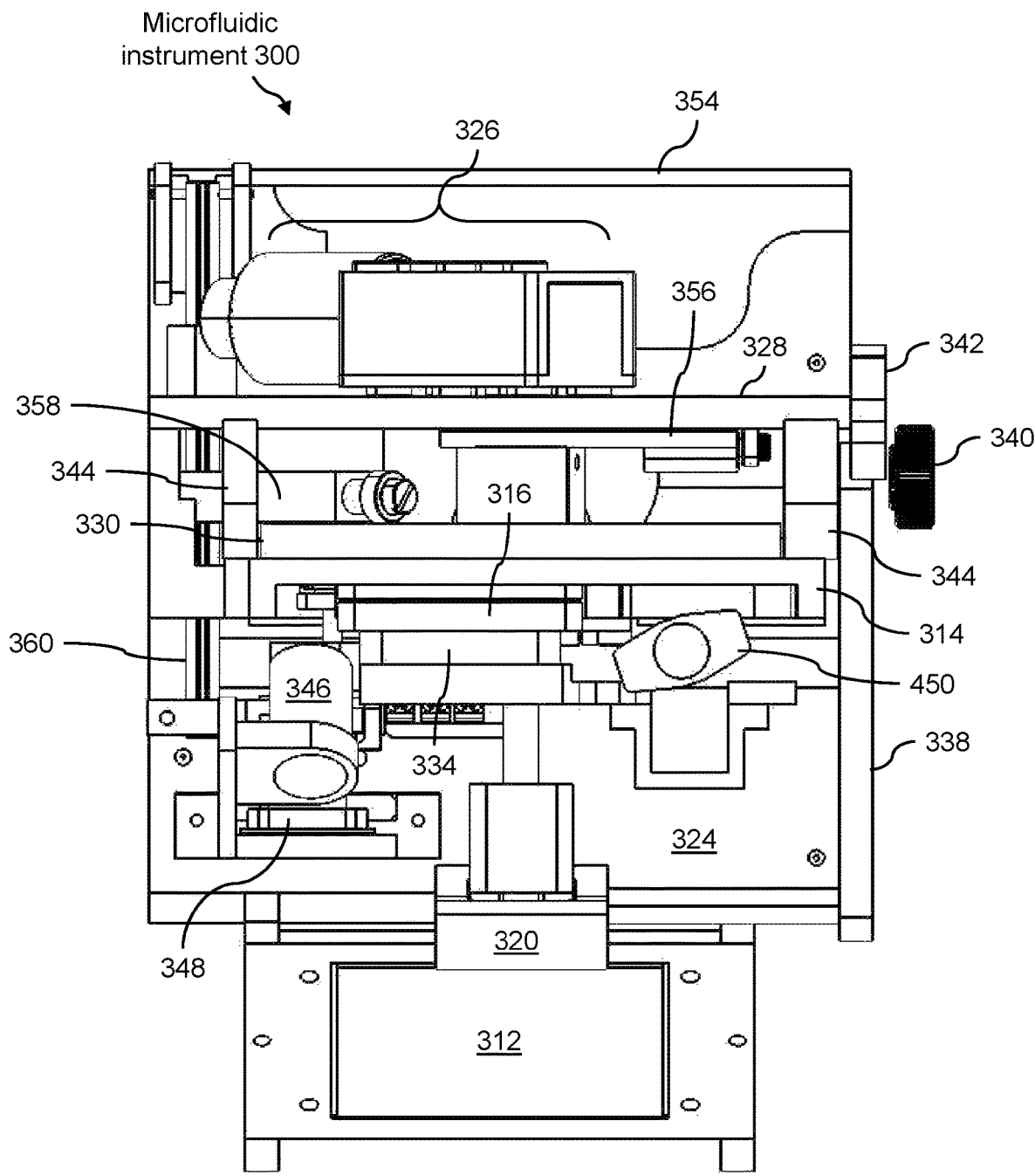
Figure 15:
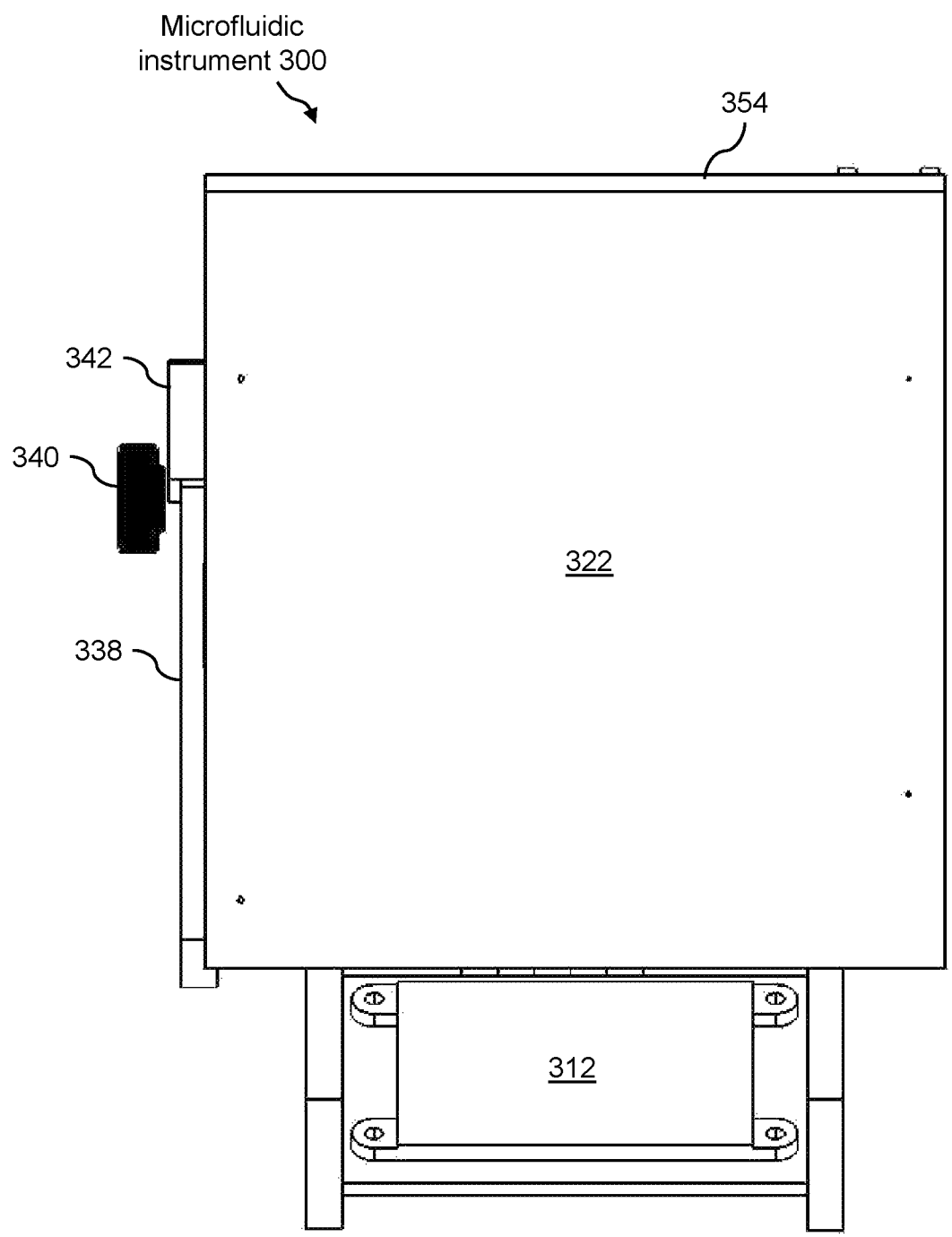

FIG. 8 is a front isometric view, FIG. 9 is a rear isometric view, FIG. 10 is a front view, FIG. 11 is a back view, FIG. 12 is a left side view, FIG. 13 is a right side view, FIG. 15 is a top view, and FIG. 15 is a bottom view of this example of microfluidic instrument 300. Several additional components are visible in these views. Namely, this example of microfluidic instrument 300 includes digital display 312, loading station 314, locking hinge 316, locking handle 318, handle shaft and yolk assembly 320, lower base plate 322, an upper base plate 324, motor assembly 326, motor plate 328, actuator plate 330 with openings 332, crusher plate 334, cam follower 358, sequential burst plunger 360, a blister crush handle 338 with a knob 340, a handle latch hook 342, loading station supports 344, an LED light source 346, a camera 348, a heater assembly 350, a control PCB 352, a power mount plate 354, and a sequential burst cam 356. Again, microfluidic instrument 300 may include a wide variety of components, such as, but not limited to, handles, plates, panels, bars, rods, shafts, brackets, blocks, spacers, hubs, collars, clamps, bushings, bearings, pins, dowels, cams, aligners, screws, nuts, bolts, washers, springs, clips, any types of mechanical connectors, any types of electrical connectors, sensors, actuators, and the like.

Further, in this example, blister crush handle 338 is coupled to crusher plate 334, which is used to rupture the frangible seals of, for example, blister packs and/or balloons on microfluidic cartridge 400 that are holding liquid (e.g., reagent solution, buffer solution, oil filer fluid, etc.) to be dispensed into microfluidic cartridge 400.

Figure 16:
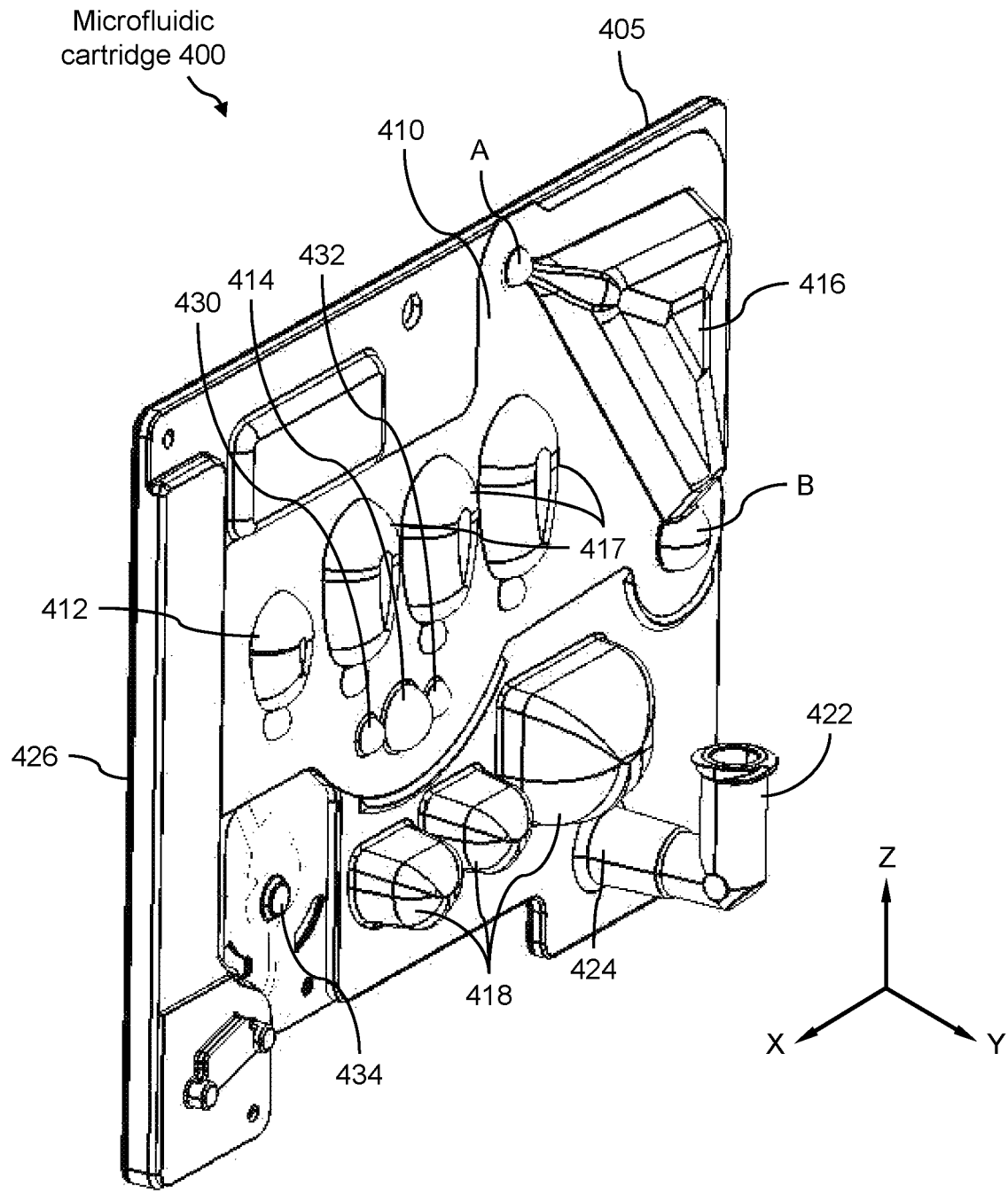
FIG. 16 through FIG. 21 illustrate various views of an example of a microfluidic cartridge for operation in the XY plane.
Figure 17:
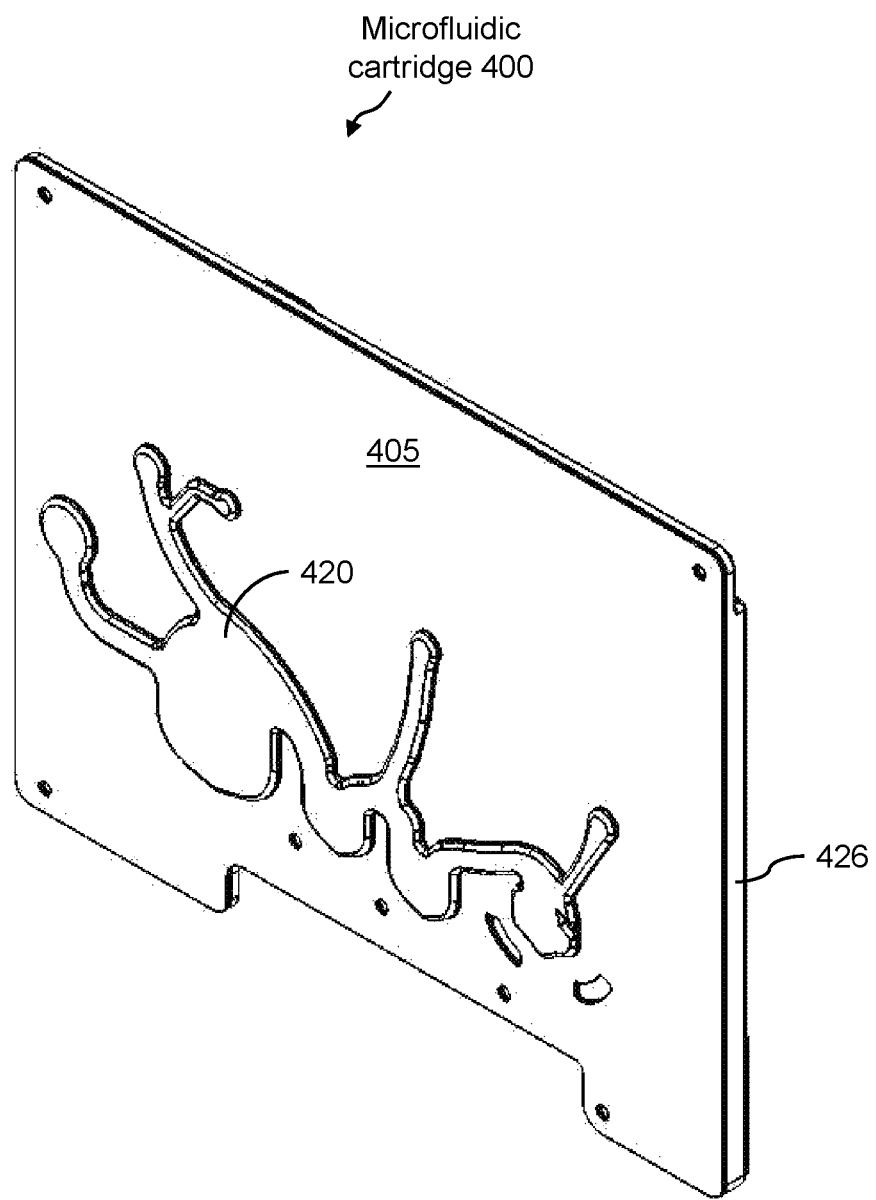
Figure 18:
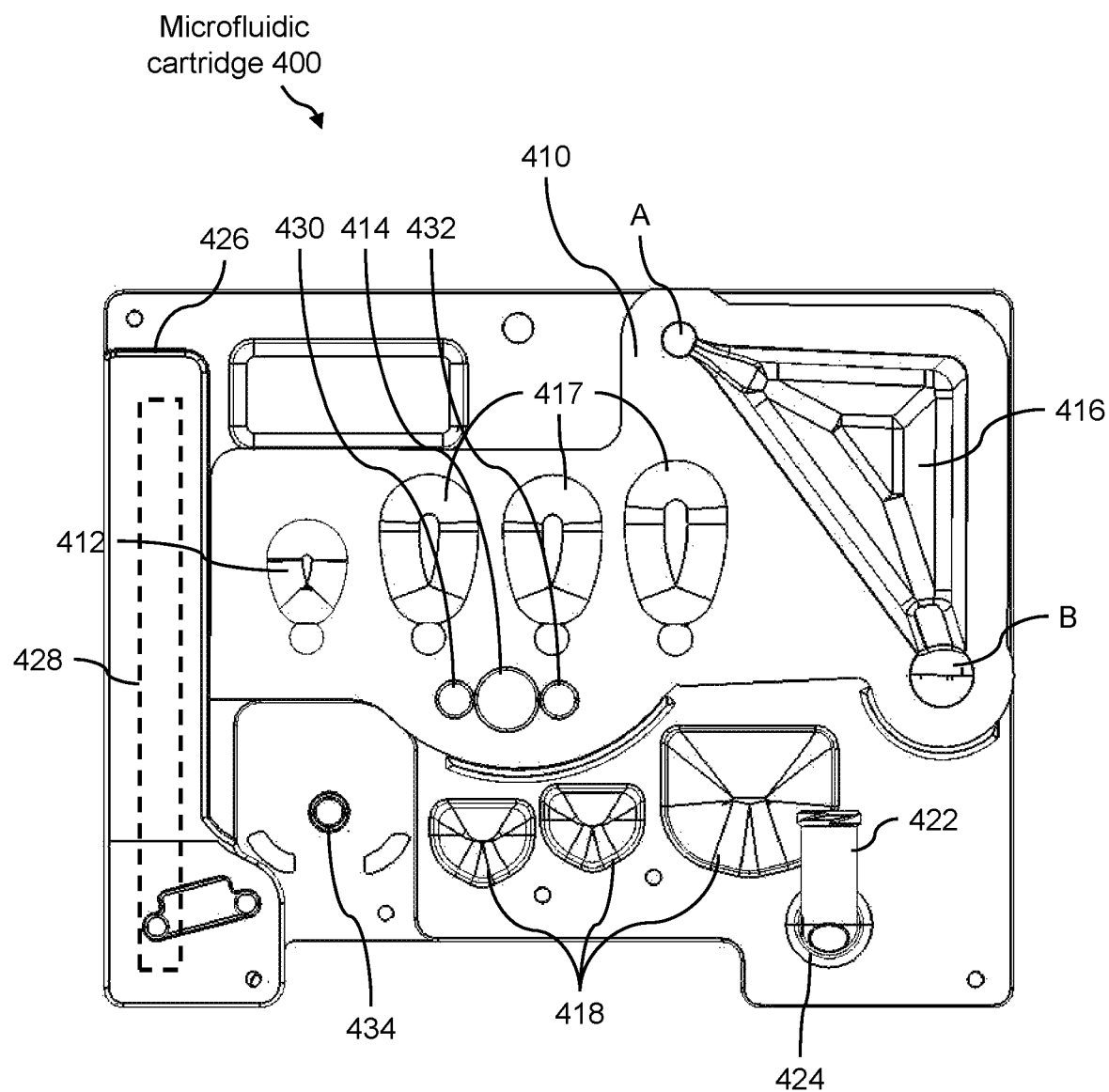
Figure 19:
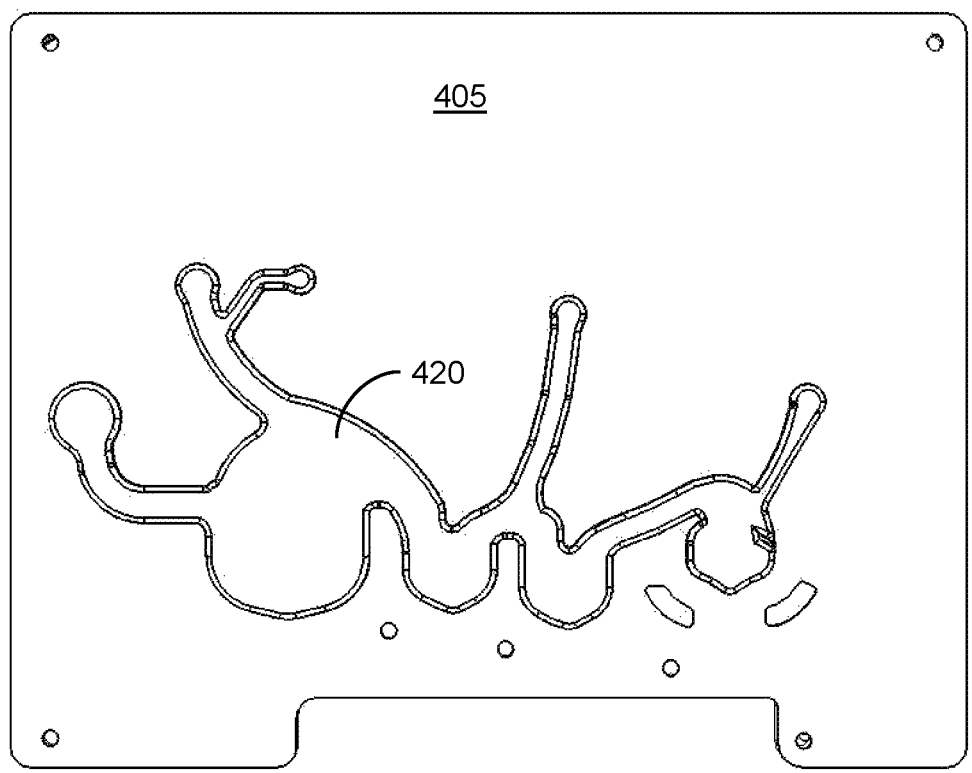
Figure 20:
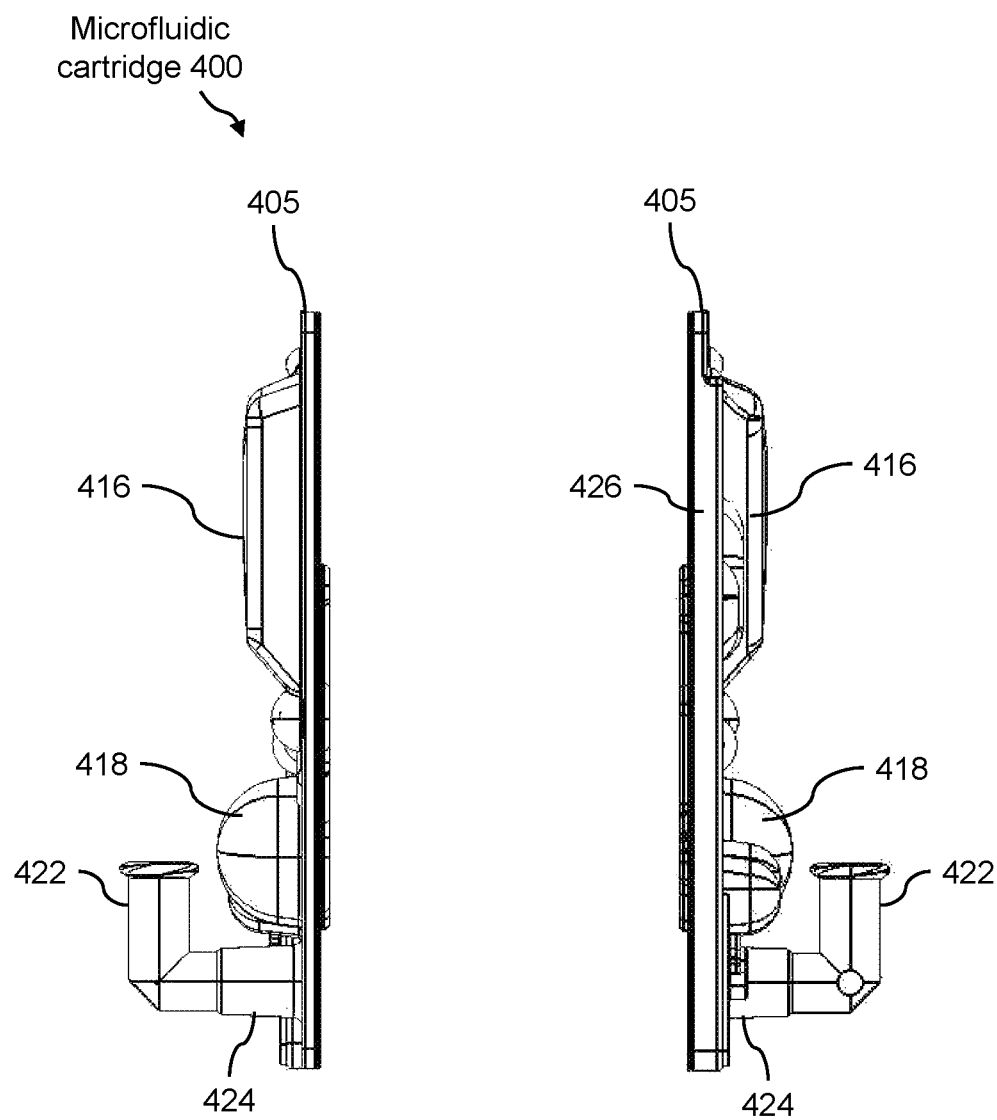
Figure 21:
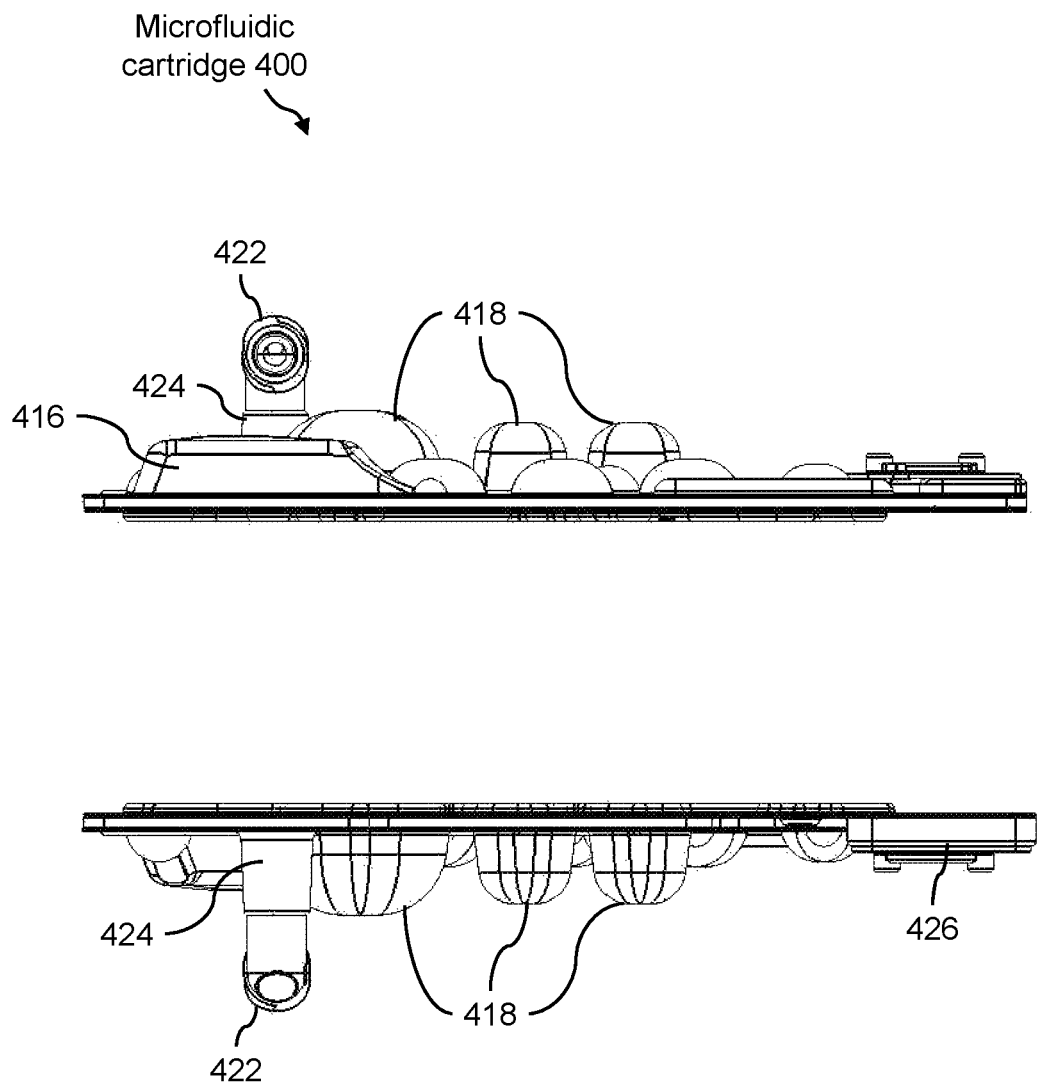

Referring now to FIG. 16 through FIG. 21 is various views of an example of microfluidic cartridge 400 for assembly and operation in the XZ plane as shown, for example, in FIG. 4, FIG. 5, and FIG. 6. Microfluidic cartridge 400 is an example of vertical microfluidic device 140 of the presently disclosed microfluidic system 100 shown in FIG. 1. In one example, Microfluidic cartridge 400 may be an NDx molecular cartridge. Namely, FIG. 16 is a front isometric view, FIG. 17 is a rear isometric view, FIG. 18 is a front view, FIG. 19 is a back view, FIG. 20 is end views, FIG. 21 is a top and bottom view of this example of microfluidic cartridge 400.

In this example, microfluidic cartridge 400 is designed to perform a sample-to-answer nucleic acid amplification test (NAAT) and includes one or more reagent pouch panels 410 including one or more individual reagent pouches 412, 414, 416 and other pouches 417 (e.g., wash buffer) that are separated from the inlets into microfluidic cartridge 400 by frangible seals; wells 418 (e.g., binding wells, wash wells), primary channel 420 (see FIG. 17) that interconnects the wells with each other, sample loading port 422, sample filter and housing 424, lateral flow strip housing 426 and lateral flow strip 428 for detecting the filled with reagents. In some embodiments the reagent pouch panel may include one or more "flow-through reagent pouches" 414, i.e., including one or more inlet ports 430 and one or more outlet ports 432, whereby upon integrating it with microfluidic cartridge 400 and rupturing the frangible seal, the sample can be dispensed into the microfluidic cartridge 400 such that it flows through the inlet port 430, into the pouch and out through the outlet port 432. Alternatively, upon integrating with microfluidic cartridge 400, the reagent from another pouch or another reservoir/well on the microfluidic device can flow through the inlet port 430, into the pouch and out to another point on the microfluidic device through the outlet port 432. In some embodiments, the flow through reagent pouch may contain a reagent whereby the liquid flowing into the inlet port mixes with and get conditioned by the contents of the flow through reagent pouch as it flows through the outlet port into the microfluidic well on microfluidic cartridge 400. Reagent pouch 414 is an example of a flow-through reagent pouch containing reagent for mixing/conditioning the reagent that flows through it. The reagent contained in the flow through pouch may be a liquid, gaseous or solid form reagent. In some embodiments, the flow-through reagent pouches may be designed such that upon integrating it with microfluidic cartridge 400 and rupturing the frangible seals, the pouch is vented through a conduit open to air on microfluidic cartridge 400 such that its contents may be emptied into microfluidic cartridge 400 through one or more outlet ports leading into the wells of microfluidic cartridge 400.

In some embodiments, inlet port 430 of the flow-through reagent pouch may be connected to an air vent or air inlet upon integration with microfluidic cartridge 400, such that air can be used to displace the fluid contained inside the flow-through reagent pouch so as to empty its contents into the microfluidic cartridge through outlet port 432 when the frangible seals have been ruptured. In some embodiments, a flow-through reagent pouch may contain an oil/immiscible reagent.

In the exemplary embodiment shown in FIG. 16 through FIG. 21, the oil/immiscible reagent is stored in a flow-through reagent pouch namely the oil/immiscible reagent pouch 416 with frangible seals and rupture balls present at two locations "A" and "B". "A" is connected to a vent (not shown) through the microfluidic cartridge and separated by the frangible seal such that it may be ruptured to open at a desired time in the assay sequence of events. "B" is connected to the primary channel 420 of the cartridge such that upon rupture of frangible seals at both points "A" and "B" the pouch is vented and the oil/immiscible liquid is released into the cartridge through the primary channel 420 such that it forms an overlay on top of the reagents in the wells and completely fills the primary channel. The oil/immiscible reagent pouch 416 is so designed such that the pressure-head inside the pouch is used to drive the reagent out of the outlet B into the primary channel 420 of the cartridge. In a unique embodiment, the flow-through aspects and the pressure head of the oil/immiscible reagent pouch 416 may be utilized to drive fluids out of one or more reagent pouches either sequentially or parallelly into microfluidic cartridge 400 through their respective outlet ports. It is important to note that in this unique embodiment, no mechanical compression forces would be required to squeeze reagents out of their pouches. Rather, the pressure head of the fluid itself or the pressure head of the oil/immiscible reagent is used to displace the reagents out of their pouches and into microfluidic cartridge 400.

In microfluidic cartridge 400, the oil/immiscible reagent pouch 416 is positioned at a higher point with respect to the wells such that a pressure head may be generated to drive the contents of the oil/immiscible reagent pouch into the wells of microfluidic cartridge 400. This method of using a pressure head to fill the viscous oil phase into microfluidic cartridge 400 results in a smooth and bubble free oil overlay phase which is critical to the performance of microfluidic devices. It is to be noted that while other forms of pressure may be applied to the pouch such as through the use of a plunger to physically deform the pouch and squeeze the contents of the oil/immiscible reagent out of the pouch, these methods involving the application of physical pressure to crush the pouch prove to be unreliable in eliminating bubbles from being created in the cartridge during the squeezing process.

Because bubbles can cause havoc in microfluidic devices, causing issues with precision and reliability such as inconsistencies in metered volume and flow of liquids, it is beneficial to use methods of fluid handling that minimize the formation of bubbles. In the case of the embodiments referred to herein, bubbles can affect the transfer and recovery of magnetic beads during sample processing, due to the creation of air pockets/bubbles along the pathway of the magnetic beads through the primary channel. While it is possible to use a debubbler such as the 3M Liqui-Cel MM Series Membrane Contactors (3M, which are inline membrane debubblers, these complicate system assembly and component requirements. Additionally, they need to be driven by a vacuum or a pressure difference to work properly.

In some embodiments, the flow-through reagent pouch may be used as a single use valve for controlling the re-direction of fluid-flow from one point on microfluidic cartridge 400 to another. The advantage of using this type of valving system for fluid handling on microfluidic cartridge 400 is the extremely reduced complexity compared to other types of valves typically used in fluid handling as well as the reduced cost for assembly and manufacturing of the flow-through reagent pouch. In the exemplary embodiment shown in FIG. 16 through FIG. 21, the flow-through reagent pouch valve 434 includes an inlet port (not shown) with rupture ball that is connected to a well on the microfluidic device and separated by a frangible seal, and an outlet port (not shown) with rupture ball, that is connected to the vent (not shown) on the microfluidic device. In this embodiment, reagent from the final well is directed to flow onto the lateral flow strip on microfluidic cartridge 400 when the flow-through reagent pouch valve 434 is ruptured at the inlet port (not shown) and the outlet port (not shown).

In some embodiments, the flow-through reagent pouch may be designed to contain an exothermic reaction that is caused when the flow-through reagent in mixed with another reagent that may be introduced into it, or when the reagent contained inside the flow-through reagent pouch is exposed to air through the vent opened by a frangible seal, to deliver electricity-free heating to a desired location on the microfluidic device. In some embodiments, one or more of the flow-through reagent pouches may be designed to contain a gas releasing chemistry such that upon integration with the microfluidic cartridge and rupture of the frangible seals, the production of the gas may be used to push the reagents out of the reagent pouches and into microfluidic cartridge 400.

The effect of the pressure head created by the layer of oil on top of the wells and in the primary channel may also be used to effectively transfer the reagent or processed sample from one point on the microfluidic device to another to perform an assay step. For example, the amplification well on the microfluidic cartridge may be connected through a flow-through reagent pouch to a lateral flow strip for detection of the amplified products; where one end of the flow-through reagent pouch may be connected to the amplification well and the other end may be connected to the sample pad of the lateral flow strip. When the two ends of the flow through reagent pouch have been ruptured, the pressure head of the oil can push the amplification products through the flow through reagent pouch to the lateral flow strip for detection. In a unique embodiment where it is desirable to selectively allow only aqueous reagents to enter the lateral flow strip and to block oil from entering lateral flow strip and affecting the assay and flow properties, an oleophilic and/or hydrophobic absorbent pad and/or a material that swells upon contact with oil may be present along the fluid path or inside the flow-through pouch. Some examples of these types of material include and are not limited to elastomers such as silicone, Ethylene Propylene Diene Modified (EPDM, EPM), Butyl, Natural rubber and the like, and selectively absorbent treated materials such as hydrophobic oleophilic absorbent pads, sorbents, nano-furs, oil wicking sponges such as polyurethane sponges coated with silane molecules, oil absorbent gels, petrogels or polyolefin-based hydrophobic absorbents and the like. Elastomeric materials are generally attacked by the oil and swell due to the lack of chemical resistance while absorbent materials can typically absorb multiple times their own weight in oil and expand during this process. This acts to selectively wick up the oil, while allowing the aqueous liquid to flow through. During this process, the material swells up or expands thereby blocking the inlet and outlet ports of the flow-through pouch and preventing oil from reaching the sample pad of the lateral flow strip.

Figure 22:
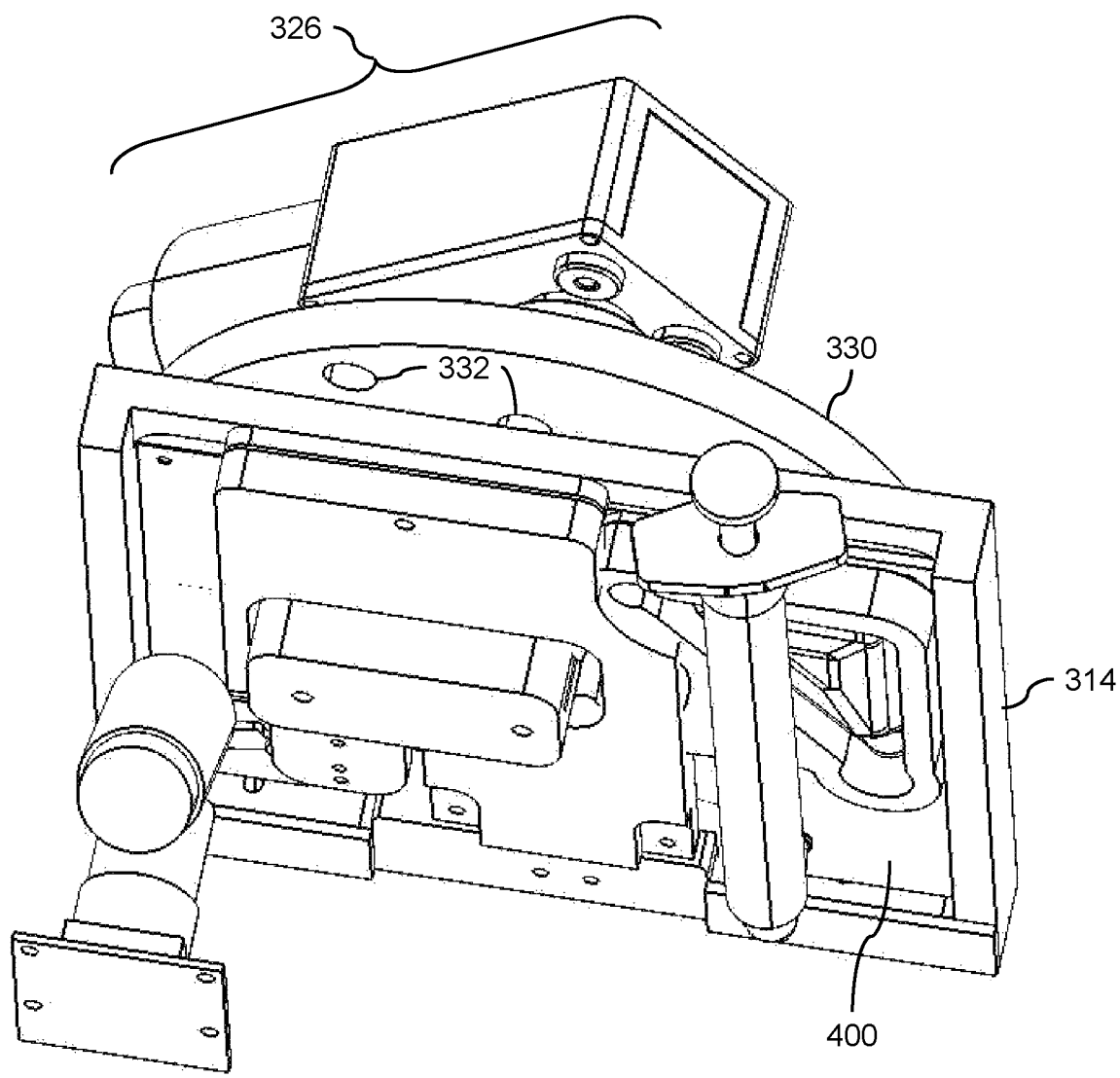
FIG. 22, FIG. 23, and FIG. 24 illustrate various views showing more details of the microfluidic cartridge in relation to an actuator plate of the microfluidic instrument for operation in the XZ plane.
Figure 23:
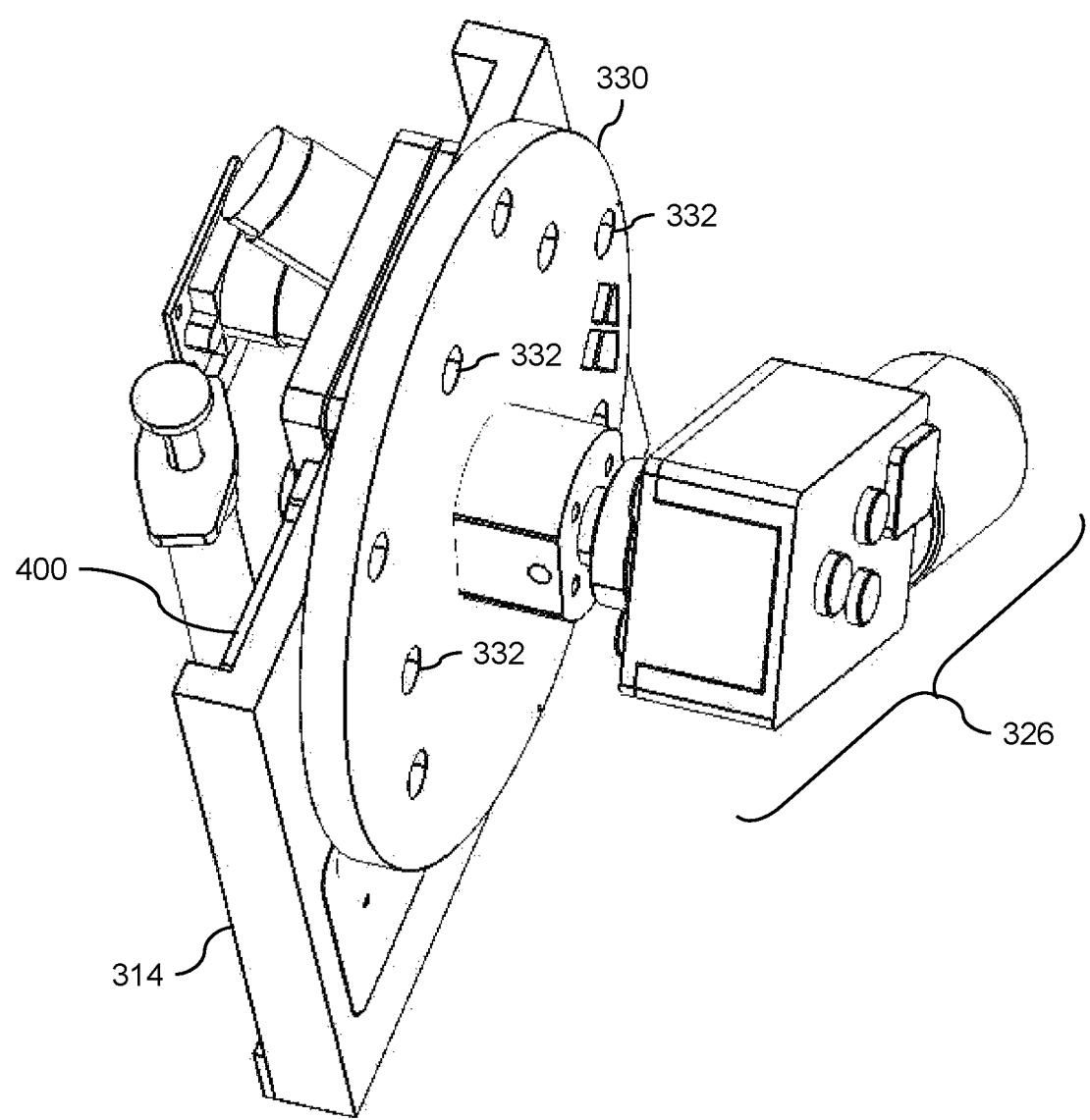
Figure 24:
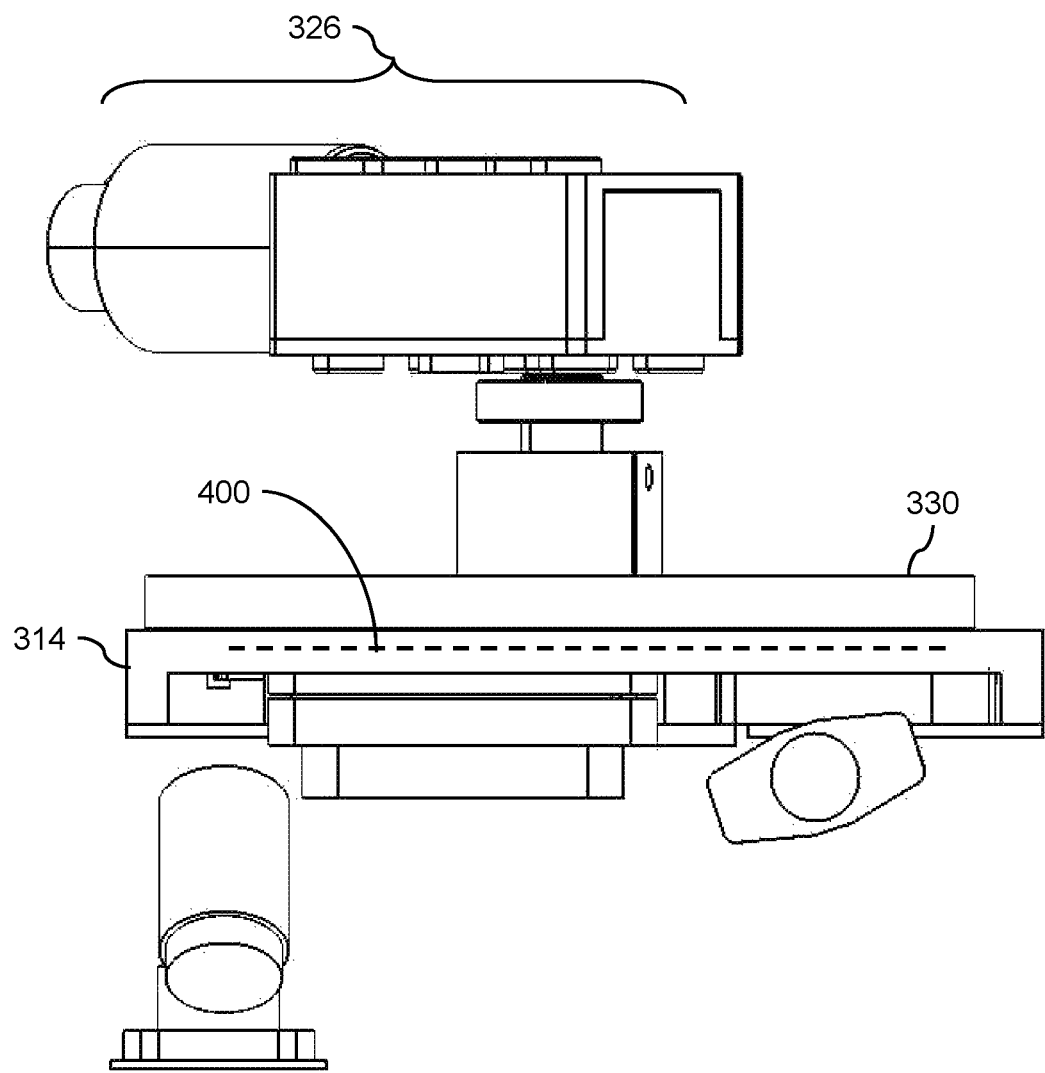

Referring now to FIG. 22, FIG. 23, and FIG. 24 is various views showing more details of microfluidic cartridge 400 in relation to actuator plate 330 of microfluidic instrument 300 for operation in the XZ plane. Namely, FIG. 22 and FIG. 23 are perspective views while FIG. 24 is a top down view or a portion of microfluidic instrument 300 shown in FIG. 8 through FIG. 15. Using motor assembly 326, actuator plate 330 is rotatable with respect to microfluidic cartridge 400, wherein microfluidic cartridge 400 is held stationary.

Referring now to FIG. 25 through 34 is plan views showing a process of using the rotatable actuator plate 330 of microfluidic instrument 300 in relation to a vertically oriented microfluidic cartridge, wherein the rotatable actuator plate 330 includes spatially oriented magnets. The process shown in FIG. 25 through 34 is an example, of magnetic bead-based sample processing. "Magnetic beads" or "beads" means magnetically responsive beads. The process uses a microfluidic cartridge 500 in relation to actuator plate 330, wherein microfluidic cartridge 500 is a general representation of a microfluidic cartridge for illustration purposes only.

In this example, on-chip magnetic bead-based sample processing is performed using a single rotational motion of actuator plate 330 during which capture, resuspension, and transfer of magnetic beads takes place. This is achieved using actuator plate 330 that includes spatially oriented magnets as shown in FIG. 25 through 34. Namely, actuator plate 330 includes magnets 1, 2, 3, 4, 5, 6, and 7.

The primary channel of microfluidic cartridge 500 connects one well to another. In this example, the primary channel has features on it called baffles which act as a physical barrier to constrain the magnetic particles in a desired location and prevent them from moving towards a magnetic field. These baffles trap the magnetic bead particles when the transfer magnets (2, 4, 6) move them from one well to the next. The reagent capture/resuspension magnets (3, 5, 7) pulls the beads down into the well such that they are suspended in the reagent in that well. Magnet 1 is an additional magnet that is used to capture the beads in the first well and collect them midway in the well such that they may be easily captured by magnet 2 and transferred to well 2 through the primary channel. The primary channel and walls of the wells that come in contact with the magnetic beads are coated with a hydrophobic coating such as a fluoroacrylic copolymer. This may be selected from the FluoroPel™ family of hydrophobic coatings manufactured by Cytonix LLC (Beltsville, MD). This coating may also be a fluorinated polymer coating such as the 3M Novec family of fluorinated polymer coatings, e.g., Novec—1908 clear coating or FPC manufactured by Electrolube.

FIG. 25 through 34 depict the steps for magnetic bead-based sample processing using a rotating actuator plate (e.g., actuator plate 330) that is rotating counter-clockwise as follows. It is noted that the motor (not shown) that is driving actuator plate 330 can also rotate clockwise to reuse magnets.

Figure 25:
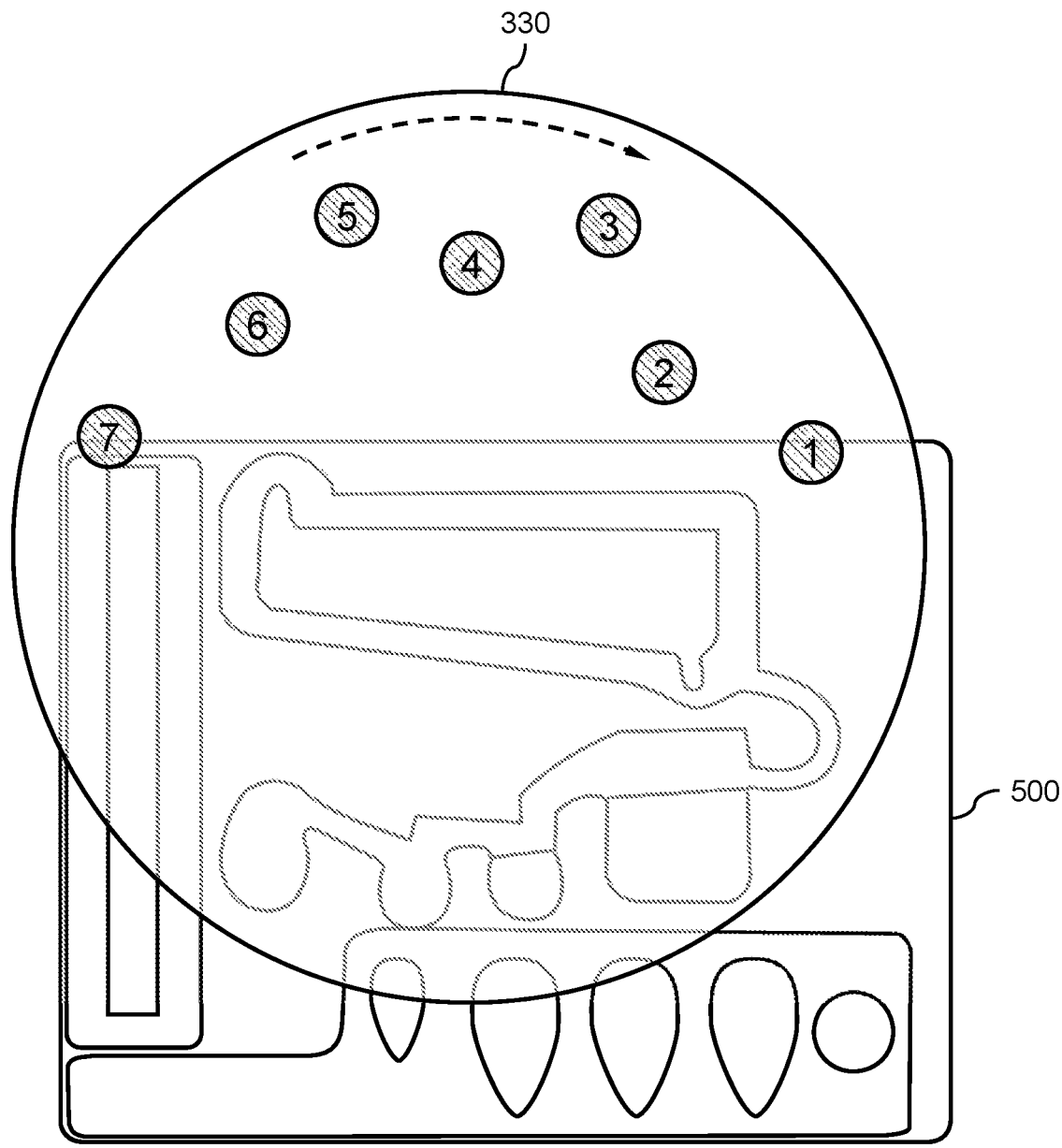
FIG. 25 through 34 illustrate plan views showing a process of using the rotatable actuator plate of the microfluidic instrument in relation to a vertically oriented microfluidic cartridge, wherein the rotatable actuator plate includes spatially oriented magnets.

At a home or neutral position, FIG. 25 shows magnets 1-7 are positioned away from the processing area of microfluidic cartridge 500 to avoid interaction during filling.

Figure 26:
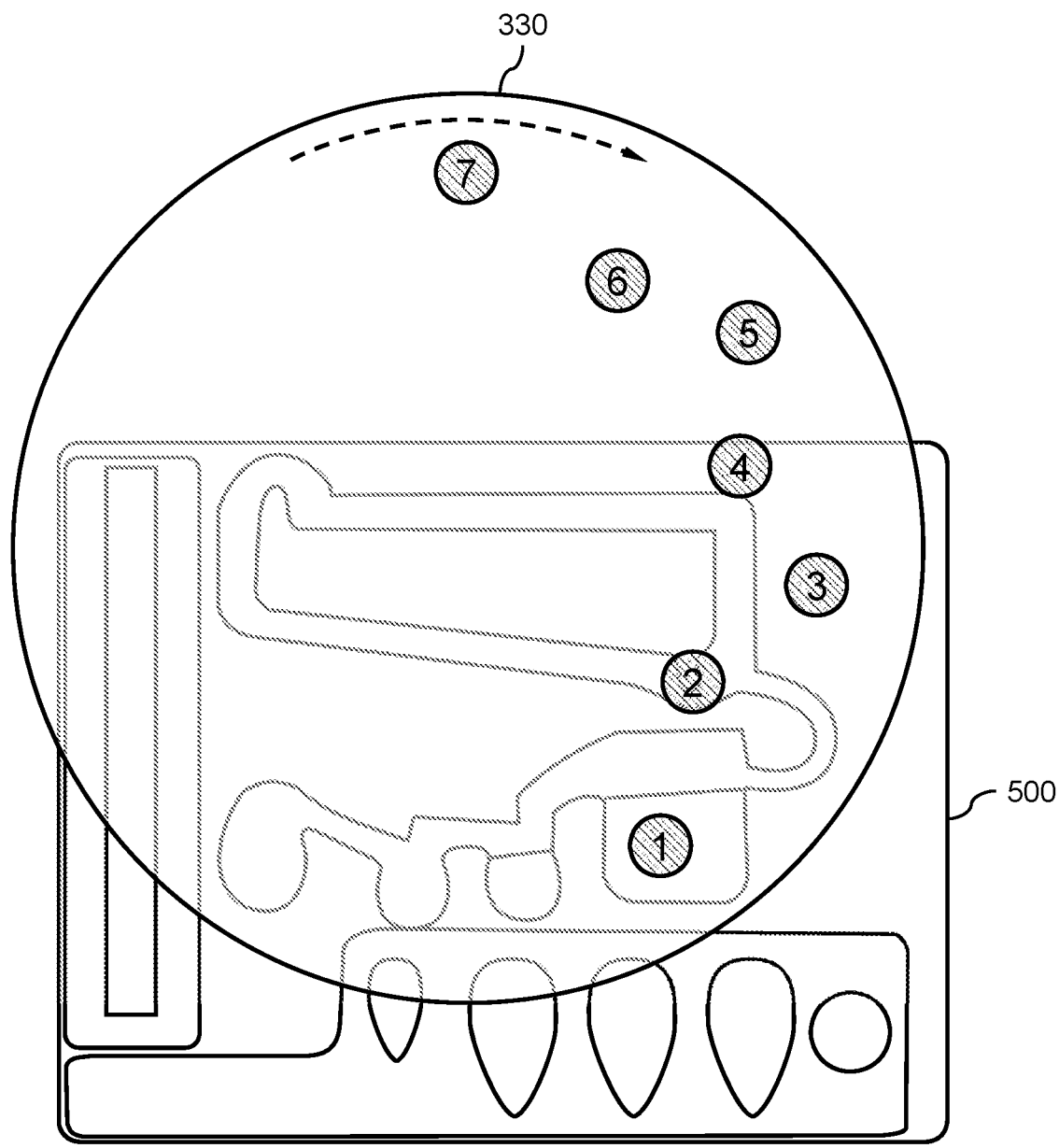
Figure 27:
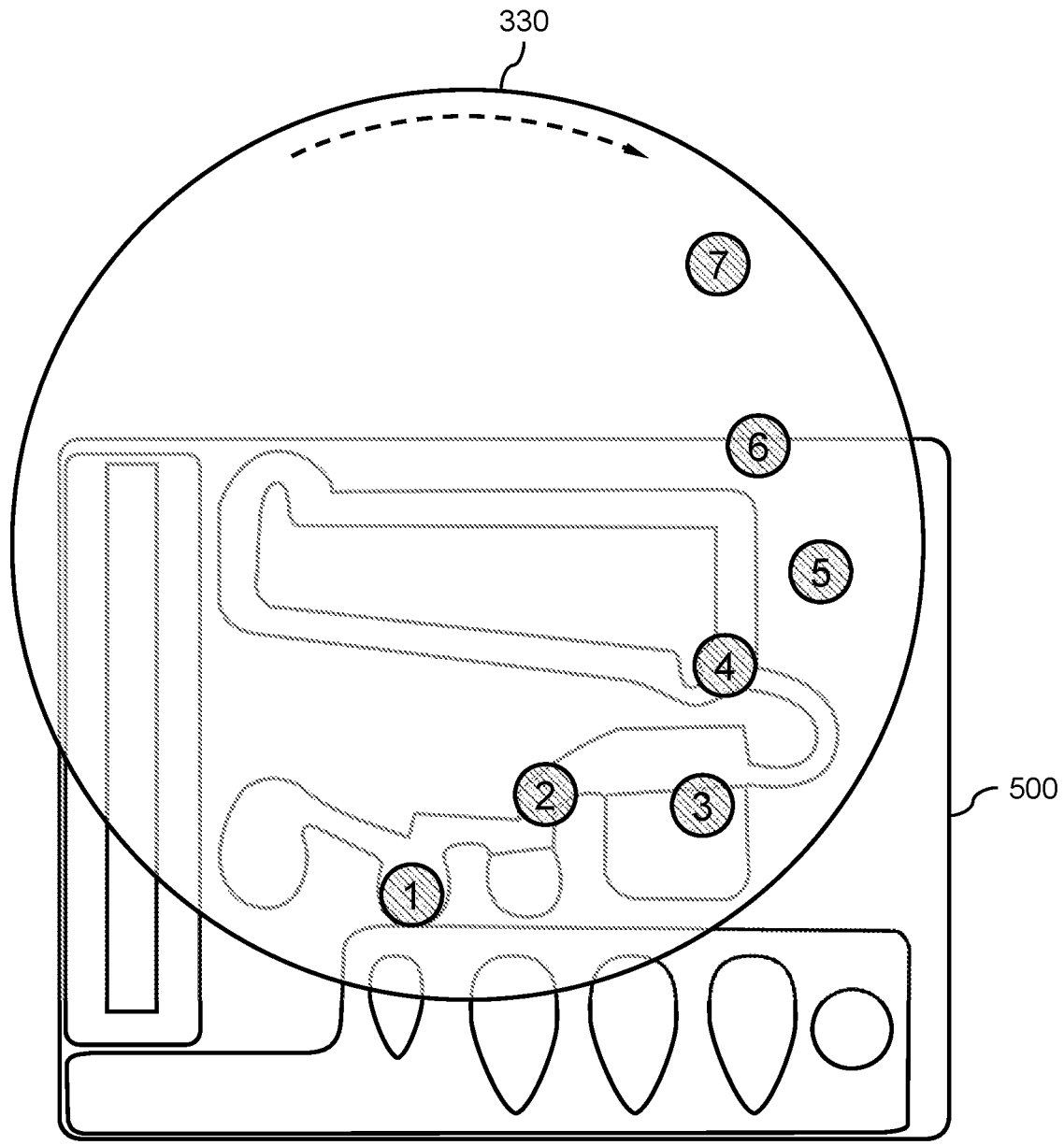
Figure 28:
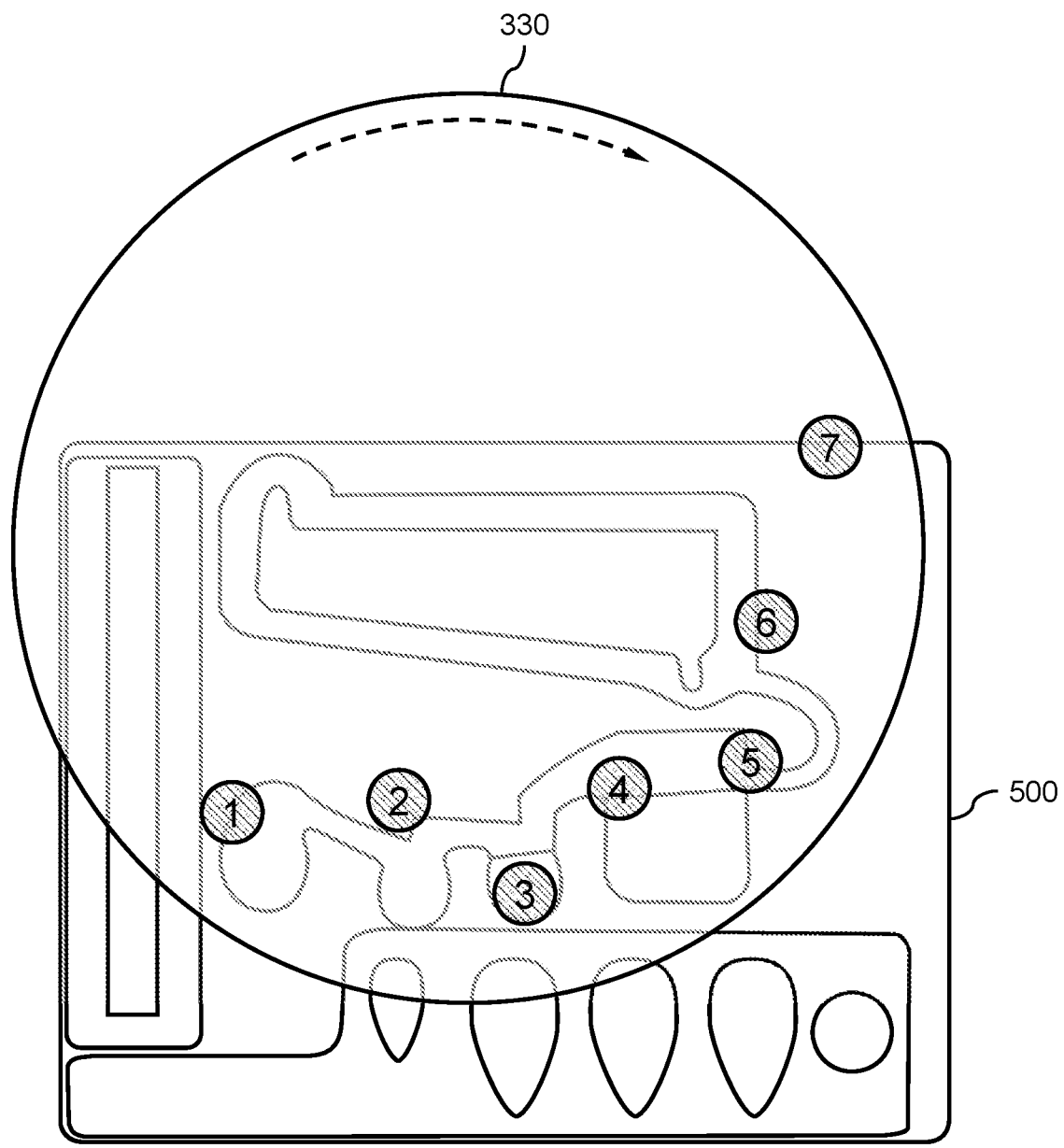
Figure 29:
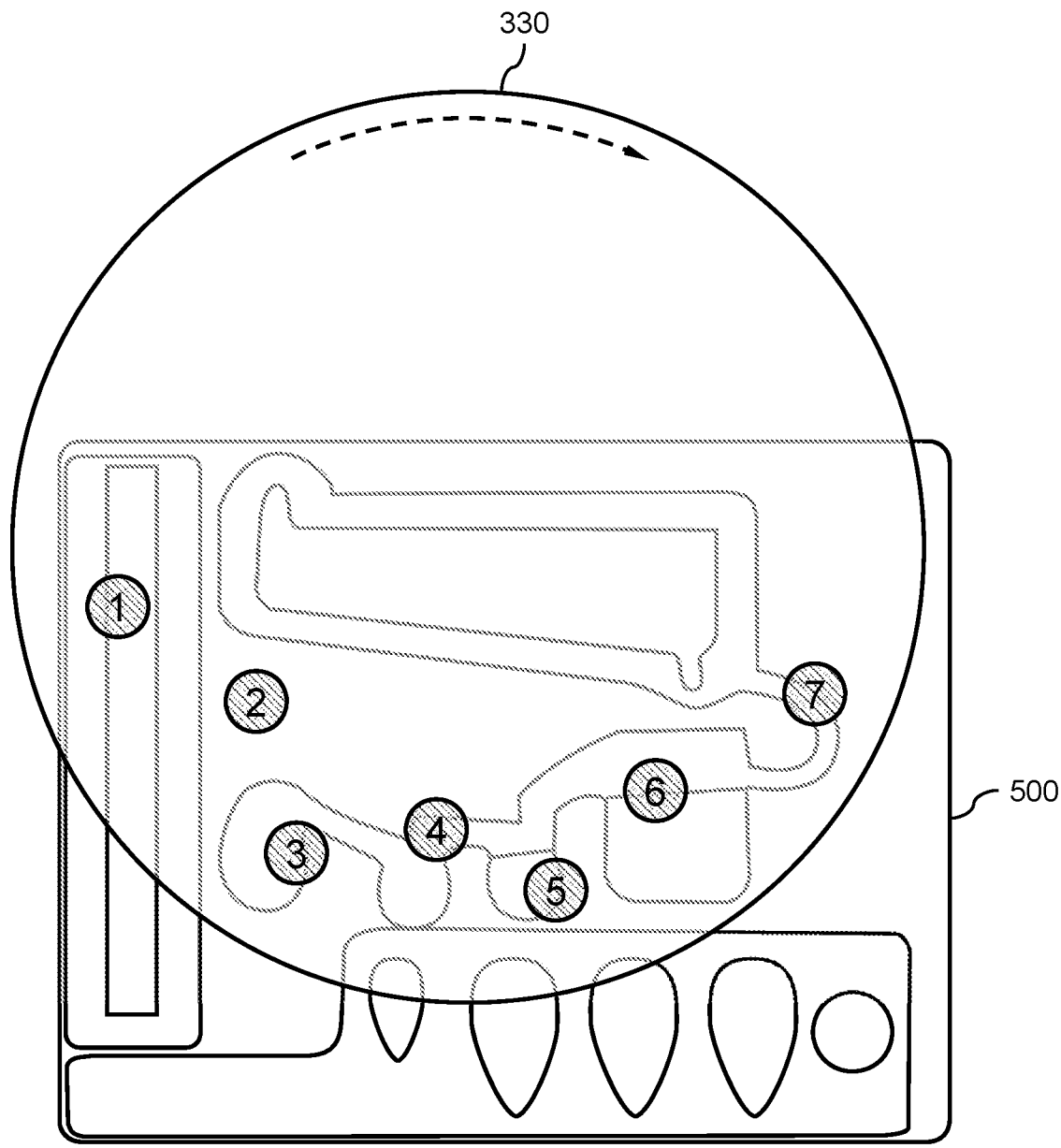
Figure 30:
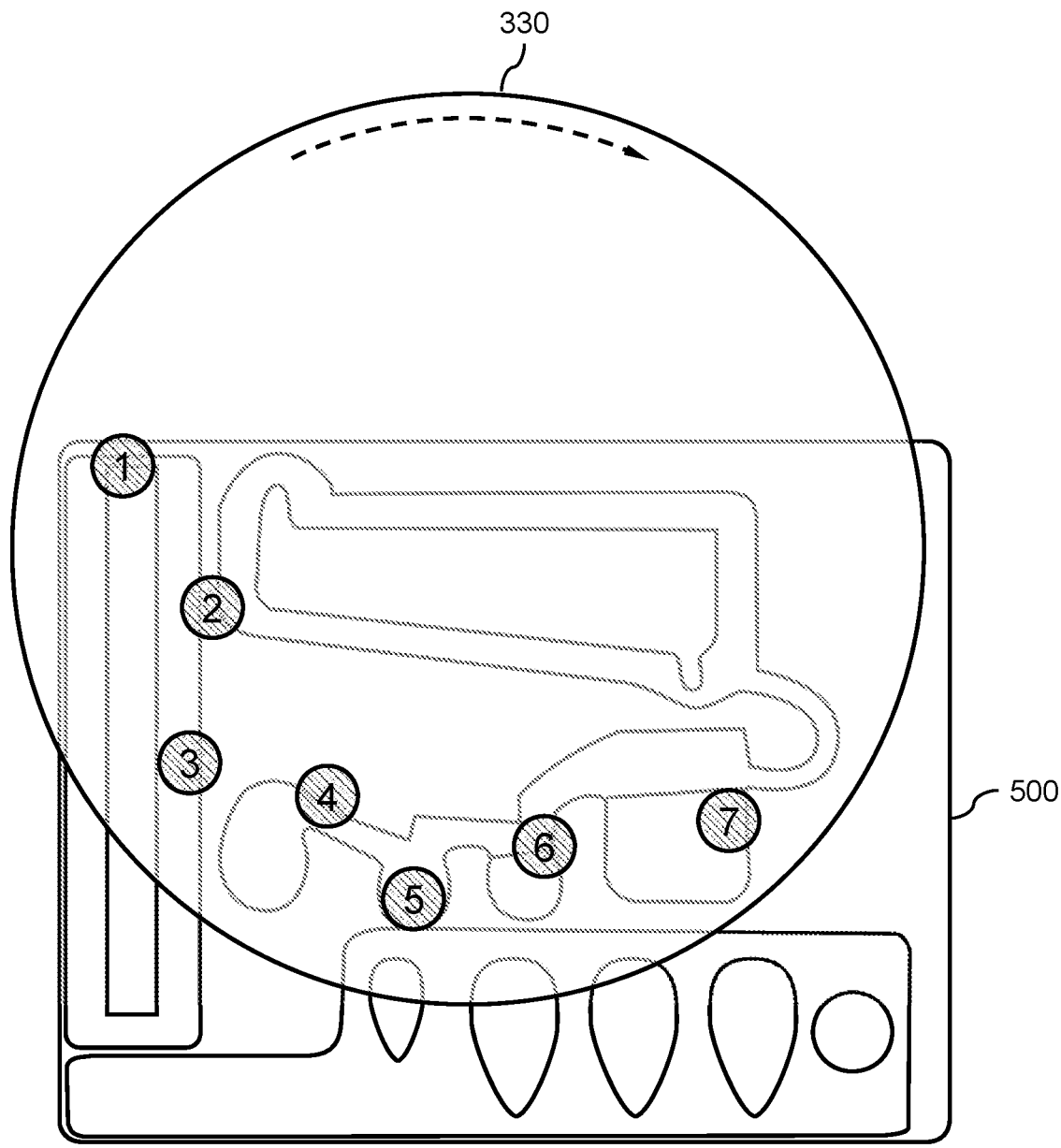
Figure 31:
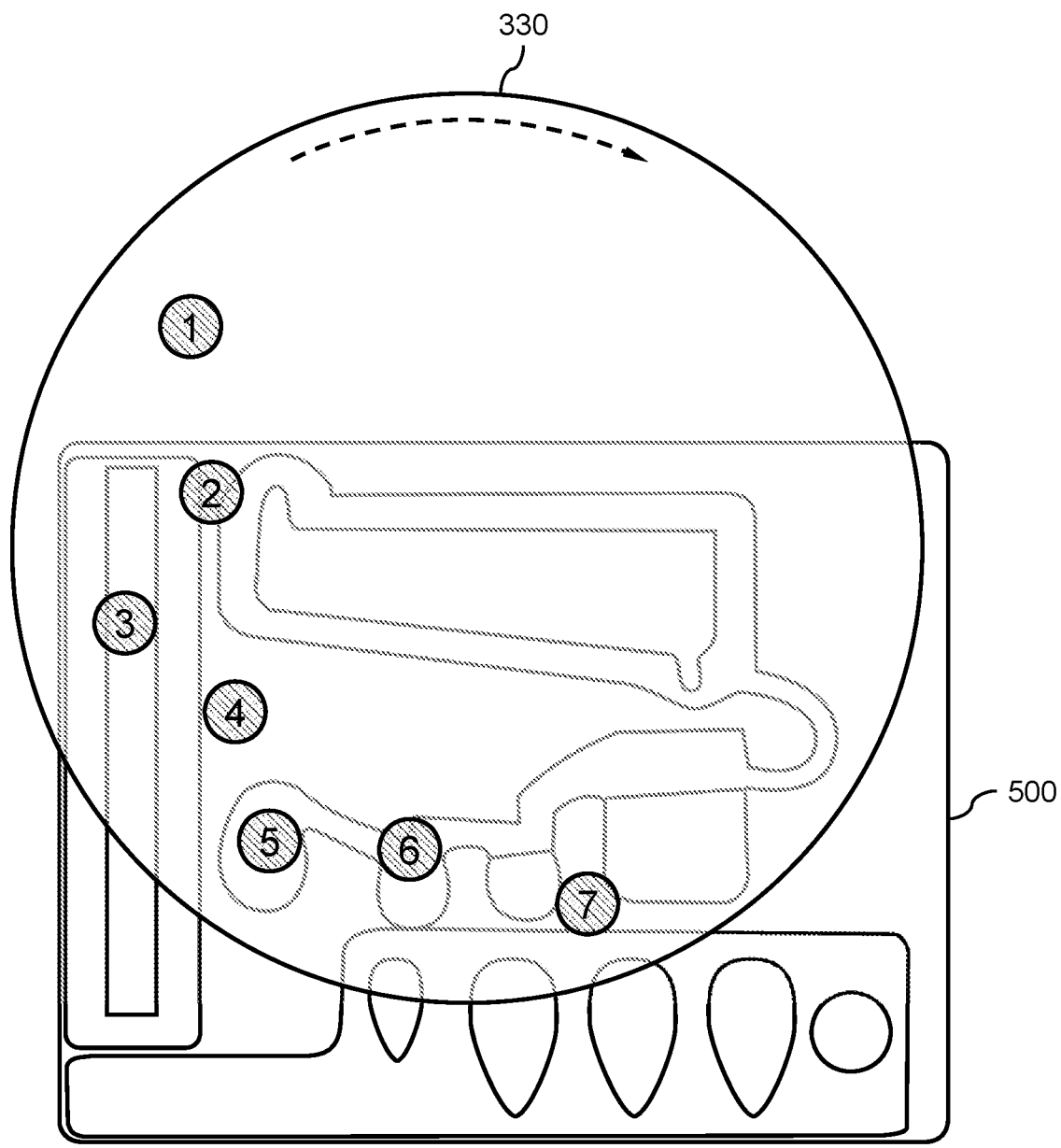
Figure 32:
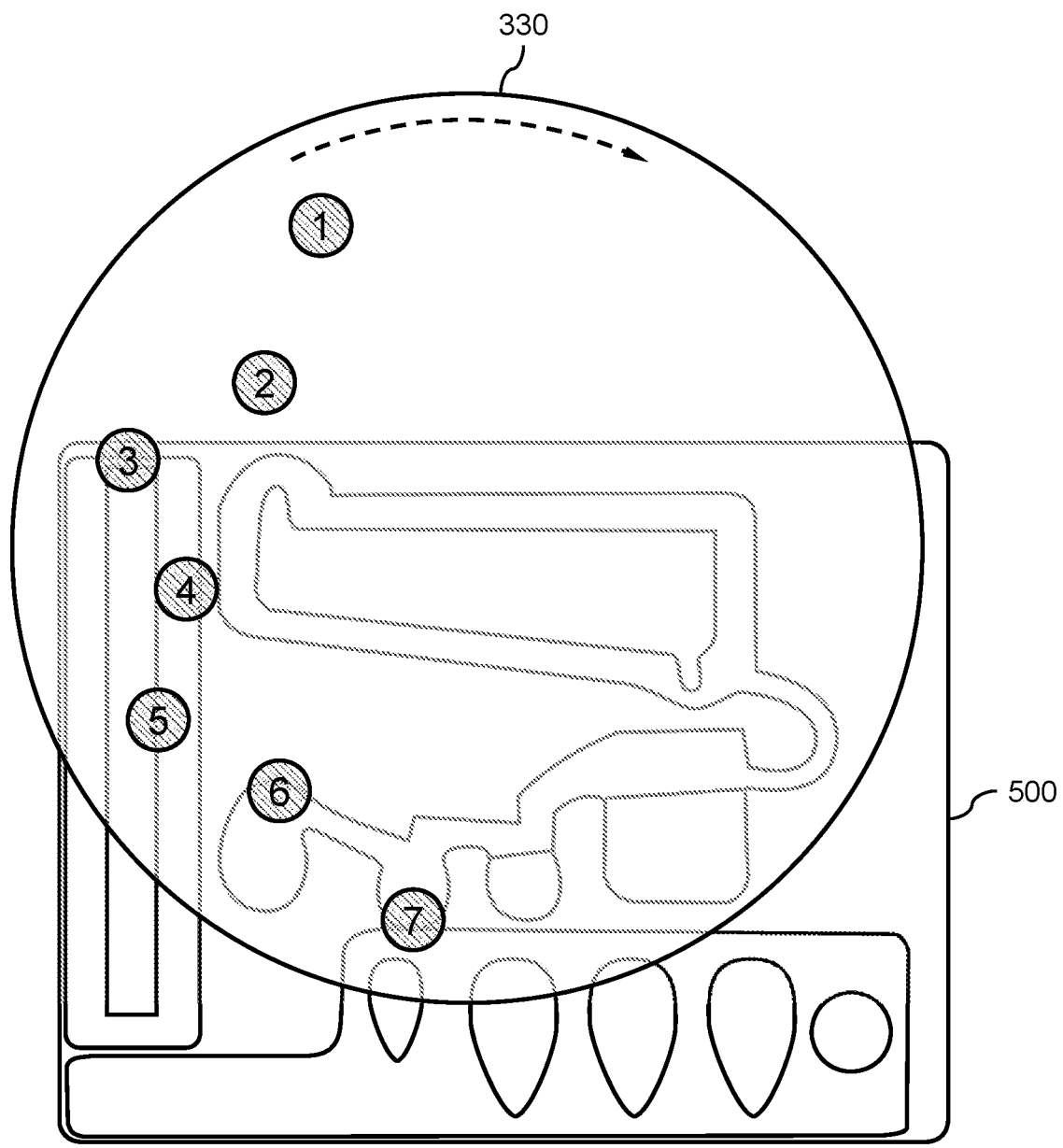
Figure 33:
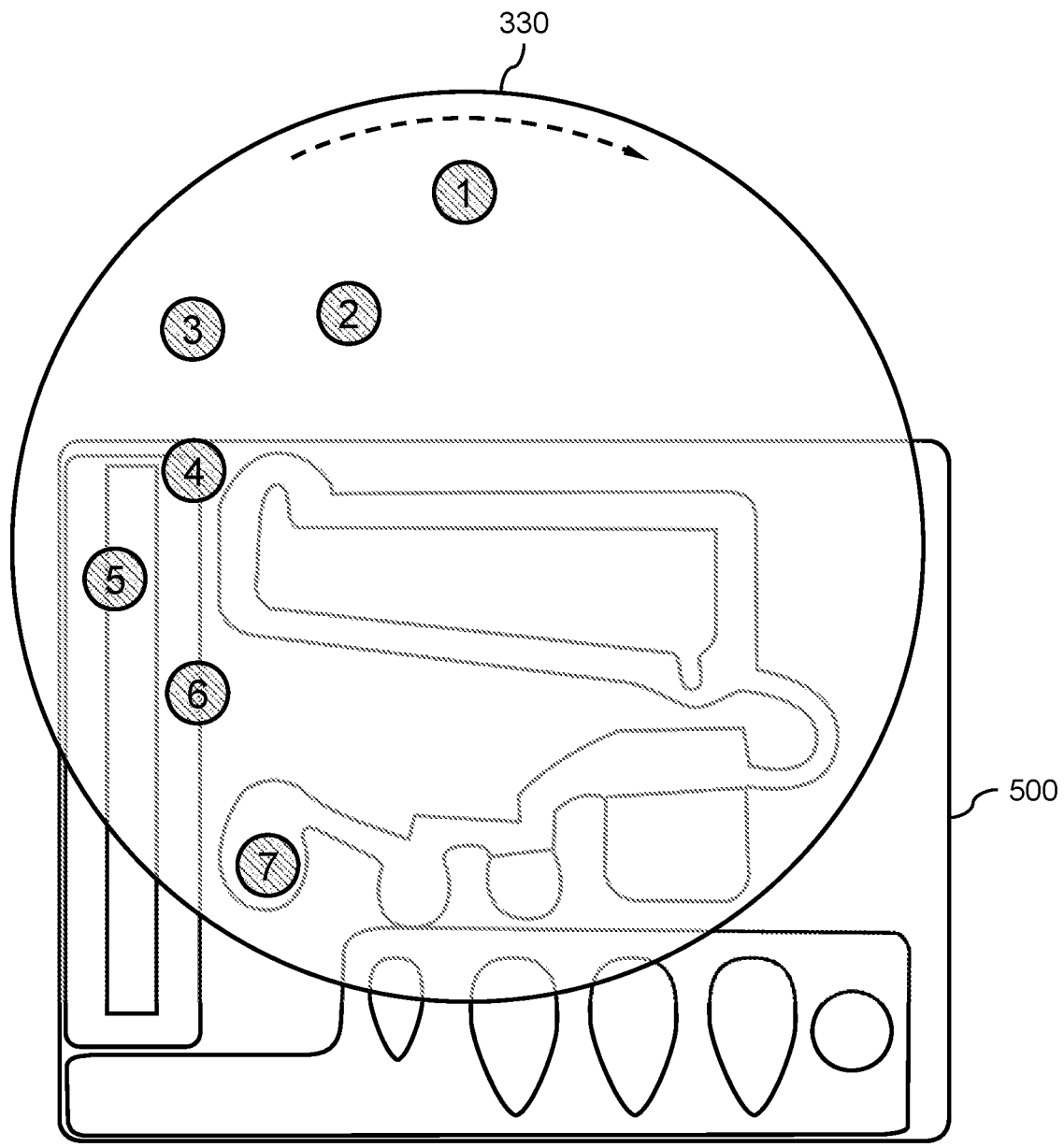
Figure 34:
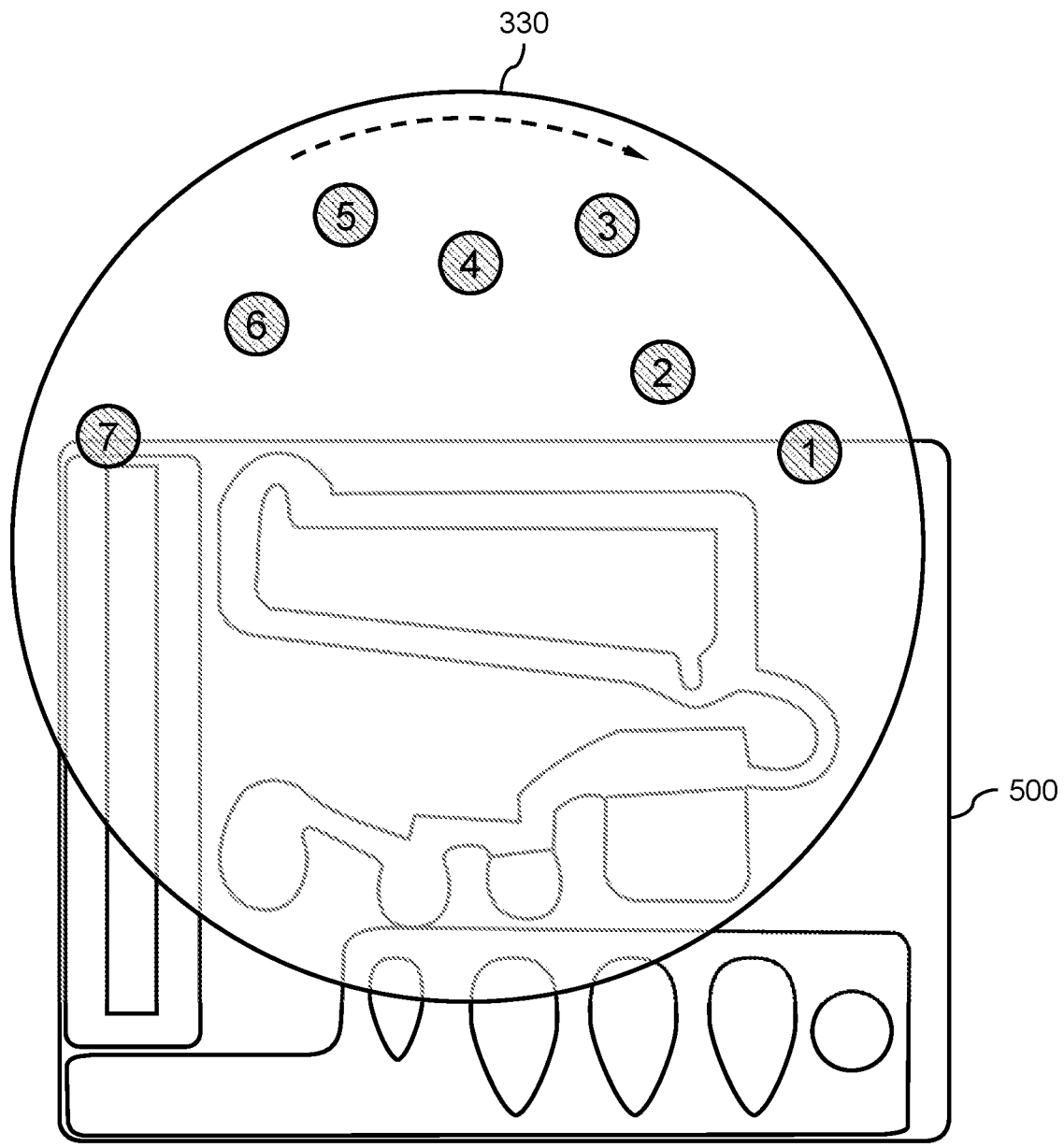

Next, in FIG. 26, magnet 1 captures beads in a first well.
Next, in FIG. 27 magnet 2 pulls beads into primary channel to first baffle.
Next, in FIG. 28 magnet 3 pulls beads into second well.
Next, in FIG. 29 magnet 4 pulls beads into primary channel to second baffle.
Next, in FIG. 30 magnet 5 pulls beads into third well.
Next, in FIG. 31 magnet 6 pulls beads into primary channel.
Next, in FIG. 32 magnet 6 pulls beads through primary channel to third baffle.
Next, in FIG. 33 magnet 7 pulls beads into fourth well.
Next, in FIG. 34 magnets are returned to the home position.

Figure 35:
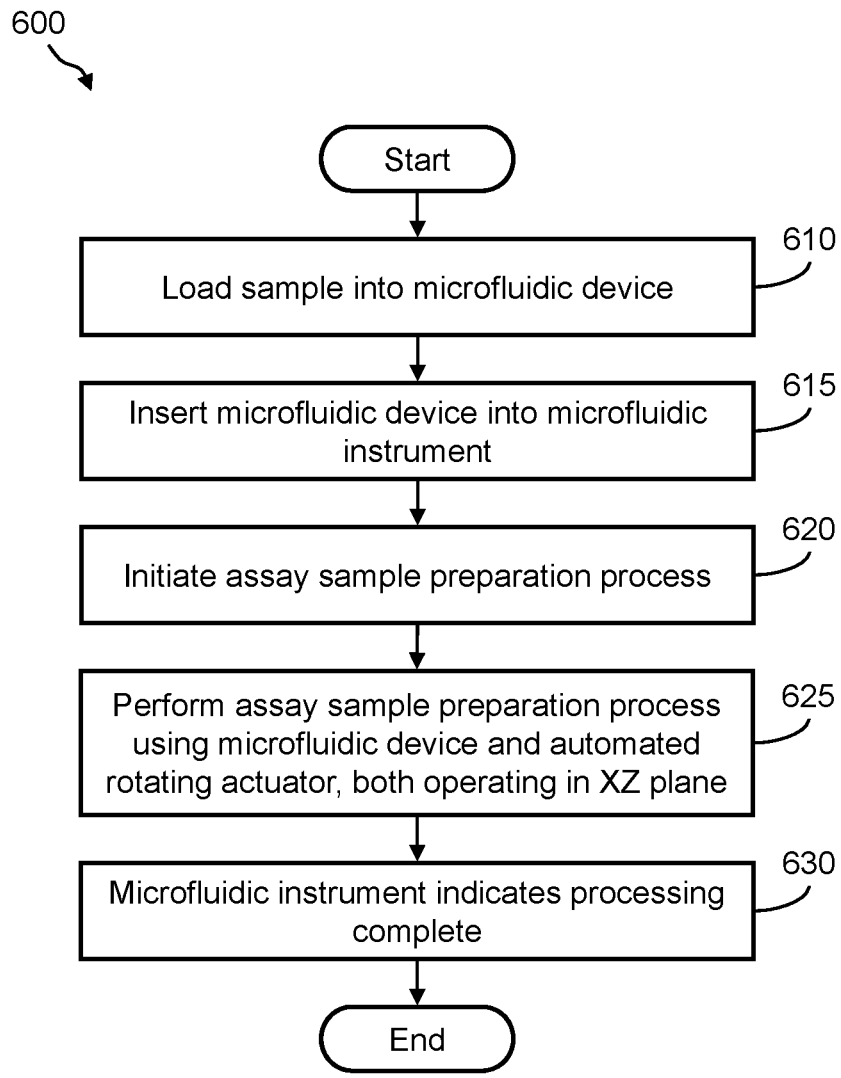
FIG. 35 illustrates a flow diagram of an example of a method of using the presently disclosed microfluidic system.

FIG. 35 illustrates a flow diagram of an example of a method 600 of using the presently disclosed microfluidic system 100. Method 600 of is an example of a sample-to-answer sequence of operation, wherein the dispensing of reagents is completed during the simple loading of the cartridge process completed by the user. Method 600 takes advantage of the user loading the microfluidic cartridge into the microfluidic instrument to actuate the reagent pouches. Method 600 may include, but is not limited to, the following steps.

At a step 610, the sample is loaded it the microfluidic device. For example, syringe 450 containing a sample fluid is coupled to loading port 422 of microfluidic cartridge 400 as shown, for example, in FIG. 5 and FIG. 6. Then, the sample is dispensed into microfluidic cartridge 400.

At a step 615, the microfluidic device is inserted into the microfluidic instrument. For example, microfluidic cartridge 400 is inserted into loading station 314 of microfluidic instrument 300 as shown, for example, in FIG. 4, FIG. 5, and FIG. 6. Then, locking handle 318 or blister crush handle 338 of microfluidic instrument 300 is clamped shut, thereby crushing and dispensing the required reagents into the respective wells on the cartridge.

At a step 620, the assay sample preparation process is initiated. For example, a user inputs a "Start" command by pressing a button on microfluidic instrument 300 to begin the assay sample preparation, amplification, and lateral flow-based detection steps.

At a step 625, the assay sample preparation process is performed using the microfluidic device and the automated rotating actuator, both operating in the XZ plane. For example, the assay sample preparation process is performed using microfluidic cartridge 400 and the automated rotating actuator plate 330 in microfluidic instrument 300, both operating in the XZ plane. An example of a sequence operating in the XZ plane, is the process steps described hereinabove with reference to FIG. 25 through FIG. 34.

At a step 630, the microfluidic instrument (e.g., microfluidic instrument 300) indicates that processing is complete. For example, the user is alerted by audible instrument or mobile notification when the assay results are ready. The results may be displayed to the user either on a mobile phone or directly on, for example, digital display 312 of microfluidic instrument 300.

Working Principle of the On-Chip Sample-to-Answer NAAT

Figure 36:
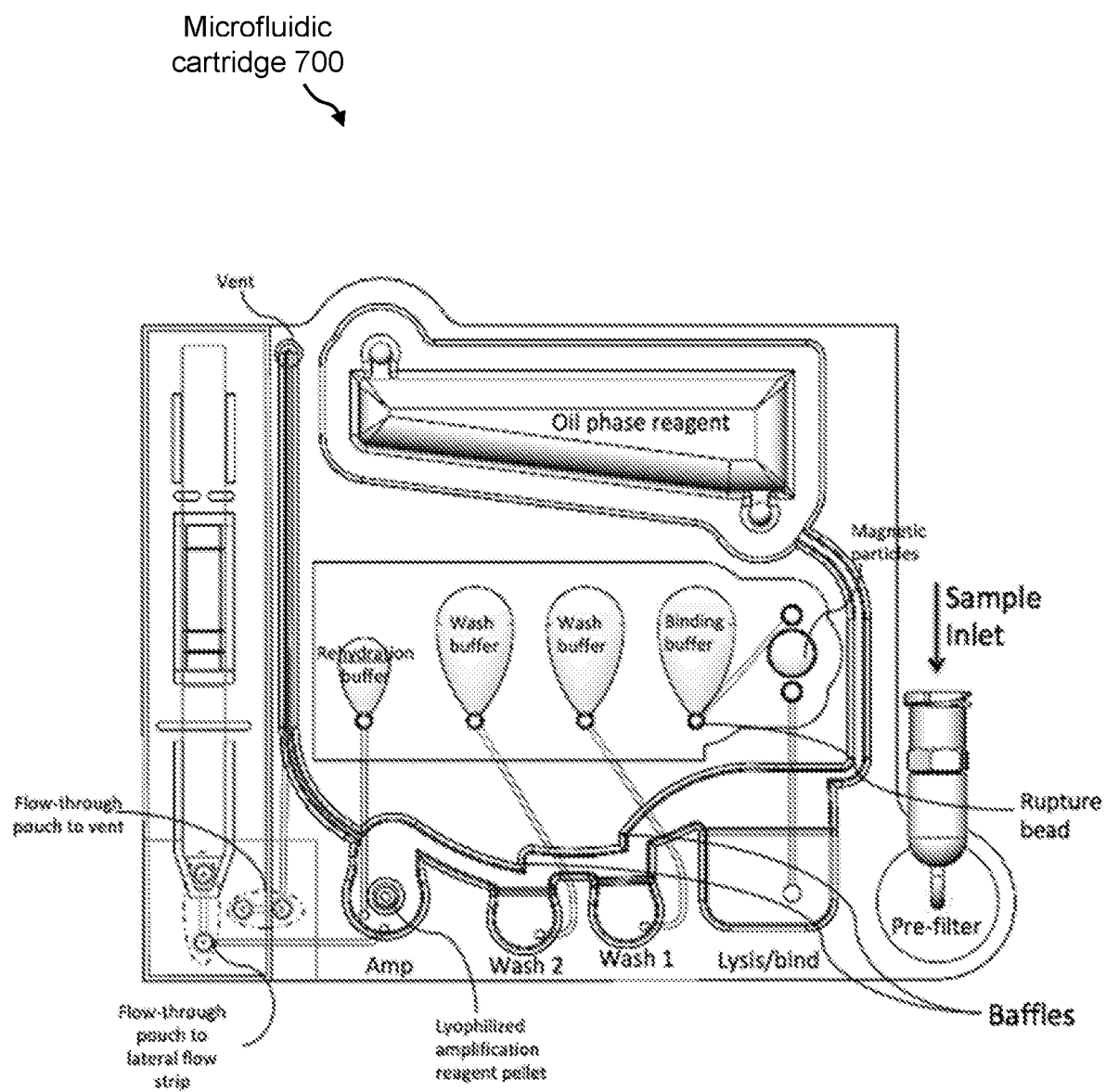
FIG. 36 illustrates a plan view of an exemplary microfluidic cartridge for demonstrating the working principle of the on-chip Sample-to-Answer NAA.

With reference to an exemplary microfluidic cartridge 700 shown in FIG. 36, the working principle of the on-chip Sample-to-Answer NAAT can be described as follows.

The reagents required for performing the assay such as magnetic bead-based sample preparation reagents, amplification rehydration buffer, magnetic particles and oil are stored in their respective unit dose reagent pouches. Magnetic particles used in this exemplary embodiment are charge switch magnetic beads (Thermofisher Scientific, Carlsbad, CA) with a unique, ionizable functional group whose affinity for nucleic acids is pH-dependent to facilitate nucleic acid purification. The magnetic beads are stored in a flow-through reagent pouch to facilitate easy resuspension and mixing with the binding buffer and sample. Alternatively dynabeads may be utilized which are available for both nucleic acid and immunoassay or protein extraction protocols.

In an exemplary embodiment, and referring still to microfluidic cartridge 700 shown in FIG. 36, the assay is performed as follows:

Sample introduction: First the sample lysate is introduced into the cartridge using a sample transfer syringe through the sample inlet. As the syringe plunger is pushed, the sample is dispensed through a pre-filter disk that filters inhibitors from the sample which allowing DNA in the lysate to pass through. Following the dispense step, the syringe remains connected to the cartridge so as to prevent backflow and to keep the sample inlet port closed. In this embodiment, 500 ul of sample lysate in introduced into the cartridge.

Reagent Dispense/filling: The cartridge is then inserted into an instrument where the act of insertion into the instrument causes an actuation force to be applied to the rupture beads so as to rupture the frangible foil seal and then to crush the reagent pouches so as to dispense the liquid out of them. As shown in FIG. 36, the binding buffer reagent's fluidic path is connected to the magnetic bead flow-through pouch such that it effectively flows through, mixes and resuspends the magnetic particles. Since volumes of 20 ul or less of magnetic particles are typically used, dead-volume constraints make it hard to accurately dispense and sufficiently resuspend the beads. The flow-through pouch solves these issues by enabling the beads to be resuspended in the binding buffer as it flows through and mixes with the sample in the lysis/bind well. Simultaneously, the wash, amplification rehydration buffer are dispensed into their respective wells and oil reagent is dispensed. The oil reagent pouch is a flow-through reagent pouch including a rupture bead to connect to a vent and a rupture bead to connect to a flow path into the primary channel of the microfluidic cartridge. The flow of the oil is driven by a pressure head owing to the height of the oil reagent pouch above the primary channel. Owing to the viscosity and channel length, the oil is designed to enter the primary channel after the other reagent pouches have been crushed and dispensed. The oil serially fills the primary channel thereby creating a uniform oil phase overlay on top of each well, such that each well is separated from the other by the immiscible oil phase. The amplification well includes lyophilized amplification master mix in the form of a bead which is captured in a small bump out cavity in the amplification well. 300 µl of binding buffer+20 µl of magnetic beads, 200 µl of wash buffer x2 and 50 ul of molecular grade water or amplification buffer are dispensed into the lysis/bind, wash 1, wash 2 and amp wells respectively. In some embodiments, the binding buffer may be present in a chamber or well in a dried format on the microfluidic device wherein the sample or lysate may be flowed through it so as to rehydrate and mix with it. In assays such as NAATs which require precise pipetting volumes, 50 µl of rehydration buffer (molecular grade water) needs to be accurately dispensed with tolerances of under 5%. To ensure accuracy of dispensed volume, 50 µl of mineral oil is dispensed into the rehydration buffer pouch along with the 50 µl of molecular grade water or amplification buffer. The oil floats on top of the water thereby pushing the water out through the narrow outlet of the rehydration pouch into the chip. This way, the oil fills any dead volume in the pouch and channels leading to the amp well and enables accurate metering of water required to correctly rehydrate the lyophilized amplification master mix pellet.

Magnetic bead-based sample preparation: As depicted in FIG. 36, on-chip magnetic bead-based sample processing is performed using a single rotational motion during which capture, resuspension and transfer of magnetic beads takes place. The magnetic bead, binding buffer mixture enters the lysis/bind well and mixes with the 500 µl of lysate dispensed into the well. While not necessary, if additional mixing of the sample with binding buffer is desired, in some embodiments a back and forth rotating motion may be used to agitate the sample. The beads are washed twice in wash 1 and wash 2 wells and then resuspended in the amplification mix in the amp well where they are eluted directly into the amplification mix. Various amplification chemistries may be used for nucleic acid amplification. Isothermal amplification chemistries are very attractive for point of care applications due to their rapid time to result, robustness in the presence of inhibitors and the single lower temperature requirements which reduce overall power consumption. Loop mediated isothermal amplification LAMP is a well known isothermal amplification chemistry. The pH of the amplification mix is 8.8 which is conducive for elution of DNA using charge switch magnetic beads. Alternatively, PCR thermal cycling may be utilized for amplification.

Amplification: Following sample preparation, the amplification well is heated using heaters present in the instrument and/or exothermal/phase change chemical reactions in the amp well's proximity, to a temperature conducive for amplification. In isothermal amplification methods such as LAMP the temperature is raised to ~65° C.

Lateral flow detection: A lateral flow strip in a sealed housing is present on the microfluidic cartridge. When the amplification product is ready to be detected, the "flow-through pouch to lateral flow strip" and "flow-through pouch to vent" are simultaneously ruptured such that the lateral flow strip is connected to the amp well and vented. In this case, the pressure head of the oil pushes the amplified product out of the amp well into the sample port of the lateral flow strip through the "flow-through pouch to lateral flow strip". The outlet of the flow-through pouch to lateral flow strip is located at the sample inlet port of the sample pad of the lateral flow strip. An oleophilic, hydrophobic wicking pad is present along the path of the amplification product into the lateral flow strip such that it selectively wicks up oil and only allows amplified product to enter the lateral flow strip. In some embodiments the oleophilic wicking pad may be present inside the flow-through pouch to lateral flow strip. In some embodiments the oleophilic wicking pad may be present at the inlet of the sample pad to the lateral flow strip. In some embodiments the sealed lateral flow strip housing may be directly vented or connected to a vent on the microfluidic device. The vent may be a semipermeable filter or membrane that selectively allows air to pass through it but blocks liquids from escaping out of the self-contained microfluidic device.

Figure 37:
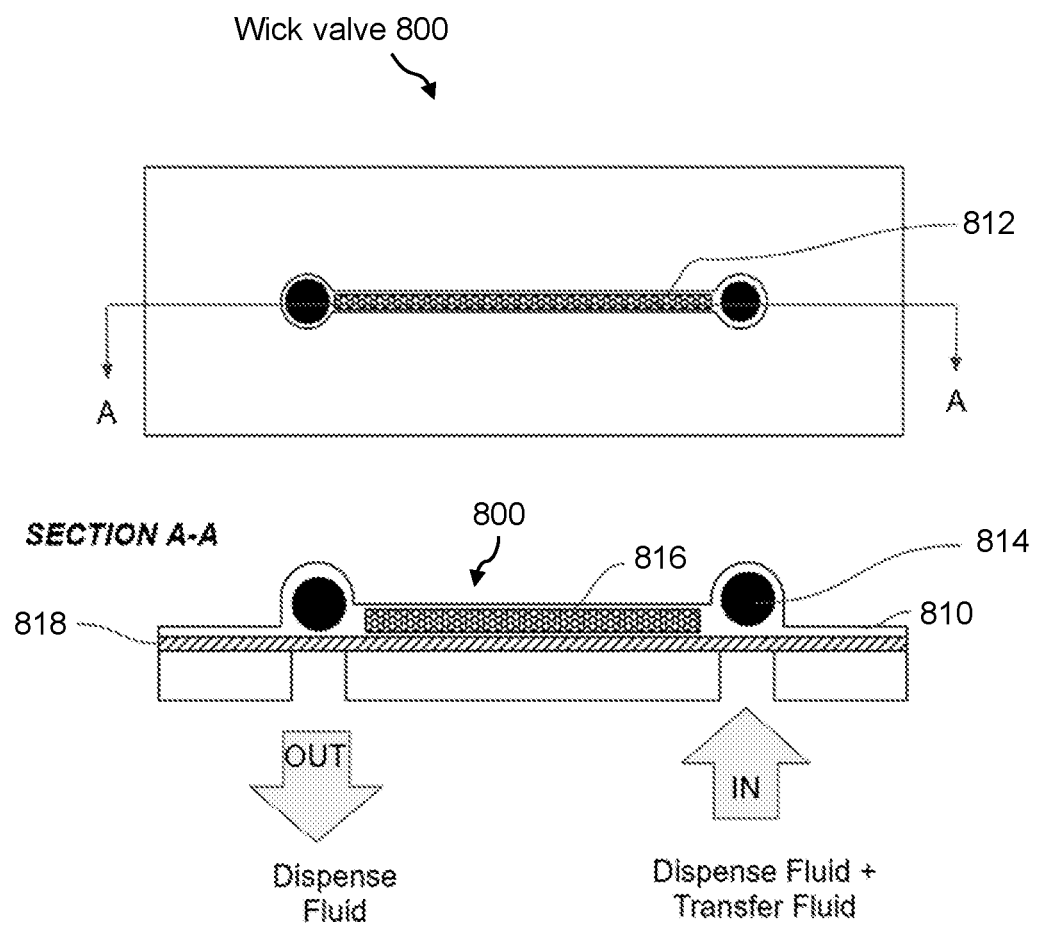
FIG. 37 illustrates a plan view and cross-sectional view of an example of a wick valve in a microfluidic device, such as a microfluidic cartridge.

Referring now to FIG. 37 is a plan view and cross-sectional view of an example of a wick valve 800 in a microfluidic device, such as a microfluidic cartridge 800. Wick valve 800 used, for example, to dispense/transfer liquid in a microfluidic cartridge, such as microfluidic cartridge 800, with zero dead volume/loss of the dispense liquid. The application is ideal for very low volume dispensing of liquids leading to no loss of liquid in the valve.

The operation of wick valve 800 relies on loading the liquid to be dispensed with an immiscible transfer fluid. It is also required that the transfer fluid is less dense than the fluid to be dispensed. An example of such a transfer fluid is mineral oil that may be used with a water-based reagent.

The transfer fluid floats on the top of the dispense liquid and applies a downward force on it due to its weight. This downward force is the positive pressure required to move the fluid into and through the valve. The wick absorbs the transfer fluid, expands and blocks the flow-through channel, ensuring that no transfer fluid gets dispensed past the valve. The oil absorbent, water repelling wick may be a sponge, sorbent, elastomer, gel or a combination thereof.

Referring still to FIG. 37, wick valve 800 includes of a "flow through" blister 810 with a wick 816 (e.g., oleophilic/hydrophobic absorbent pad) trapped in its flow through channel 812. The Section A-A shows the cross section of the blister. There are rupture beads 814 which are used to rupture the frangible seal 818 on the flow through blister. The cross section also shows the wick 816 which is trapped in the flow through channel.

Wick valve 800 may be mounted on a microfluidic cartridge. When the liquid from the cartridge is needed to be dispensed, the rupture bead is pushed into the frangible seal. This ruptures the frangible seal and opens the via into the microfluidic cartridge. The weight of the transfer fluid pushes the liquid to be dispensed out of the cartridge and into wick valve 800.

Inside wick valve 800, the aqueous dispense fluid finds its way through the interstitial spaces around wick 816. The transfer fluid follows the dispense fluid because it is less dense and floats on top of the dispense. As soon as the transfer fluid touches wick 816, it will start to be absorbed inside the wick. This wicking of the transfer fluid creates another pulling force drawing more transfer fluid from the cartridge into wick valve 800. The transfer fluid moves as a fluid front inside the wick pushing the dispense fluid forward and towards the outlet of wick valve 800. Because the transfer fluid is immiscible with the dispense fluid; it works to push all of the dispense fluid out of wick valve 800. Once the Wick is saturated with the transfer fluid, the inlet and outlet ports are blocked sufficiently enough, owing to the expansion characteristics of the saturated Wick. At this point, the viscous transfer fluid is unable to flow through the "flow through" wick valve and no more transfer fluid will be pulled into it. In this way, the dispense fluid is completely dispensed out of the cartridge and past the wick valve 800 while the transfer fluid is selectively not allowed to exit wick valve 800.

Figure 38:
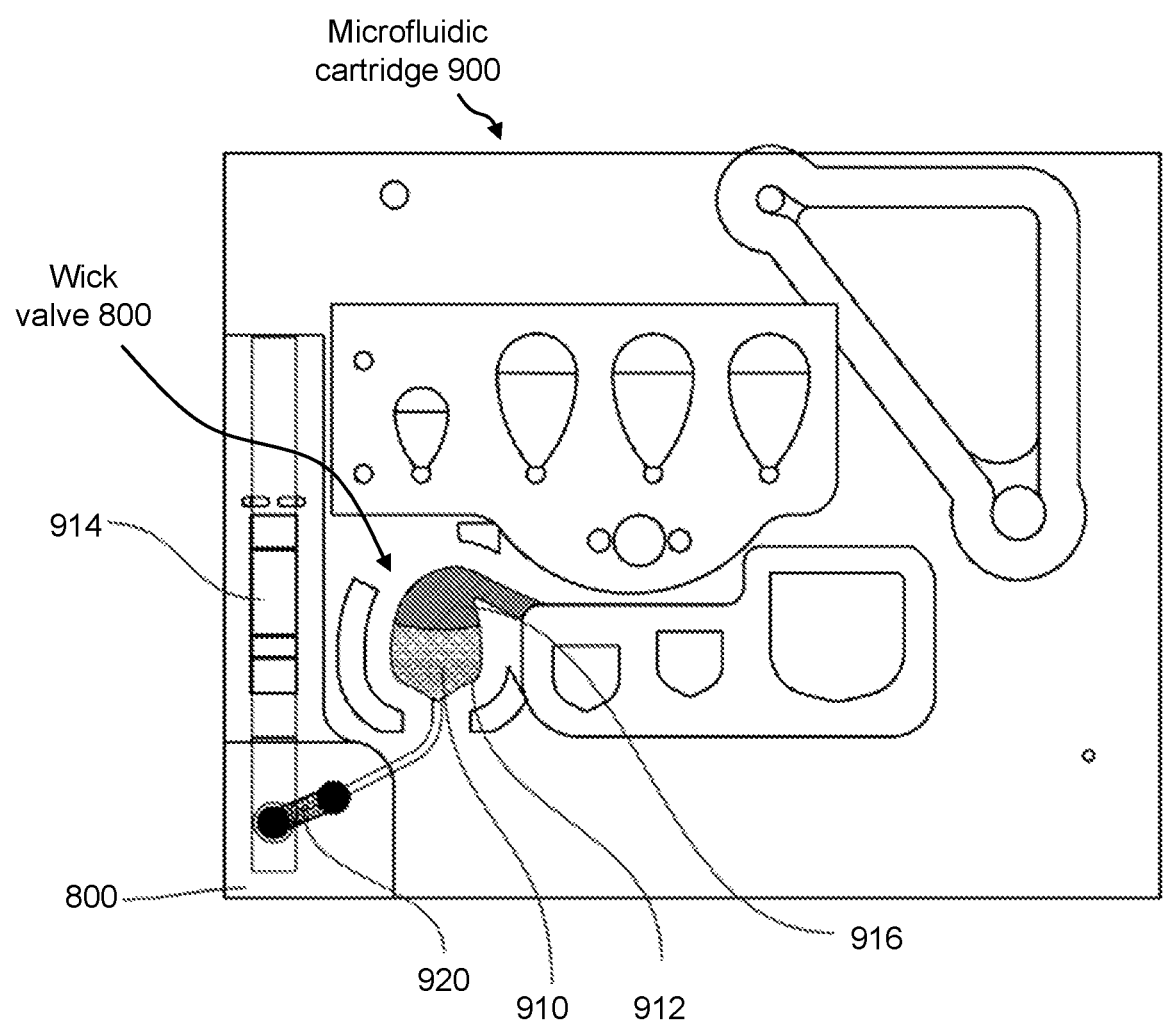
FIG. 38 illustrates a plan view of an example of a microfluidic cartridge that uses a wick valve, such as the wick valve shown in FIG. 37.

Referring now to FIG. 38 is a plan view of an example of a microfluidic cartridge 900 that uses a wick valve, such as wick valve 800. Namely, an example of the wick valve phenomena is used in a Novel DX cartridge 900 shown in FIG. 38 to dispense the amplified reagent product 910 that is in the amplification chamber 912 of the cartridge onto the lateral flow strip. This exemplary lateral flow strip 914 requires 50 µL of product and the volume of the amplified reagent product in the amplification chamber of the cartridge is exactly 50 µL. In a typical microfluidic cartridge there will be a small amount of dead volume lost in the channels of the cartridge; however at very low volumes, that same dead volume may account for ~20-50% of the reagent product. Such a large portion of volume lost will lead to the malfunctioning of the lateral flow strip.

In this embodiment mineral oil 916 is used as the transfer fluid. The mineral oil is immiscible in the amplified reagent product and is also lighter than it such that it floats. The weight of the mineral oil above the amplified reagent product causes a downwards pressure that will move amplified reagent product out of the amplification chamber and into wick valve 800 when the frangible seal is broken. Wick valve 800 in this embodiment contains an oleophilic pad as the wick 920. This pad is also hydrophobic so it won't absorb any of the water based amplified reagent product. The amplified reagent product makes its way through the interstitial spaces between the wick and the flow through channel of the valve. The oil, being lighter and more viscous, will not flow as easily through the flow through channel; however, once the wick starts to absorb it, it will effectively pull more oil into wick valve 800. As the oil moves through the wick and saturates the wick it will push any of the amplified reagent product toward the outlet of the valve. The outlet of the valve is directly above the sample pad of the lateral flow strip. Using this method all 50 µL of the amplified product is dispensed from the amplification chamber in the cartridge onto the lateral flow strip. A benefit of this method is that no mineral oil makes its way to the lateral flow strip. This is important because the mineral oil may cause the lateral flow strip to malfunction.

Additionally, the presently disclosed microfluidic instrument (e.g., microfluidic instrument 300) is capable of processing different microfluidic cartridge designs. In particular, the loading station 314 itself and/or the plate portion of locking hinge 316 may be customized to correspond to the features of a certain microfluidic cartridge. Additionally, in some embodiments, loading station 314 may not have a locking hinge 316. For example, the microfluidic cartridge may be held in place by some other feature, such as a rail/slot feature that locks/constrains the microfluidic cartridge from falling out of loading station 314. Examples of which are shown and described hereinbelow with reference to FIG. 39 through FIG. 51B. Namely, FIG. 39 through FIG. 51B show various views of a microfluidic instrument 305, which is another example of the presently disclosed microfluidic instrument. Namely, microfluidic instrument 305 is another example of microfluidic instrument 110 of microfluidic system 100 shown in FIG. 1. In FIG. 39 through FIG. 51B, microfluidic instrument 305 is shown in combination with, for example, different microfluidic cartridges and/or other devices.

Figure 39:
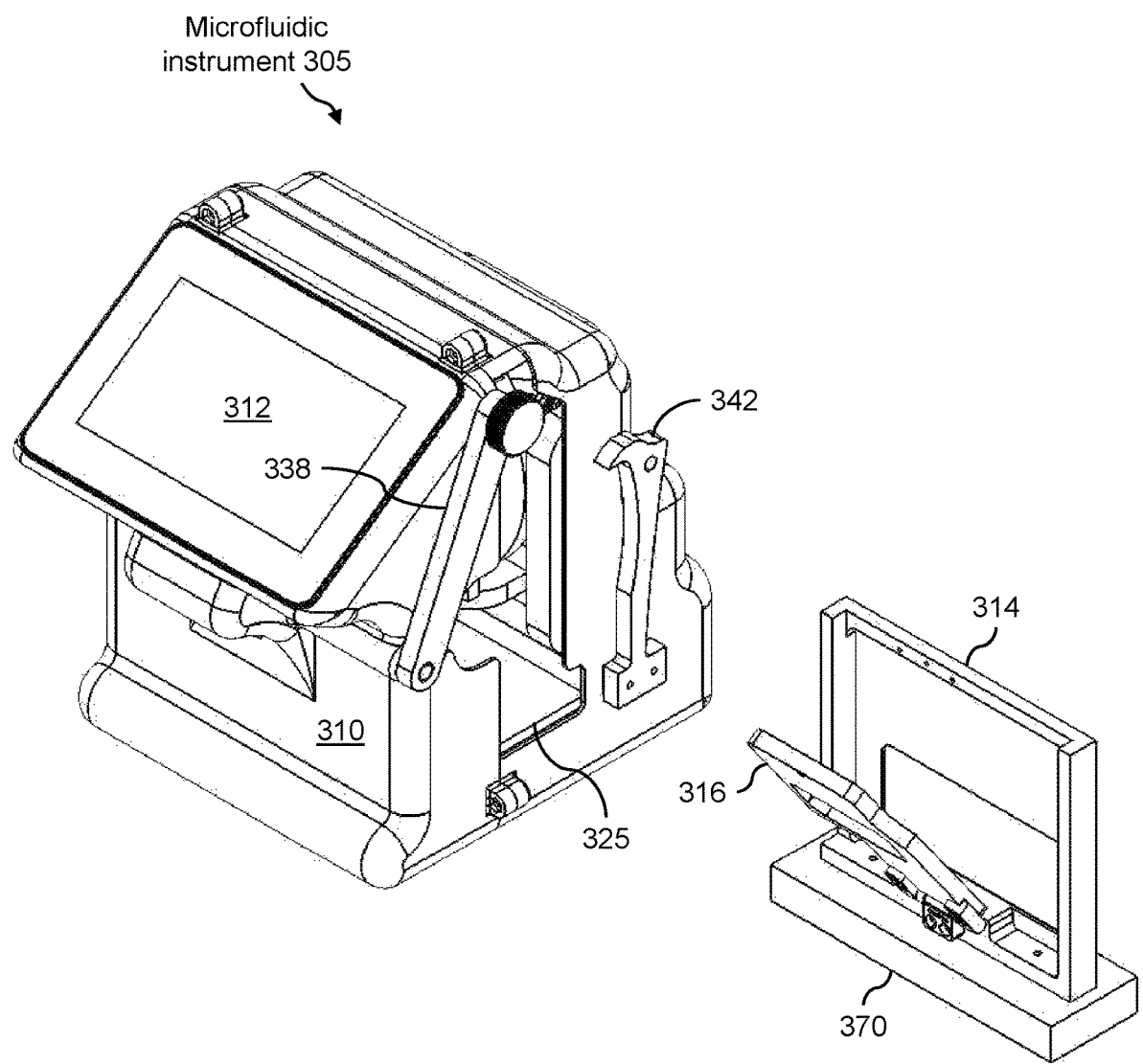
FIG. 39 through FIG. 51B illustrate various views of another example of the presently disclosed microfluidic instrument and examples of using the microfluidic instrument in combination with, for example, different types of vertically oriented microfluidic cartridges and/or other devices.

Referring now to FIG. 39, microfluidic instrument 305 is substantially the same as microfluidic instrument 300 shown in FIG. 8 though FIG. 15 except for the placement of digital display 312 and the features of base plate 324, among other slight differences. For example, in microfluidic instrument 305, loading station 314 sits atop a slidable plate 370. Then, slidable plate 370 can be installed in sliding fashion in a receiving slot 325 of base plate 324. Here, microfluidic instrument 305 is shown in the unlocked state with loading station 314 installed atop slidable plate 370, which is outside microfluidic instrument 305. Additionally, locking hinge 316 of loading station 314 is shown in the unlocked state with no microfluidic cartridge present.

Figure 40:
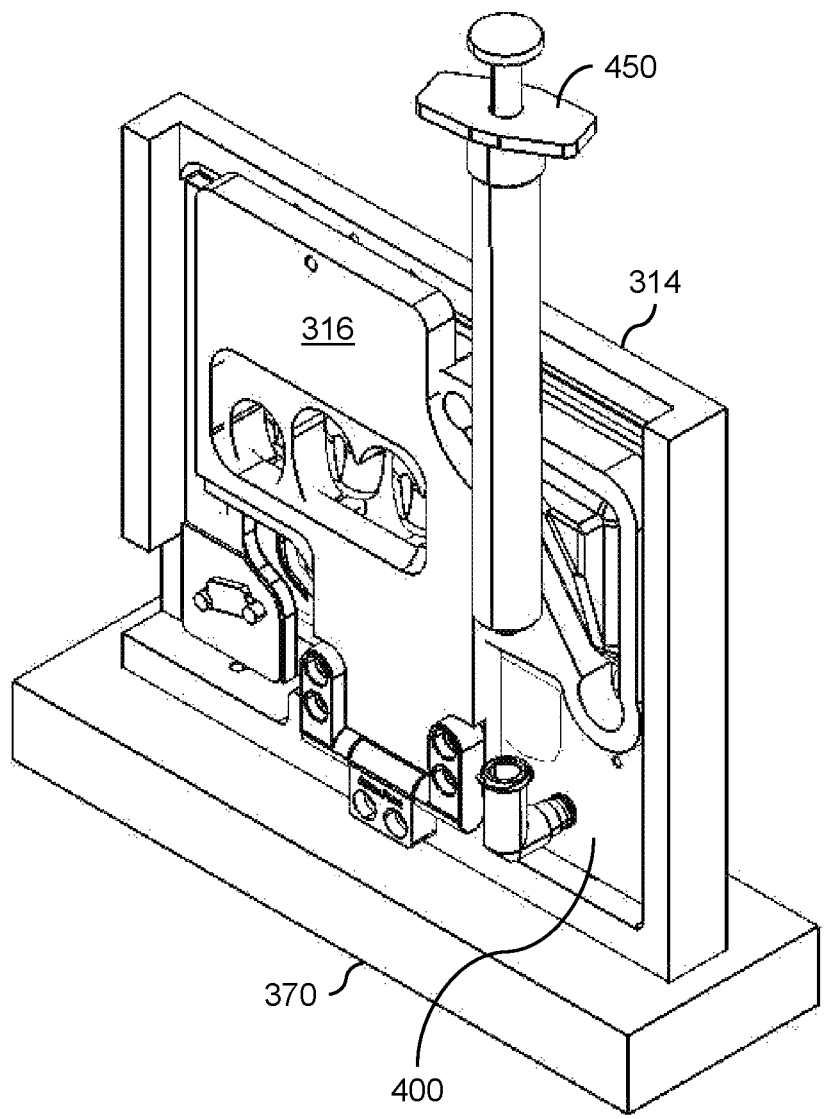
Figure 41:
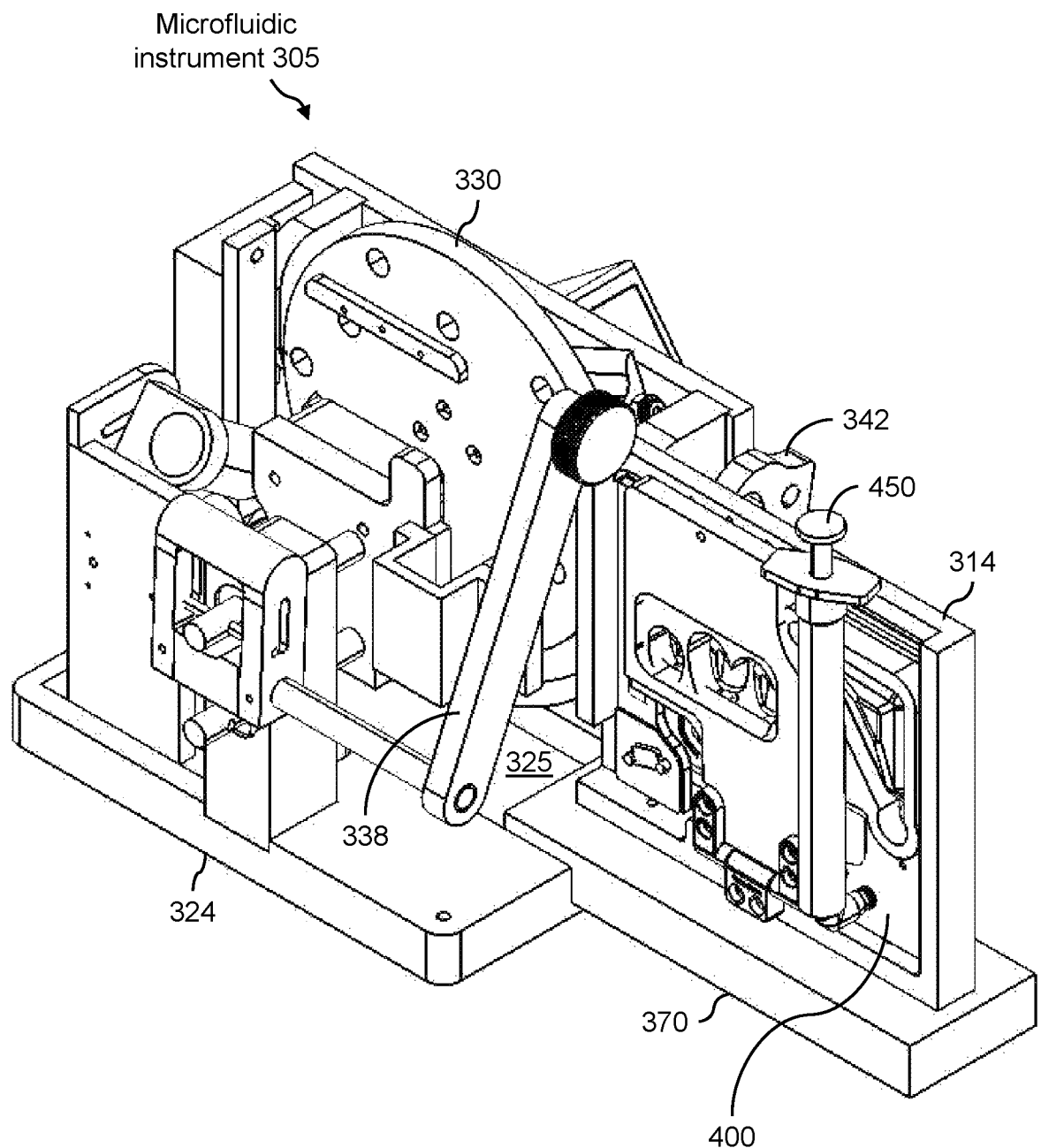
Figure 42:
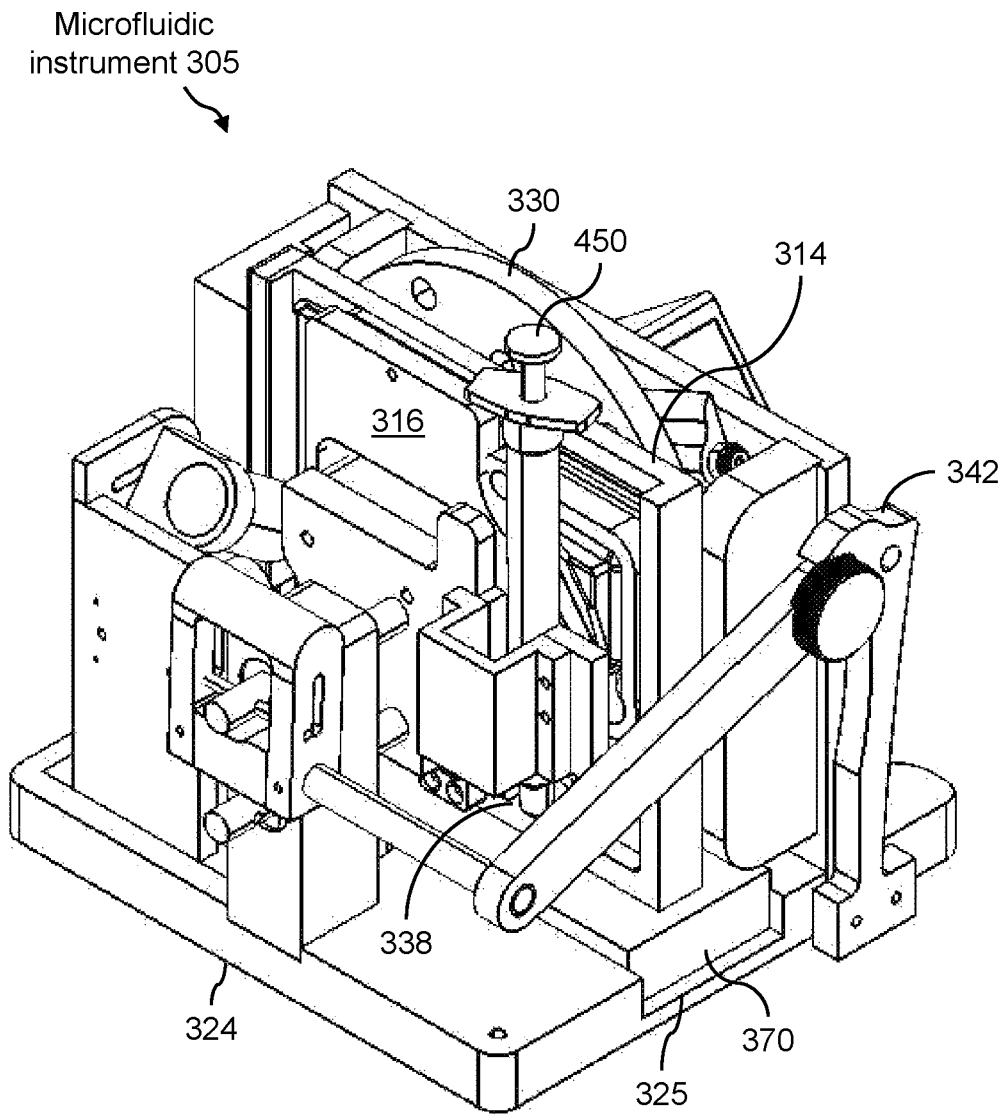

Referring now to FIG. 40 is a perspective view of loading station 314 with microfluidic cartridge 400 installed and locked therein. Further, syringe 450 is shown in relation to microfluidic cartridge 400. Accordingly, loading station 314, microfluidic cartridge 400, and syringe 450 are prepared for loading into microfluidic instrument 305. Next, FIG. 41 shows slidable plate 370 with loading station 314, microfluidic cartridge 400, and syringe 450 being loaded into receiving slot 325 of base plate 324 of microfluidic instrument 305. Next, FIG. 42 shows slidable plate 370 with loading station 314, microfluidic cartridge 400, and syringe 450 fully loaded into microfluidic instrument 305 and with blister crush handle 338 engaged with handle latch hook 342. FIG. 42 shows microfluidic instrument 305 in the latched or clamped state. Accordingly, the fluids of microfluidic cartridge 400 are deployed due to the crushing action of blister crush handle 338. To reveal more details thereof, FIG. 41 and FIG. 42 show microfluidic instrument 305 absent housing 310 and digital display 312.

Figure 43:
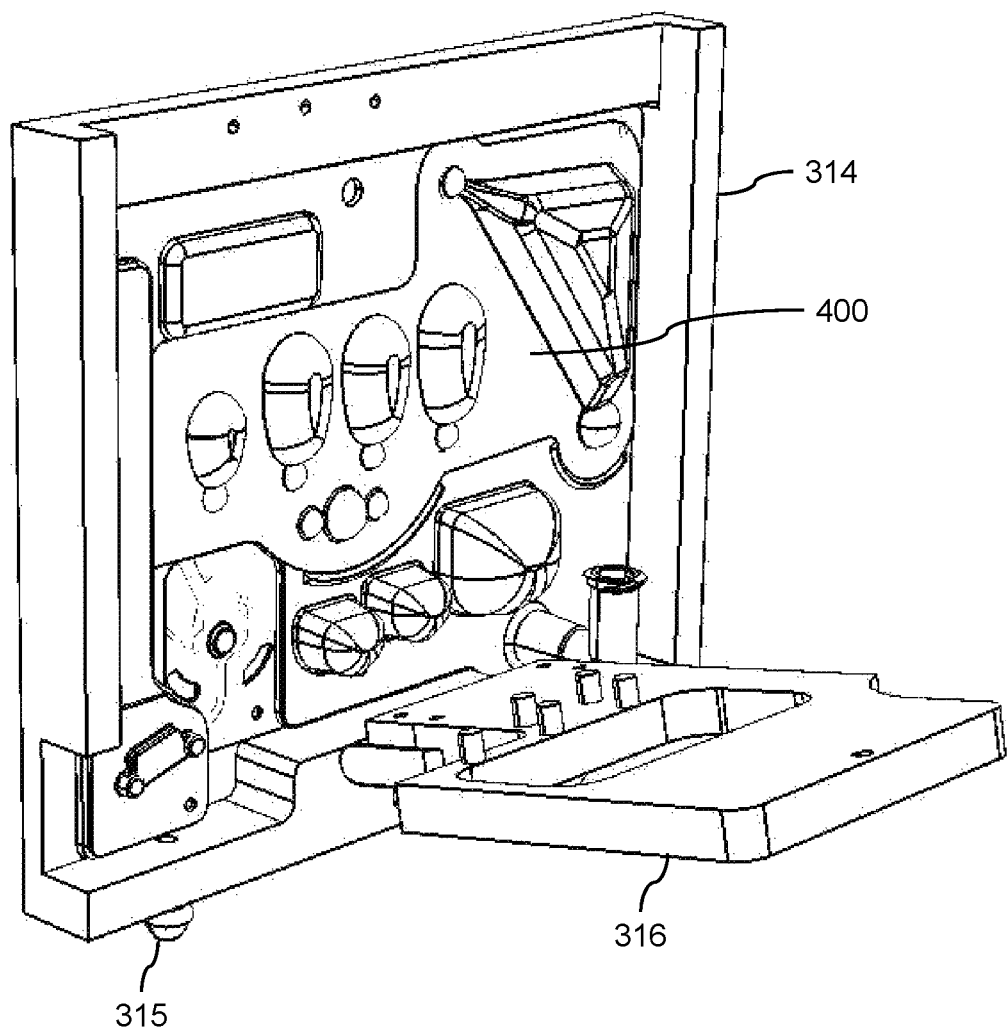
Figure 44:
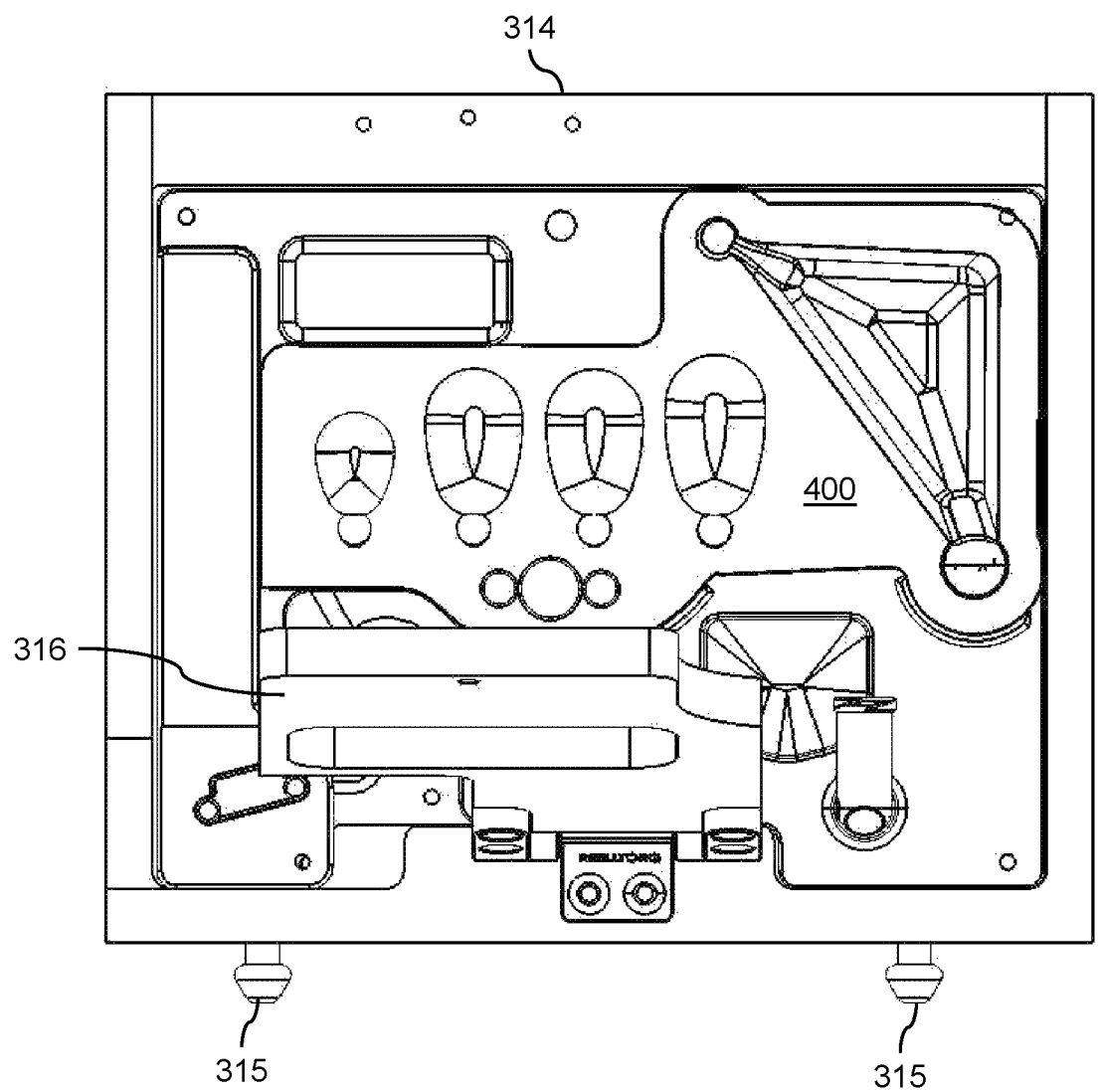

Further to the example, FIG. 43 and FIG. 44 show a perspective view and a plan view, respectively, of an example of microfluidic cartridge 400 being loaded into loading station 314. Locking hinge 316 is not yet closed against microfluidic cartridge 400. The plate portion of locking hinge 316 is customized to correspond to the features of microfluidic cartridge 400 (e.g., NDx molecular cartridge). Additionally, the lower portion of loading station 314 includes a pair of mounting pegs 315 for fitting into a pair of corresponding holes 371 of slidable plate 370 (see FIG. 51A and FIG. 51B). Microfluidic cartridge 400 is an example of one type of cartridge that can be installed and processed in microfluidic instrument 305.

Figure 45:
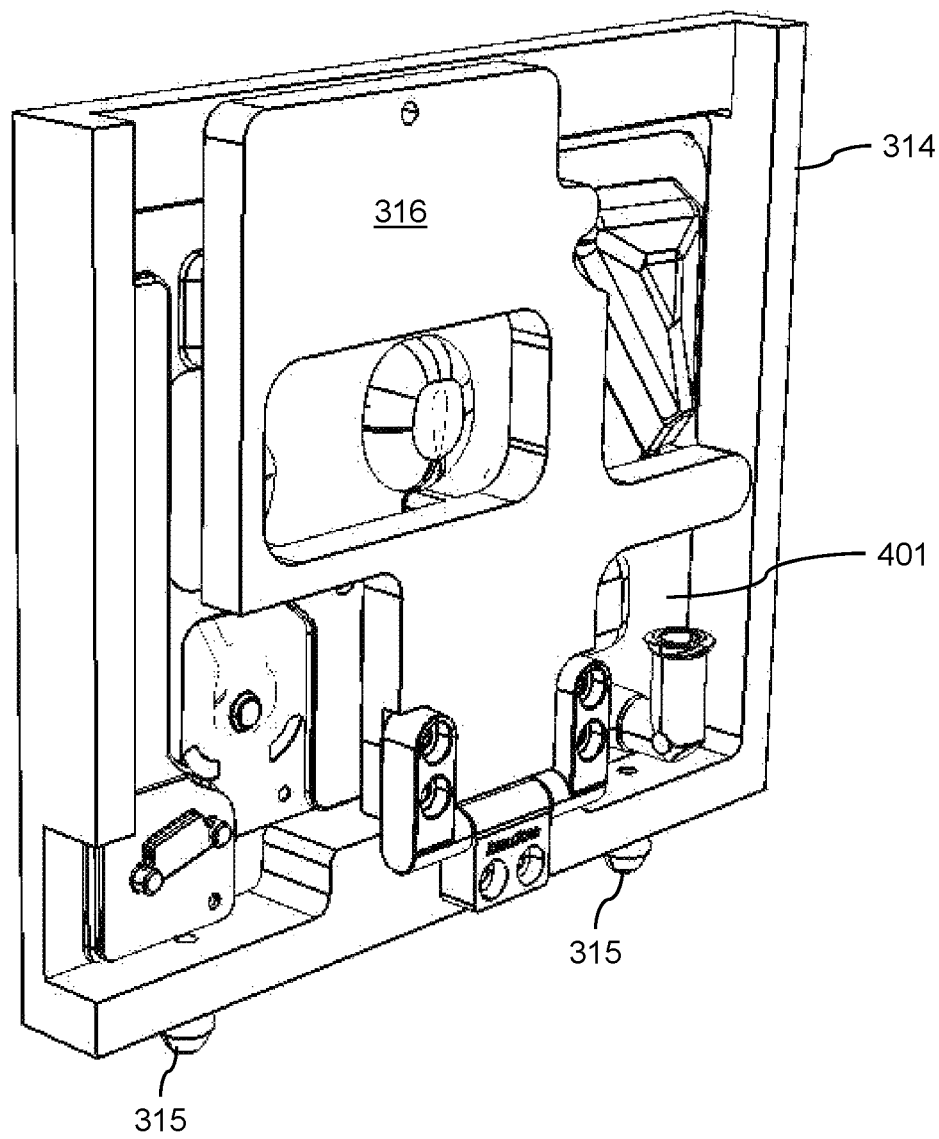

Additionally, FIG. 45 shows a perspective view of an example of a two-well microfluidic cartridge 401 installed in loading station 314. In this example, the plate portion of locking hinge 316 is customized to correspond to the features of two-well microfluidic cartridge 401. Two-well microfluidic cartridge 401 is an example of another type of cartridge that can be installed and processed in microfluidic instrument 305.

Figure 46:
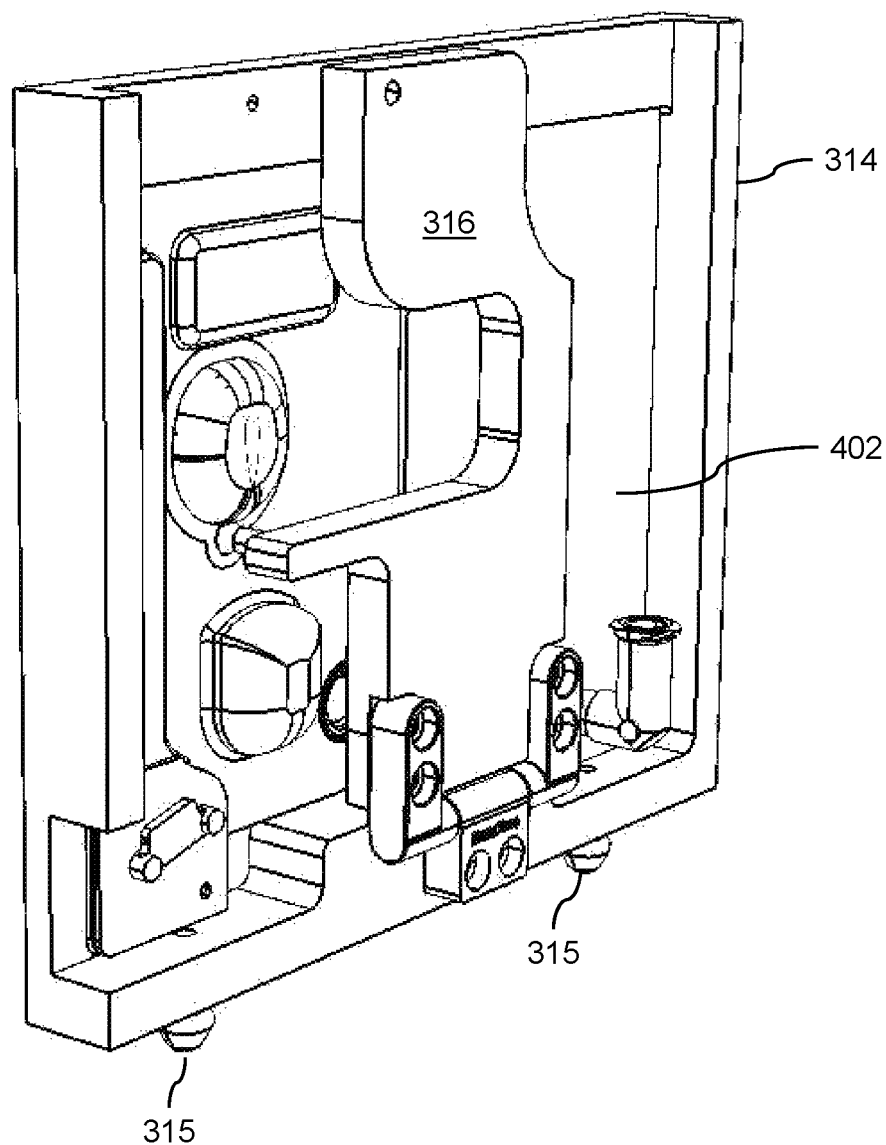

Additionally, FIG. 46 shows a perspective view of an example of an immunoassay microfluidic cartridge 402 installed in loading station 314. In this example, the plate portion of locking hinge 316 is customized to correspond to the features of immunoassay microfluidic cartridge 402. Immunoassay microfluidic cartridge 402 is an example of yet another type of cartridge that can be installed and processed in microfluidic instrument 305.

Figure 47:
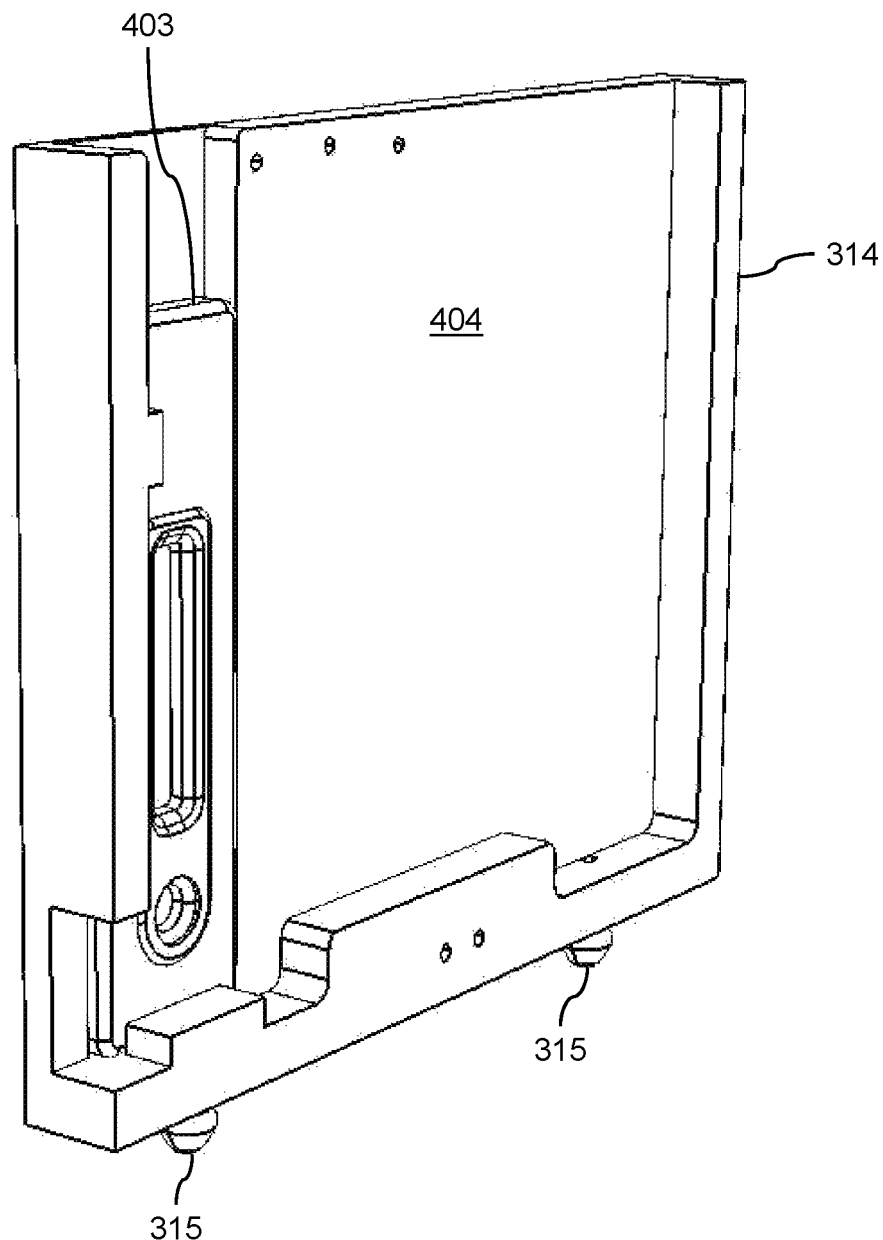

Additionally, FIG. 47 shows a perspective view of an example of lateral flow housing 403 and a spacer plate 404 installed in loading station 314. In this example, locking hinge 316 is not present. Lateral flow housing 403 is an example of still another type of device that can be installed and processed in microfluidic instrument 305.

Figure 48A:
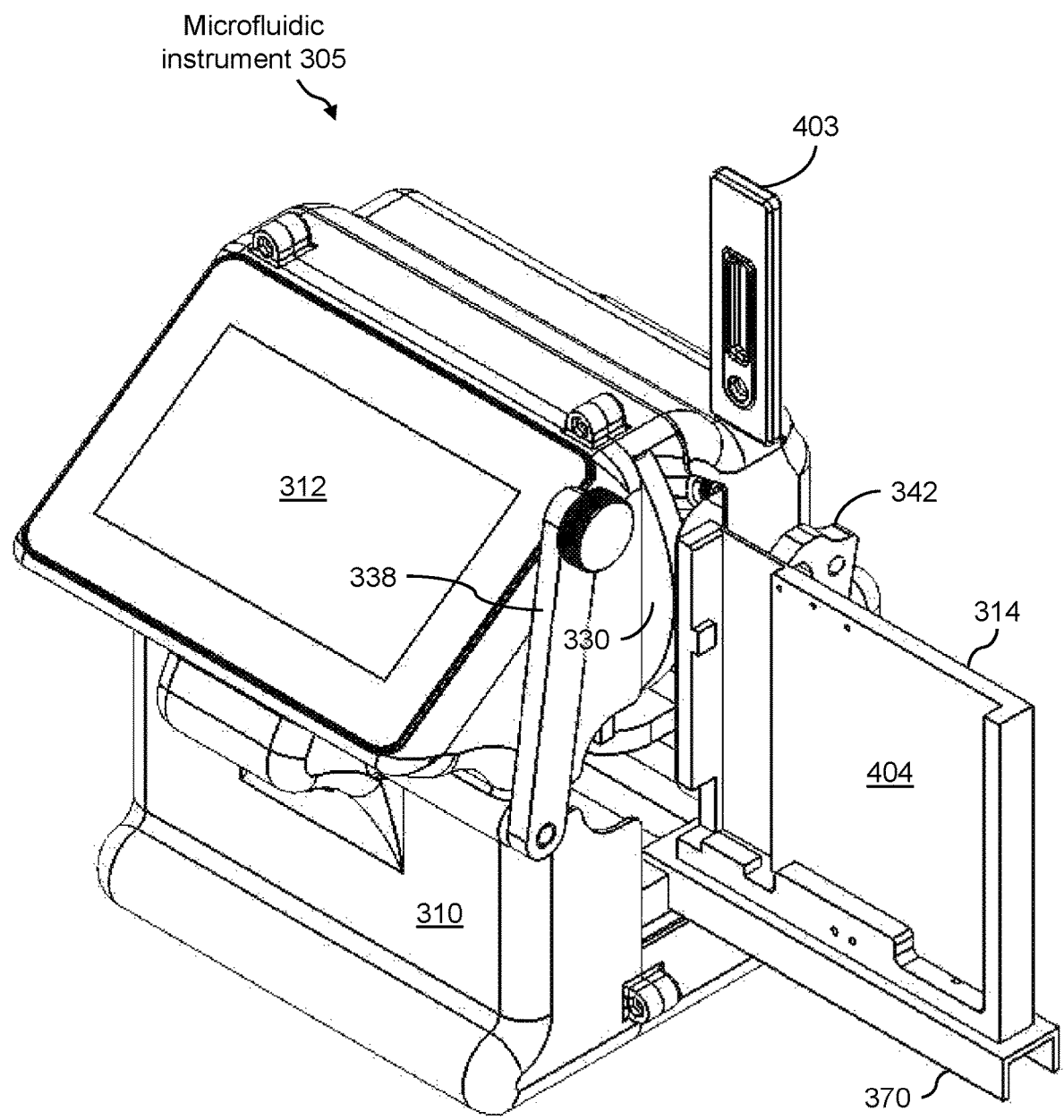
Figure 48B:
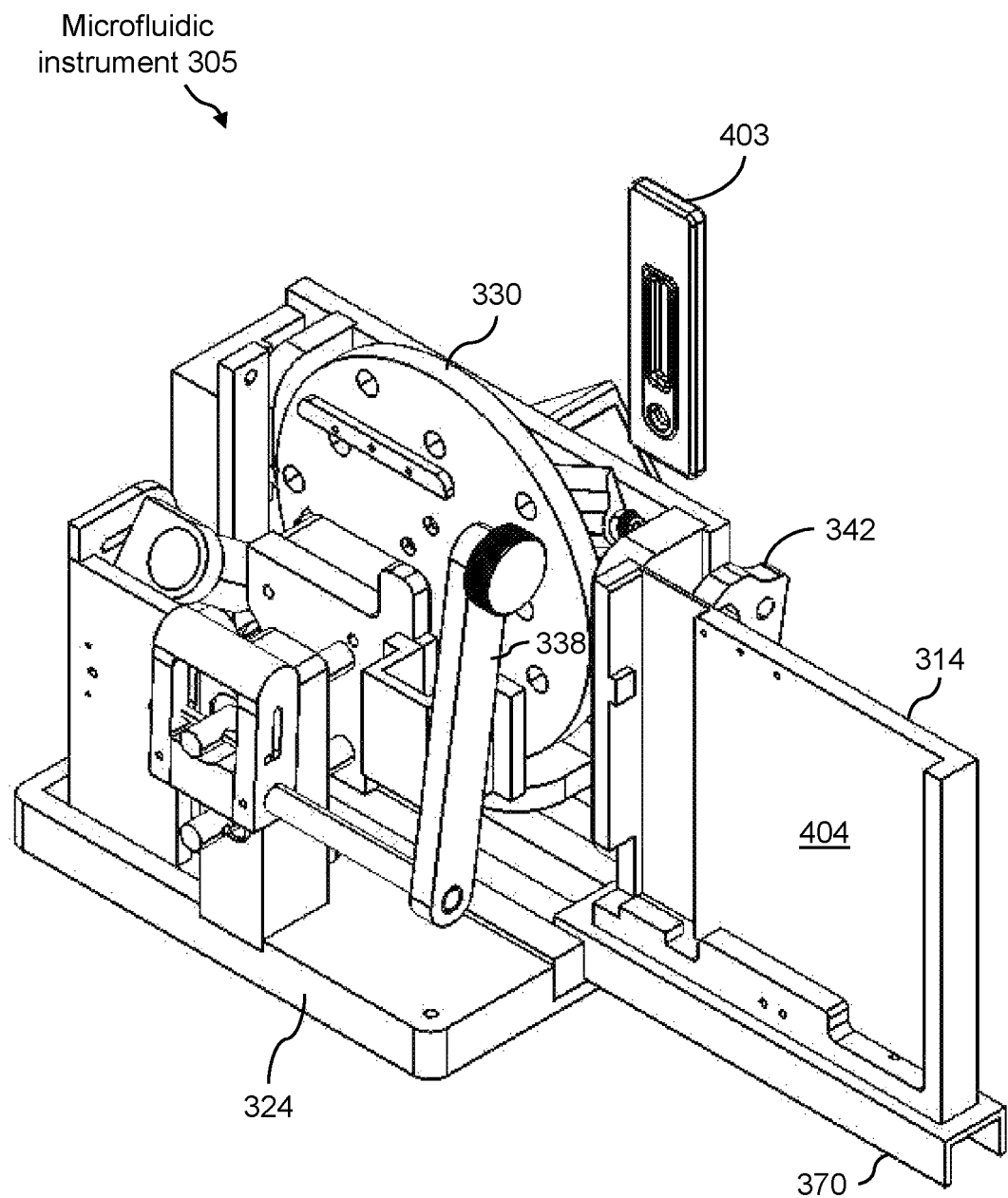
Figure 49A:
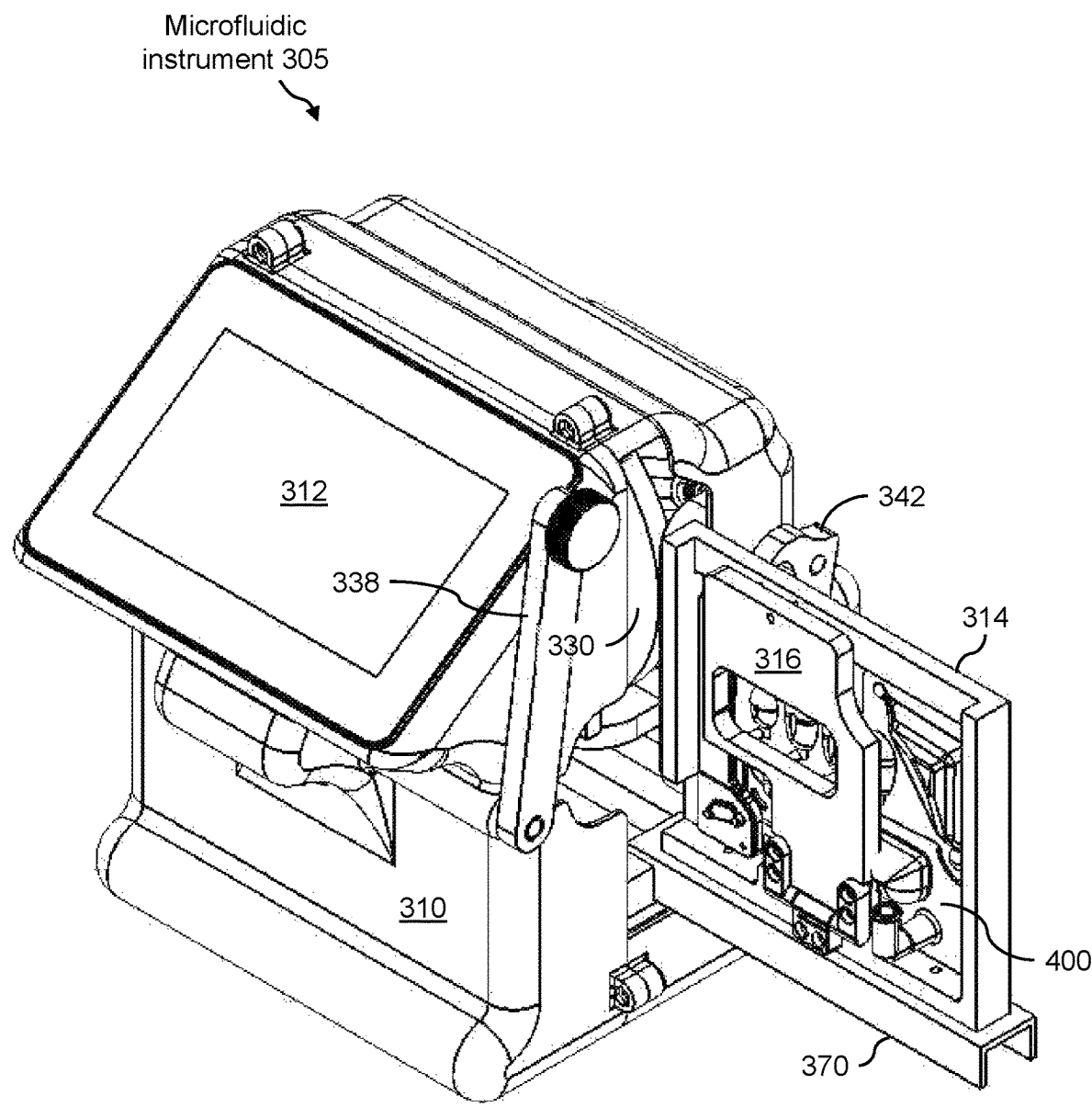
Figure 49B:
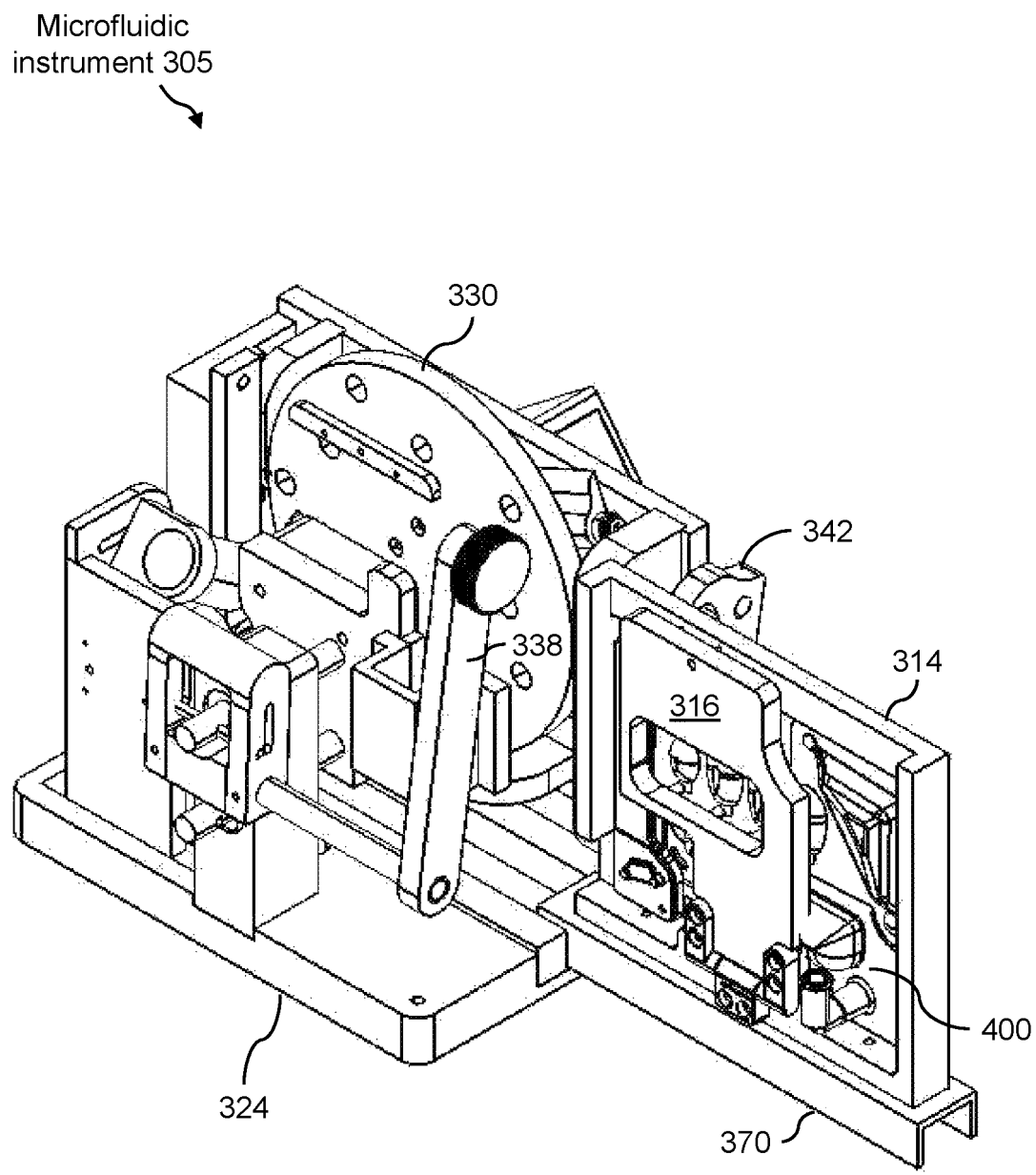
Figure 50A:
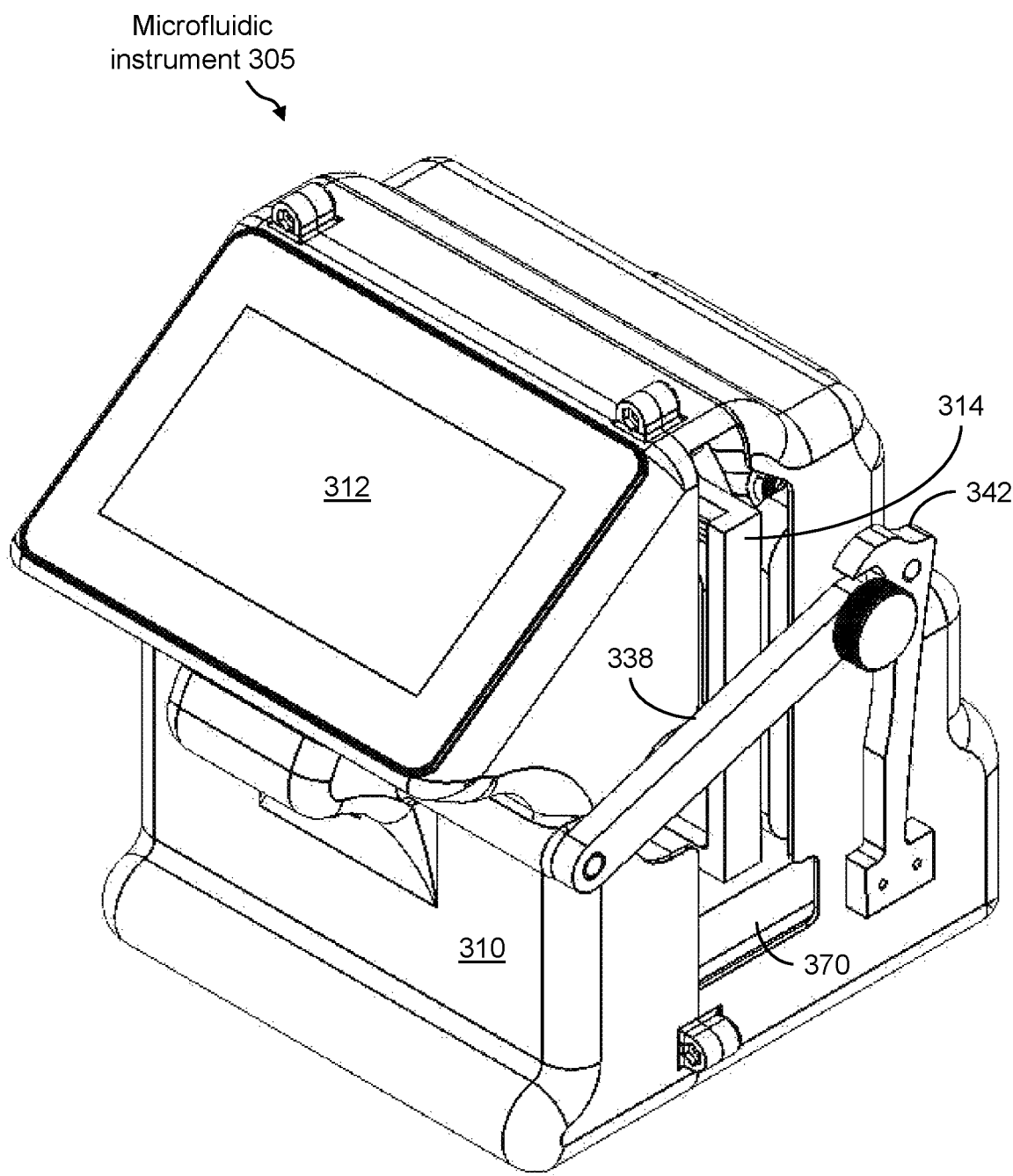
Figure 50B:
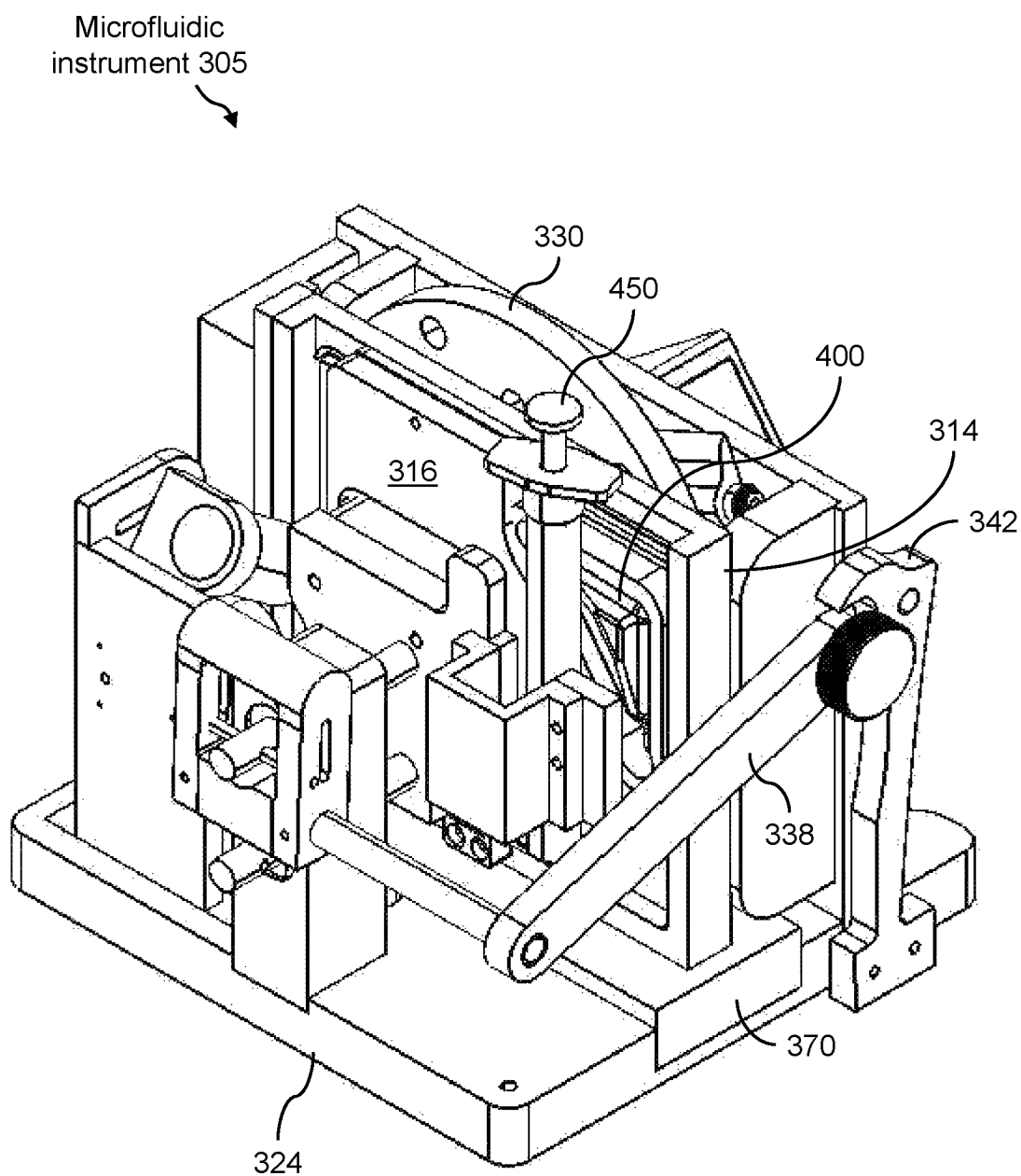
Figure 51A:
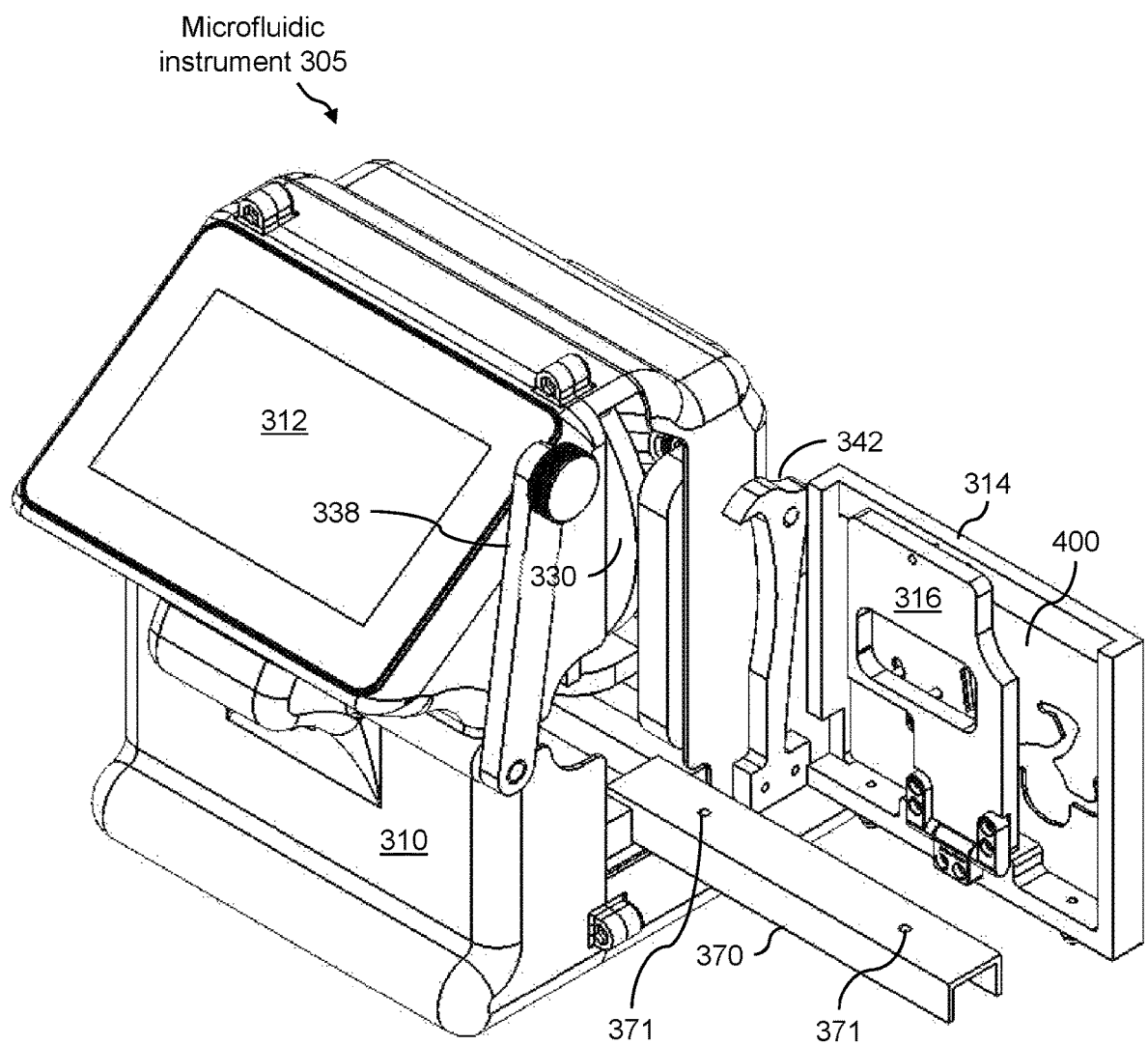
Figure 51B:
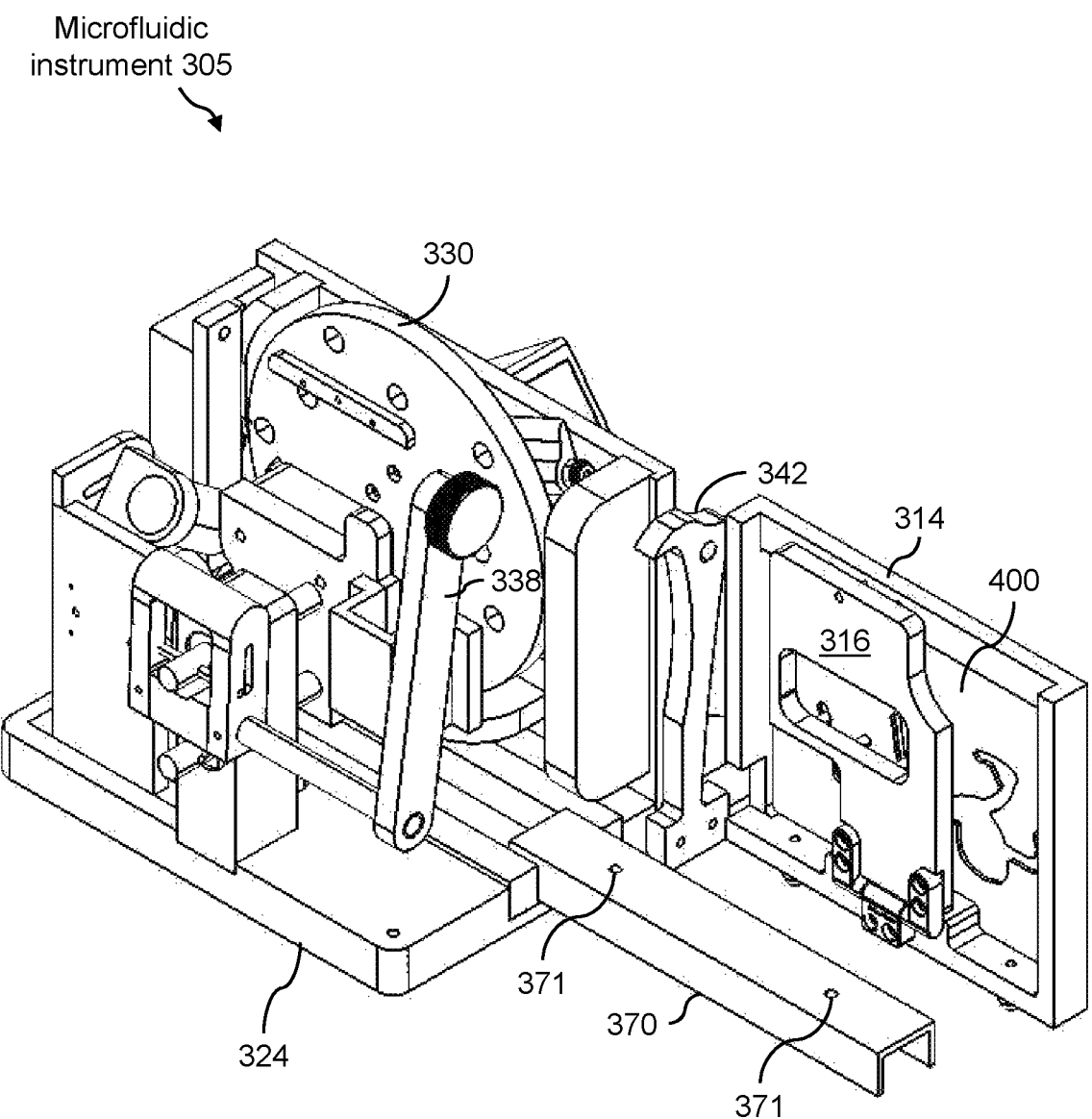

FIG. 48A and FIG. 48B show microfluidic instrument 305 with and without housing 310 and showing more details of loading station 314 with lateral flow housing 403 being loaded into microfluidic instrument 305. FIG. 49A and FIG. 49B show microfluidic instrument 305 with and without housing 310 and showing more details of loading station 314 with microfluidic cartridge 400 being loaded into microfluidic instrument 305. FIG. 50A and FIG. 50B show microfluidic instrument 305 with and without housing 310 and showing more details of loading station 314 with microfluidic cartridge 400 fully loaded into microfluidic instrument 305. FIG. 51A and FIG. 51B show microfluidic instrument 305 with and without housing 310 and showing more details of loading station 314 with microfluidic cartridge 400 being unloaded from microfluidic instrument 305.

Figure 52:
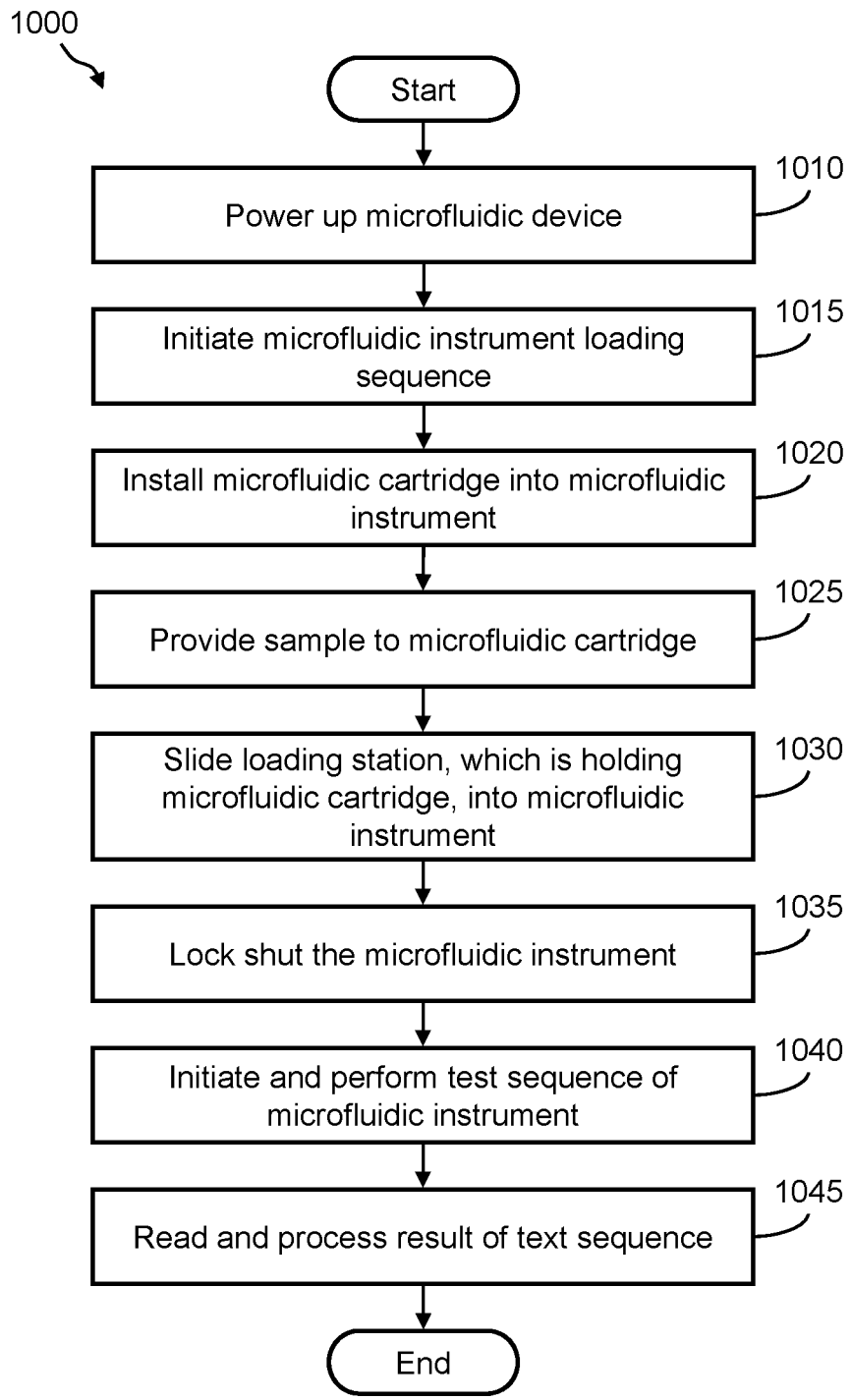
FIG. 52 illustrates a flow diagram of another example of a method of using the presently disclosed microfluidic system.

FIG. 52 illustrates a flow diagram of a method 1000, which is an example of another method using the presently disclosed microfluidic system 100. Method 1000 may include, but is not limited to, the following steps.

At a step 1010, the microfluidic instrument is powered up. For example, microfluidic instrument 300 of FIG. 4 through FIG. 6, microfluidic instrument 300 of FIG. 8 through FIG. 15, or microfluidic instrument 305 of FIG. 39 through FIG. 51B is powered up. In one example, upon power up, actuator plate 330 rotates in a counter clockwise direction until a home position magnet comes into proximity of a magnetic reed switch. This is the home position.

At a step 1015, the microfluidic instrument loading sequence is initiated. For example, the user scans (e.g., barcode or RFID) or manually enters the patient ID. Next, the user scans or manually enters the cartridge ID.

At a step 1020, the microfluidic cartridge is installed into the microfluidic instrument. For example, the user slides loading station 314 out of microfluidic instrument 300, 305 and opens locking hinge 316 (see FIG. 39). Next, the user loads a certain microfluidic cartridge, such as microfluidic cartridge 400, into loading station 314 (see FIG. 43) and closes locking hinge 316 (see FIG. 49A and FIG. 49b). In so doing, the frangible seals under the blisters break, which opens the fluidic pathways into microfluidic cartridge 400.

At a step 1025, the sample is provided to the microfluidic cartridge. For example, syringe 450 holding the sample of interest is fluidly coupled to loading port 422 of microfluidic cartridge 400 (see FIG. 40 and FIG. 41). Next, the user injects the sample into microfluidic cartridge 400. In so doing, sample fluid flows through the pouch containing the magnetic charge switch particles and enters into the binding well of microfluidic cartridge 400.

At a step 1030, the loading station with the microfluidic cartridge and sample are slide into the microfluidic instrument. For example, the user slides loading station 314 of microfluidic instrument 300 into microfluidic cartridge 400 (see FIG. 6).

At a step 1035, the microfluidic instrument is locked/clamped shut. For example, the user pushes down on blister crush handle 338 until handle latch hook 342 engages blister crush handle 338 (see FIG. 42, FIG. 50A, FIG. 50B). In so doing, blister crush handle 338 brings the reagent dispensing plungers forward and causes them to depress against the reagent pouches. This squeezes their contents into the wells of microfluidic cartridge 400. This also keeps the pouches in their crushed position to prevent backflow.

At a step 1040, the test sequence of the microfluidic instrument is initiated and performed. For example, the test sequence of microfluidic instrument 305 and microfluidic cartridge 400 is initiated and performed. Once the test sequence is initiated, the sample is processed. For example, actuator plate 330 rotates relative to microfluidic cartridge 400 for a certain amount of time (e.g., about 3 mins). In one example, as actuator plate 330 rotates, it captures, resuspends, and transfers magnetic particles between different stages of washing and elution. Next, the amplification process occurs. In one example, during the amplification process the resistive heater that is in contact with the amplification well turns ON (e.g., for about 12-20 mins).

At a step 1045, the result of the text sequence is read and processed. For example, using sequential burst plunger 360 of microfluidic instrument 305, the amplified product is sequentially dispensed onto lateral flow strip 428 by rupturing a frangible seal on microfluidic cartridge 400. As sequential burst cam 356 rotates it pushes sequential burst plunger 360 onto the flow-through blister and ruptures the foil seal. This opens a fluidic pathway to lateral flow strip 428. Then, information from a detection system, such as detection system 122 shown is FIG. 1, is processed. The test results may be displayed on digital display 112 of microfluidic instrument 305. Examples of information that may be captured is shown hereinbelow with reference to FIG. 53 through FIG. 59.

CT/NG Loop Mediated Isothermal Amplification (LAMP) Primers

Figure 53:
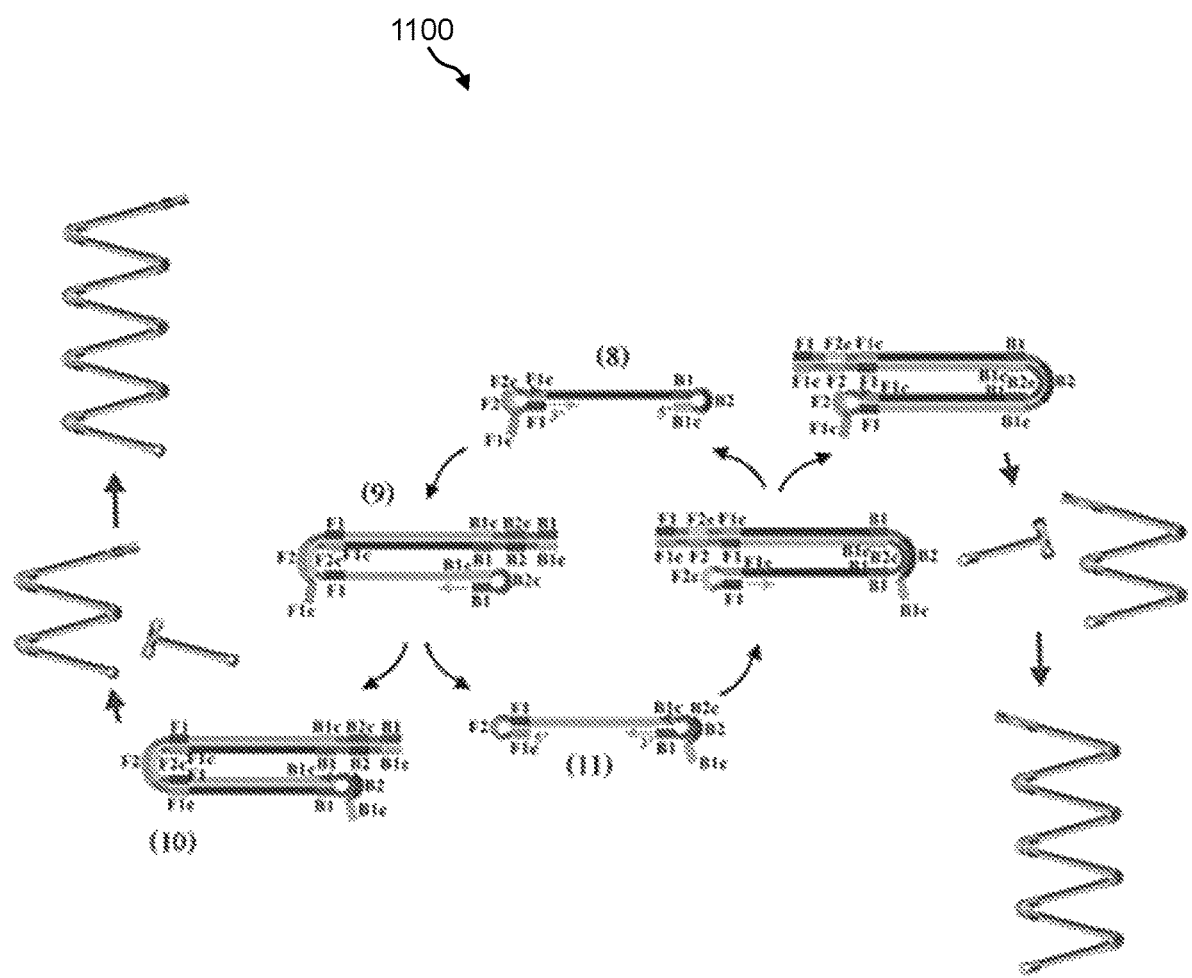
FIG. 53 shows a schematic diagram of an example of reaction steps indicating the basic principles of Loop Mediated Isothermal Amplification (LAMP)
Figure 56:
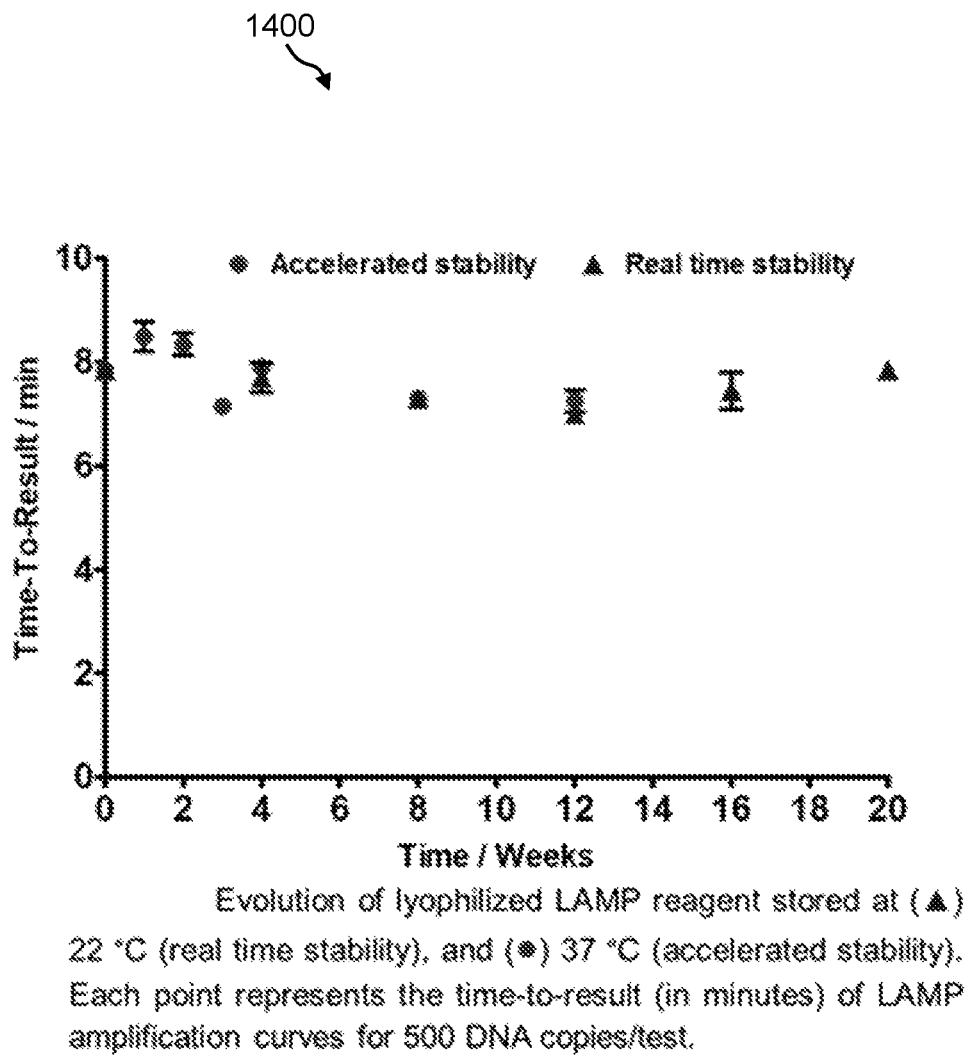
FIG. 56 shows a plot of certain LAMP results.
Figure 57:
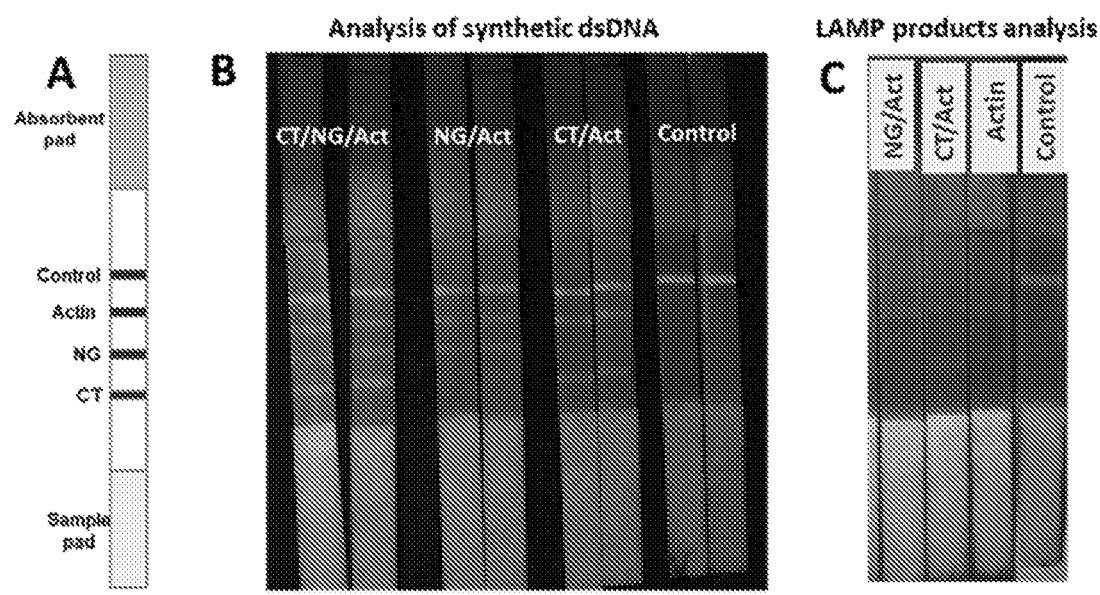
FIG. 57 and FIG. 58 show certain test results with respect to a nucleic lateral flow assay.

LAMP is nucleic acid isothermal amplification technique. Typically, LAMP uses 4-6 primers and Bst polymerase with high strand displacement activity. LAMP products may be analyzed in real time using real-time fluorescence, real-time turbidimeter or endpoint analysis with gel electrophoresis, turbidity, fluorescent dyes, colorimetric, electrochemical methods or lateral flow assays. FIG. 53 shows a schematic diagram of an example of reaction steps 1100 indicating the basic principles of LAMP.

Methods are provided of designing *Chlamydia trachomatis* (CT)/*Neisseria gonorrhoeae* (NG) LAMP primers (or CT/NG LAMP primers). Namely, examples of strategies for designing CT/NG LAMP primers are as follows.

(1) LAMP primer sets were designed using primerExplorer V5 (Eiken Chemical Co.).
(2) *Chlamydia trachomatis* (CT) LAMP primer sets were designed targeting a specific sequence of the multicopy cryptic plasmid (GenBank J03321.1 pCHL1).
(3) *Neisseria gonorrhoeae* (NG) LAMP primer sets were designed for porA pseudogene (Genbank AJ223447.1 strain FA1090) and mtrA gene (Genbank AF133676.1, strain FA1090).
(4) For each microorganism, the designed LAMP primers include; Forward Inner Primer (FIP), Backward Inner Primer (BIP), Forward outer primer (F3), Backward outer primer (B3), Forward Loop primer (LF) and Backward Loop primer (LB).
(5) The generated LAMP primers were further analyzed for Tm, hairpins, G-quartet, deltaG, and self-dimer using Oligo Analyzer tool (IDT) with LAMP reaction condition.
(6) Self and cross primer dimers were assessed with Thermo Multiple Primer Analyzer.
(7) Finally, primers were evaluated with Real-Time LAMP and the best primer sets in terms of Time-To-Result (TTR)/delta (Positive TTR-Negative TTR) were selected for the final assay development.

Examples of LAMP primer sets for *Chlamydia trachomatis* (CT) are shown below with reference to Table 1 through Table 5.

TABLE 1

CT primer set 1
CT cryptic plasmid bases 560-771 (GenBank J03321.1 pCHL1).

| | |
|---|---|
| F3 | GGT TGC GTG TCC TGT GAC |
| FIP | ACC CCG CAC GTG CTT CGA CTG AGC ACC CTA GGC GT |
| LF | GCA ACC GCT GTG ACG GA |
| B3 | ACA TCG GTC AAC GAA GAG GT |
| BIP | AGT CCT GCT TGA GAG AAC GTG CTC TTC GTA ACT CGC TCC GG |
| LB | GGC GAT TTG CCT TAA CCC C |

TABLE 2

CT primer set 2
CT cryptic plasmid bases 560-787 (GenBank J03321.1 pCHL1).

| | |
|---|---|
| F3 | GGTTGCGTGTCCTGTGAC |
| FIP | GCTGCAATCCCTTTTAAAATAACCGTCGGAGTCTGAGCACCC |
| LF | CGCTGTGACGGAGTACAAAC |
| B3 | CACTTTCTACAAGAGTACATCGGT |
| BIP | GTAGTCCTGCTTGAGAGAACGTGCGAGGTTTTGTCTTCGTAACTCG |
| LB | CCTTAACCCCACCATTTTTCCG |

TABLE 3

CT primer set 3
CT cryptic plasmid bases 609-864 (GenBank J03321.1 pCHL1).

| | |
|---|---|
| F3 | CGTTTGTACTCCGTCACAGC |
| FIP | GGAAAAATGGTGGGGTTAAGGCAAATCGCACGTGCGGGGTTATTTTAAAAGG |
| LF | CGTTCTCTCAAGCAGGACTAC |
| B3 | CTACCATTTCTTTCTCCCAGCT |
| BIP | ACCTCTTCGTTGACCGATGTACTCTCCGTCAGACAGAAAAGAGGATT |
| LB | GAAAGTGCATAAACTTCTGAGGATAAG |

TABLE 4

CT primer set 4
CT cryptic plasmid bases 664-950 (GenBank
J03321.1 pCHL1).

| | |
|---|---|
| F3 | GGATTGCAGCTTGTAGTCCTGC |
| FIP | GCACTTTCTACAAGAGTACATCGGTCAACGGAACGTGCGGGCGATTTG |
| LF | TTGTCTTCGTAACTCGCTCC |
| B3 | GTTGATCGCCCAGACAATGC |
| BIP | GCTGGGAGAAAGAAATGGTAGCTTGTTGGGTAAACGCTCCTCTGAAGTC |
| LB | CAAATCTGACTAATCTCCAAGC |

TABLE 5

CT primer set 5
CT cryptic plasmid bases 1091-1308 (GenBank
J03321.1 pCHL1).

| | |
|---|---|
| F3 | TATTCCTTGAGTCATCC |
| FIP | GACCGAAGGTACTAAACAAGTTTGTTTAGGAATCTTGTTAAGG |
| LF | CGAGCAGCAAGCTATATT |
| B3 | GATCATATCGAGGATCTT |
| BIP | CGCATCTAGGATTAGATTAATTGGTCTATTGTCCTTGG |
| LB | AAACTCTTGCAGATTCATA |

Examples of LAMP primer sets for *Neisseria gonorrhoeae* (NG) are shown below with reference to Table 6 through Table 10.

TABLE 6

NG primer set 1
mtrA gene bases 77-294 (GenBank AF133676.1, strain
FA1090).

| | |
|---|---|
| F3 | GCG GTT ATC TCT GCA TCG |
| FIP | CGT GGC TCA ACA CAT GAC CCA AGC GTC CGG TCG GCA |
| LF | CGG GAA AAA TAC AAT ATC GCC C |
| B3 | GGT GTC GTA GCG GAA AC |
| BIP | ACG GAG AAA GTT TAC AAC CGG ACA CAA AAC AGG CTC ATA TCC AGC |
| LB | CGA CAA AAC GGC ACA TTT ATG G |

TABLE 7

NG primer set 2
porA pseudogene bases 610-863 (GenBank AJ223447.1
strain FA1090).

| | |
|---|---|
| F3 | CCATTGATCCTTGGGACAG |
| FIP | GGGAATCGTAACGCACGGAAATAATGTGGCTTCGCAATTG |
| LF | ATACCGTCGTGGCGTTTG |

TABLE 7-continued

NG primer set 2
porA pseudogene bases 610-863 (GenBank AJ223447.1
strain FA1090).

| | |
|---|---|
| B3 | CAGACCGGCATAATACACAT |
| BIP | AGCGGCAGCATTCAATTTGTTCCTGATTACTTTCCAGCGTGA |
| LB | CGCCTATACGCCTGCTAC |

TABLE 8

NG primer set 3
porA pseudogene bases 601-817 (GenBank AJ223447.1
strain FA1090).

| | |
|---|---|
| F3 | CCAGCAAAGCCATTGATCC |
| FIP | GGGAATCGTAACGCACGGAAACGGGACAGCAATAATAATGTGG |
| LF | ATACCGTCGTGGCGTTTG |
| B3 | GGAACTGGTTTCATCTGATTAC |
| BIP | GTTTCAGCGGCAGCATTCAATTTGTTCTCCAGCGTGAAAGTAGCAG |
| LB | GTCAAAACAGCAAGTCCGCC |

TABLE 9

NG primer set 4
porA pseudogene bases 581-821 (GenBank AJ223447.1
strain FA1090).

| | |
|---|---|
| F3 | GGATTGCAGCTTGTAGTCCTGC |
| NG02F3 | TGCGAATCCGTTTGGCGATG |
| NG02FIP | GCATACCGTCGTGGCGTTTGAAAAGCCATTGATCCTTGGGACA |
| NG02LF | ATTGCGAAGCCACATTATTATTG |
| NG02B3 | AGCCGGAACTGGTTTCATCT |
| NG02BIP | GGATTTTCCGGTTTCAGCGGCAGAAGTAGCAGGCGTATAGGCG |
| NG02LB | TTTGTTCCGAGTCAAAACAGC |

TABLE 10

Human β-actin gene (Internal control)

| | |
|---|---|
| B3 | AGG CCA GGA AGG AGG GAG |
| F3 | GGC ATC CTC ACC CTG AAG T |
| BIP | TGA CCG AGG CCC CCC TGA ACC ACC AGA AGA GGT AGC GG |
| FIP | TCC TCG GGA GCC ACA CGC AGC ATC GTC ACC AAC TGG GAC |
| LB | CGC GAG AAG ATG ACC CAG G |
| LF-DIG | /5DIGN/GGT GCC AGA TTT TCT CCA TGT C |

The standard LAMP reaction conditions—Multiplex LAMP reaction was carried out in total 50 μL of the master-mix containing 1× isothermal amplification buffer II (NEB), 6 mM magnesium sulfate, DNA template, 2.5 mM of each dNTP, 1.6 µM Forward Inner Primer (FIP), 1.6 µM Backward Inner Primer (BIP), 0.2 µM Forward outer primer (F3), 0.2 µM Backward outer primer (B3), 0.8 µM Forward Loop Primer (LF), 0.8 µM Backward Loop Primer (LB), 2 of 1:100 Syto 9 dye and 24 U of Bst 3.0 DNA Polymerase. LAMP reaction was incubated at 65° C. for 25-45 minutes.

On-chip LAMP reaction—Amplification reagents are present in dried and liquid format and stored separately in the microfluidic cartridge. The lyophilized dry pellet comprises the BST 3.0 enzyme, dNTPs and primers which is stored in the amplification well. While the isothermal amplification buffer (50 µL) is stored in a liquid format in the blister pouch on top of the amplification well. There is 50 µL of oil floats on top of the amplification buffer to help pushing it out through the narrow outlet of the blister pouch into the amplification well to rehydrate the lyophilized pellet. Following sample preparation, the DNA is eluted from the magnetic particles in the presence of amplification mix buffer pH 8.8, then LAMP reaction is started by raising the temperature to ~65° C. for 12-20 minutes. LAMP mix and assay conditions are the same as described above, except that a higher BST enzyme concentration is used in the lyophilized pellet to compensate enzyme loss during the freeze-drying and storage.

Hapten labeled primers—For multiplex endpoint NALF analysis, primers are labeled with haptens to produce dual labeled LAMP products. One hapten is used for capturing on the nitrocellulose membrane and the second hapten for binding of the reporter molecule. The LAMP primers are labeled with Biotin, fluorescein (FAM), digoxigenin (DIG), Texas Red (TEX), and Dinitrophenol (DNP). For detection of CT on the lateral flow strip, the following combinations of labeled primers were used; FIP-FAM/LF-biotin, FIP-FAM/LB-biotin, or LF-FAM/LB-biotin. For NG detection, the following combinations of labeled primers were used; FIP-TEX/LF-biotin, FIP-TEX/LB-biotin, or LF-TEX/LB-biotin. The internal control target (human β-actin gene) used the following combinations of labeled primers; FIP-DNP/LF-biotin, FIP-DNP/LB-biotin, or LF-DNP/LB-biotin for the detection on test line with anti-DNP.

Tailed primers—As an alternative to haptens labeled LAMP primers for (multiplex) endpoint NALF assay, tailed primers approach could be used. The tailed primer was designed by adding an additional oligonucleotide sequence at the 5' end of the active primer sequence and separated by polymerase stopper. The most common commercially available polymerase stoppers include C3 spacer, triethylene glycol spacer (spacer 9), or hexa-ethyleneglycol spacer (spacer 18). The tailed sequences were checked by BLAST to ensure that there is no sequence similarity with other common pathogens to avoid false positive results. The use of tailed primers offers high multiplexability and low cost compared to the use of the hapten/anti-hapten approach in NALF. Moreover, in the multiplex NALF assay, variations between hapten/anti-hapten affinity can give different test line intensity, whereas DNA-DNA binding affinity is normally high and gives consistent test lines intensity. Use of the tailed primer pair will generate an amplicon flanked by two single stranded DNA tails at each end of the amplicon. One of the tails can be used to hybridize to a complementary probe immobilized on the nitrocellulose membrane and the other tail to the gold nanoparticle labeled reporter probe. Alternatively, a single tail may be used combined with a biotin or hapten labeled oligo, where the biotin/hapten end binds to the streptavidin/anti-hapten labeled gold nanoparticle/colored particle reporter probe and the tail end hybridizes to a complementary probe immobiklized on the nitrocellulose membrane. The following combinations of tailed primers can be used; FIP/LF, FIP/LB, LF/LB for the capturing on test line and binding of reporter DNA probe. Multiple different tails with unique sequences could be designed for multiplex NALF analysis.

Nucleic Acid Lateral Flow assay (NALF)—Nucleic Acid Lateral Flow (NALF) offers an alternative, simple, inexpensive and point of care endpoint detection system for LAMP products. Lateral flow devices are inexpensive and equipment-free as visual readout with naked eye could be used for result analysis. The strip has two control lines and always should show a positive result independent from the presence or absence of LAMP amplicons. The first control is flow-check control of the strip, and the second control is an internal reaction control for LAMP reaction.

Hapten-antibody based NALF assay—Lateral flow assay strips were supplied by Abingdon Health (UK). The strip has anti-Goat antibody for flow control line, anti-DNP as internal reaction control line (β-Actin), anti-FITC test line for detection of CT and anti-TEX test line for detection of (NG) labeled LAMP products. The dual labeled LAMP amplicons are captured by the antibodies immobilized at the test lines and visualized after binding of the neutravidin conjugated carbon nanoparticles or anti-biotin functionalized gold nanoparticles. Two different strips were tested; (a) strips with neutravidin conjugated carbon nanoparticles and (b) strips with gold nanoparticles (AuNPs) conjugated anti-biotin. 50 µL of LAMP amplified product applied onto the lateral flow strip loading well and the result for presence or absence of the targets DNA was observed after 2 minutes by the naked eye (qualitative) or lateral flow strip reader (qualitative).

Double-tailed primer based NALF assay—The lateral flow strips are prepared in-house with flow control line, internal reaction control line (β-Actin) and 2 test lines for detection of CT and NG gene targets. Biotinylated oligonucleotides DNA probes are conjugated to neutravidin and dispensed onto a nitrocellulose membrane as control and test lines. Flow control line probe is complementary to the AuNPs labeled DNA. Internal reaction control probe is complementary to the tailed LAMP amplicon for human β-actin. Test lines probes are complementary to the tailed LAMP amplicon for CT and NG target genes. To improve the stability and sensitivity of the lateral flow assay, covalent conjugation of DNA capture probes to a carrier protein or micro-beads may be investigated. Several conjugation chemistries may be employed including NHS/EDC chemistry, Succinimidyl-6-hydrazino-nicotinamide (S-HyNic)/4-formylbenzamide (4FB) chemistry, click Chemistry, maleimide-containing crosslinkers and any other relevant conjugation chemistries. AuNPs labeled DNA reporter probes are prepared using the well-known thiol-gold chemistry. Tailed primer NALF assay may be performed by introducing the amplified LAMP products onto the sample/conjugate pad containing AuNPs-DNA probes. The presence of the DNA targets can be visualized as colored lines on the test zone and can be read after 2-5 minutes either by the naked eye or using a lateral flow strip reader.

TABLE 11

Double-tailed CT primer set:

| | |
|---|---|
| FIP | GACCGAAGGTACTAAACAAGTTTGTTTAGGA ATCTTGTTAAGG |
| LF Tail | TCTCCGTGGAAGGATGATT /iSp18/ |

TABLE 11-continued

Double-tailed CT primer set:

| | |
|---|---|
| repor. | CGAGCAGCAAGCTATATT |
| LB Tail capt | GCAAGCTCGTTTAGCGTAA/iSp18/ AAACTCTTGCAGATTCATA |
| BIP | CGCATCTAGGATTAGATTAATTGGTCTATTGTCCTTGG |
| F3 | TATTCCTTGAGTCATCC |
| B3 | GATCATATCGAGGATCTT |

Detection probes:
Biotin-capture probe AGT CAC TTC ACA CCT CGG AAT TTT TT-Biotin Thiol-reporter probe AAT CAT CCT TCC ACG GAG A TTTTTT -Thiol

TABLE 12

Double-tailed NG primer set:

| | |
|---|---|
| FIP | CGT GGC TCA ACA CAT GAC CCA AGC GTC CGG TCG GCA |
| BIP | ACG GAG AAA GTT TAC AAC CGG ACA CAA AAC AGG CTC ATA TCC AGC |
| LF Tail repor | TCA CAC GTC GAG GCT CTA CA/iSp18/ CGG GAA AAA TAC AAT ATC GCC C |
| LB Tail capt | TAG CTC CTC CGT ATT GAT GC/iSp18/ CGA CAA AAC GGC ACA TTT ATG G |
| F3 | GCG GTT ATC TCT GCA TCG |
| B3 | GGT GTC GTA GCG GAA AC |

Detection probes:
Biotin-capture probe GCA TCA ATA CGG AGG AGC TA TTTTTT-Biotin

Thiol-reporter probe TGT AGA GCC TCG ACG TGT GA TTTTTT - Thiol

TABLE 13

Double-tailed Act primer set:

| | |
|---|---|
| FIP | TCC TCG GGA GCC ACA CGC AGC ATC GTC ACC AAC TGG GAC |
| BIP | TGA CCG AGG CCC CCT GAC CAC CAG AGA GGT AGC GG |
| LF Tail repor | TTC CGA GGT GTG AAG TGA CT /iSp18/ GGT GCC AGA TTT TCT CCA TGT C |
| LB Tail capt | CAAGAGACTTCATTGGTGCC /iSp18/ CGC GAG AAG ATG ACC CAG G |
| F3 | GGC ATC CTC ACC CTG AAG T |
| B3 | AGG CCA GGA AGG AGG GAG |

Detection probes:
Biotin-capture probe GGC ACC AAT GAA GTC TCT TG TTTTTT Biotin

Thiol-reporter probe AGT CAC TTC ACA CCT CGG AA TTTTTT-Thiol

Hapten/tailed primer based NALF assay—The lateral flow strips are fabricated and prepared in-house as for the tailed primers approach. In this assay, LAMP is performed with one tailed primer and one hapten (biotin) labeled primer. Two different NALF assays are used. In the case of using LAMP primer FIP tail/LF-biotin or LF biotin/LB tail, the amplicon captured with the neutravidin-DNA probe and visualized with the binding of the neutravidin functionalized gold nanoparticles. LAMP amplicon with FAM/LF tail is detected on the lateral flow assay by capturing FAM labeled LAMP with anti-FAM immobilized on nitrocellulose membrane and hybridization of the reporter AuNPs-DNA.

Primer Sets for Hapten/Tailed-Primer Approach

TABLE 14

CT primer set:

| | |
|---|---|
| FIP | GACCGAAGGTACTAAACAAGTTTGTTTAGGAATCTTGTTAAGG |
| BIP | CGCATCTAGGATTAGATTAATTGGTCTATTGTCCTTGG |
| LF Biot | Biotin-CGAGCAGCAAGCTATATT |
| LB Tail. | TTC CGA GGT GTG AAG TGA CT/iSp18/ AAA CTC TTG CAG ATT CAT A |
| F3 | TATTCCTTGAGTCATCC |
| B3 | GATCATATCGAGGATCTT |

Capture probe:
Biotin-capture probe AGT CAC TTC ACA CCT CGG AAT TTT TT-Biotin

TABLE 15

NG primer set:

| | |
|---|---|
| FIP | CGT GGC TCA ACA CAT GAC CCA AGC GTC CGG TCG GCA |
| BIP | ACG GAG AAA GTT TAC AAC CGG ACA CAA AAC AGG CTC ATA TCC AGC |
| LF-Tail | TCACACGTCGAGGCTCTACA/iSp18/ CGGGAAAATACAATATCGCCC |
| LB-Biot | Biotin-CGA CAA AAC GGC ACA TTT ATG G |
| F3 | GCG GTT ATC TCT GCA TCG |
| B3 | GGT GTC GTA GCG GAA AC |

Capture probe:
Biotin capture probe: TGTAGAGCCTCGACGTGTGATTTTT T-Biotin

TABLE 16

Act primer set:

| | |
|---|---|
| FIP | CGT GGC TCA ACA CAT GAC CCA AGC GTC CGG TCG GCA |
| BIP | TGA CCG AGG CCC CCT GAC CAC CAG AGA GGT AGC GG |
| FIP | TCC TCG GGA GCC ACA CGC AGC ATC GTC ACC AAC TGG GAC |
| LF-Biot | Biotin-GGT GCC AGA TTT TCT CCA TGT C |

TABLE 16-continued

Act primer set:

| | |
|---|---|
| LB-Tail | CAAGAGACTTCATTGGTGCC/iSp18/<br>CGCGAGAAGATGACCCAG |
| F3 | GGC ATC CTC ACC CTG AAG T |
| B3 | AGG CCA GGA AGG AGG GAG |

Capture probe:
Biotin capture probe: GGC ACC AAT GAA GTC TCT TG TTTTTT- Biotin

Lateral flow signal enhancement using Lanthanides label—Lanthanide chelate nanoparticles have emerged recently as an alternative reporter to the gold nanoparticles in the lateral flow assays. Silica or polystyrene nanoparticles containing thousands of fluorescent lanthanides chelates have been used as a signal reporter in lateral flow assays with 50-1100 fold signal enhancement over the conventional colloidal gold nanoparticles. Europium (Eu III) is the most commonly used lanthanide, which is available commercially in different particle sizes and functionalization such as carboxylic acid groups and streptavidin. Binding of the Eu (III) chelates nanoparticles on the lateral flow test lines can be visualized with low cost LED light (wavelength 330-365 nm). For our NALF assay, in the case of double-tailed primer approach, reporter probe complementary to one tailed primer can be covalently labeled with carboxyl functionalized Eu (III) chelates nanoparticles. For the hapten/tailed primer approach, streptavidin conjugated Eu (III) particles will be used to visualize the presence of the target DNA. In-house LED signal reader with camera will be integrated on our device for automated signal intensity measurement (qualitatively and/or semi-quantitatively). The lateral flow strips are prepared with 3 control lines and 2 test lines. Control lines are; 1) Reader control line, 2) flow control line, 3) and internal control line (β-Actin). Test lines are for detection of 1) CT and 2) NG target genes. The reader control line contains a known quantity of Eu III particles, used as control for the reader to detect the position of NALF lines. The flow control line; is striped with an anti-biotin antibody designed to capture the streptavidin fluorescent conjugate. The internal reaction control; currently is a neutravidin bound biotinylated oligo that is complementary to capture β-actin amplicon. The NG line; neutravidin bound biotinylated oligo that is complementary to capture NG amplicon. The CT line; neutravidin bound biotinylated oligo that is complementary to capture CT amplicon.

Example Supporting Data

The sequences of the target genes for *C. trachomatis, N. gonorrhoeae* and human β-actin (internal positive control) were obtained from GenBank. LAMP primers were designed using Primer Explorer version 5 online software (http://primerexplorer.jp/e/). The primers were synthesized by Integrated DNA Technologies (IA, USA). The designed LAMP primers include; Forward Inner Primer (FIP), Backward Inner Primer (BIP), Forward outer primer (F3), Backward outer primer (B3), Forward Loop primer (LF) and Backward Loop primer (LB). The designed LAMP primers were further analyzed for Tm, hairpins, G-quartet, delta G, and self-dimer using Oligo Analyzer tool (IDT) with LAMP reaction conditions. Self and cross primer dimers were assessed with Thermo Multiple Primer Analyzer. Finally, primers were evaluated with Real-Time LAMP and the best primer sets in terms of Time-To-Result (TTR)/delta (Positive TTR-Negative TTR) were selected for the final assay development.

Real-Time LAMP reaction was carried out using the open qPCR thermocycler (Chai Bio, Santa Clara, CA) in 0.2 ml microcentrifuge tubes in a total of 50 μL of the master-mix containing 1× isothermal amplification buffer II (NEB), 6 mM magnesium sulfate, DNA template, 2 mM of each dNTP, 1.6 μM FIP/BIP, 0.2 μM F3/B3, 0.8 μM LF/LB, 2 μL of 1:100 diluted Syto 9 dye and 24 U of Bst 3.0 DNA Polymerase. LAMP reaction was incubated at 65° C. for 20 minutes.

The developed LAMP assay was implemented on the Novel Dx microfluidic cartridge and the sample-to-answer assay performance was demonstrated using on-chip lateral flow read-out of the amplified products. Furthermore, on-chip experiments for CT and NG cells spiked in buffer, urine and swab matrix were carried out and we demonstrated that developed automated sample-to-answer Novel Dx device can detect the presence of CT/NG in less than 30 min. This is comprised of a 3-minute sample preparation step performed with magnetic beads followed by a 20-minute LAMP amplification step and a 3 minute automated detection and display step of the lateral flow test results.

Analytical Sensitivity Evaluation of the LAMP Assay Using Real-Time LAMP:

FIG. 54 shows a plot 1200 and a plot 1205 of real-time LAMP amplification curves of various amounts of initial DNA template of *C. trachomatis* and *N. gonorrhoeae*, respectively. The analytical sensitivity of the Real-Time LAMP assay was evaluated using a dilution series of *C. trachomatis* DNA (ATCC® VR-901BD™ and *N. gonorrhoeae* DNA (ATCC FA 1090). Ten-fold serial dilutions were made from the DNA and 5 ul from each dilution was used in LAMP reaction. As amplification curves show in FIG. 1 our LAMP assay is able to detect 5 DNA copies/test for *C. trachomatis* and 25 DNA copies/test for *N. gonorrhoeae*.

Analytical Specificity Evaluation:

To evaluate the specificity of our developed LAMP assay, we used a panel of genomic DNA of 32 microorganisms comprising CT/NG strains as well as non-CT/NG organisms that are commonly found in urogenital samples. The organisms tested and results are listed in Table 1, demonstrating that our LAMP-NALF assay has 100% sensitivity and 100% specificity and able to detect all CT serovar and NG strains, while no cross reactivity was seen for the other common urogenital microorganisms (Table 17 shown in FIG. 55). Table 17 shows the analytical specificity of the Novel Dx CT/NG LAMP Assay showing organisms tested and test line results for CT and NG.

Evaluation of Lyophilized LAMP Reagents

Bst polymerase and dNTPs are the most sensitive LAMP reagents to temperature. In order to develop a point of care molecular test that can be used in low- and middle-income countries. Furthermore, lyophilization of LAMP reagents offer additional advantages. Our LAMP reagents were lyophilized by BIOLYPH LLC (Chaska, MN) and stored inside the zipped aluminum foil bags at 22° C., and 37° C., to study real time and accelerated shelf-life stability. The lyophilized reagents were reconstituted with amplification buffer and primers and evaluated by Real-Time LAMP in the presence of 500 copies of genomic DNA for 12 weeks (accelerated) and 20 weeks (real time). LAMP results (see plot 1400 of FIG. 56) indicate that the lyophilized LAMP reagents are stable during our study time period for both storage conditions and comparable to fresh master mix without losing reactivity.

Nucleic Acid Lateral Flow Assay Development

Figure 58:
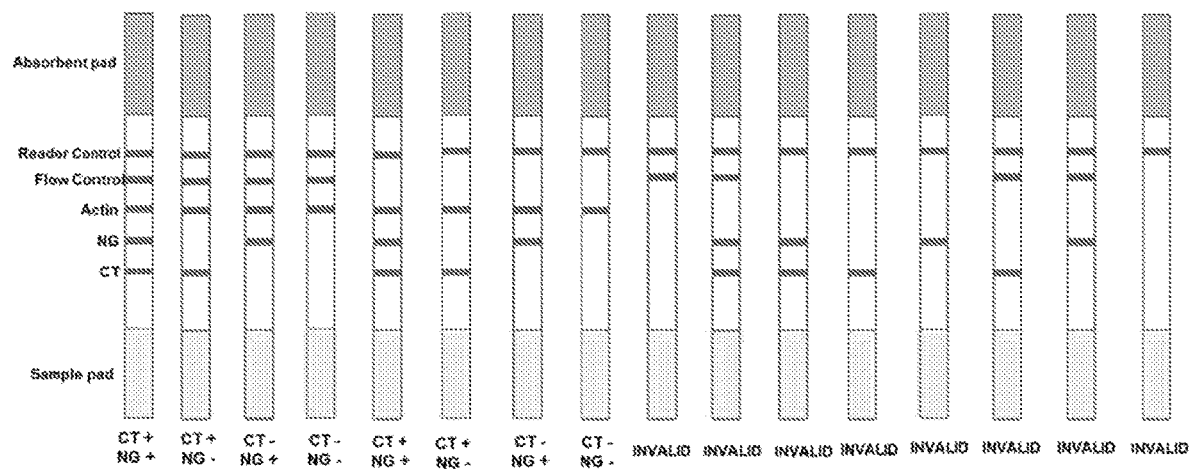

Our preliminary tests for NALF detection of multiplex LAMP products showed a discrepancy in the test lines intensity which could be associated with the variation in the binding affinity of different anti-hapten antibodies. As an alternative, we developed a DNA based NALF assay using biotinylated oligonucleotides DNA probes as test lines. Initially, we used gold nanoparticles as test line signal reporter, and then switched to a fluorescence-based reporter particles which can be visualized with a low-cost UV LED light (365 nm) and has demonstrated promising results. The developed lateral flow assay was first tested and optimized with synthetic short DNA and finally with LAMP products (see FIG. 57). FIG. 58 shows the interpretation chart for the lateral flow strip result. The current LF strip includes 5 lines with two test lines for CT/NG and 3 control lines including an internal control for human DNA, a lateral flow strip flow control line and a reader control line. An invalid test result is obtained if the human DNA Actin control line is absent.

Referring now to Table 18 shown in FIG. 59, the clinical performance of the Novel Dx CT/NG Test using de-identified frozen/archival clinical samples that have been provided to us by the JHU Center for POC Tests for STDs is shown. For CT positive samples we have demonstrated 100% sensitivity & 100% specificity for the detection of CT with the comparator gold standard Aptima Combo 2 assay for CT/NG for both urine and vaginal swab samples (left). We are awaiting positive NG clinical samples to demonstrate the sensitivity and specificity of our CT/NG assay for the detection of NG.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "include," "includes," and "including" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A microfluidic cartridge comprising a primary channel oriented in the XZ plane, a plurality of wells interconnected by said primary channel to form a fluidic circuit, an immiscible reagent container in plane with and fluidly connected to the primary channel and comprising an immiscible reagent, wherein said immiscible reagent container is positioned at a height along a Z axis sufficient to generate a pressure head that drives said immiscible reagent into the microfluidic cartridge from said immiscible reagent container, wherein said microfluidic cartridge is configured to receive magnetic particles and wherein said primary channel is configured such that the magnetic particles are capable of being transferred through said primary channel and resuspended sequentially in said plurality of wells at various stages of operation.

2. The microfluidic cartridge of claim 1 wherein the height of the immiscible reagent container and the pressure head does not increase the dimensions of the cartridge in a Y axis.

3. The microfluidic cartridge of claim 1 wherein a bubble free immiscible reagent phase is generated within said primary channel that overlays said plurality of wells.

4. The microfluidic cartridge of claim 1 configured for interaction with one or more actuator plates oriented in the XZ plane.

5. The microfluidic cartridge of claim 4 wherein the one or more actuator plates comprise a plurality of magnets oriented spatially on said one or more actuator plates and configured to transfer said magnetic particles through said immiscible reagent phase in said primary channel and sequentially suspend said magnetic parties in a reagent contained within said plurality of wells at various stages of operation.

6. The microfluidic cartridge of claim 5 wherein the primary channel comprises one or more baffles that produce a physical barrier to temporarily trap the magnetic particles in one of said plurality of wells and prevent them from moving with a magnetic field.

7. The microfluidic cartridge of claim 6 wherein the one or more baffles comprise protrusions extending into an interior space of the primary channel that temporarily restrict further movement of the magnetic particles with said magnetic field.

8. The microfluidic cartridge of claim 5 wherein said plurality of magnets comprise at least one reagent capture/resuspension magnet are configured to pull the magnetic beads particles down into a first well of said plurality of wells such that said magnetic particles they are suspended in said reagent in said first well.

9. The microfluidic cartridge of claim 5, wherein the plurality of magnets comprise at least one transfer magnet configured to transfer the magnetic particles through the primary channel from a first well to a second well within said plurality of wells, and wherein the physical barrier constrain the magnetic particles when the transfer magnets move from said first well to said second well.

10. The microfluidic cartridge of claim 4 comprising a single actuator plate.

11. The microfluidic cartridge of claim 1 configured to perform a sample-to-answer nucleic acid amplification test (NAAT).

12. The microfluidic cartridge of claim 1 further comprising a lysis/bind well, at least one wash well, and an amplification well configured such that on-chip magnetic particle-based sample processing is performed using a single rotational motion of the one or more actuator plates during which capture, resuspension and transfer of magnetic beads particles takes place.

13. The microfluidic cartridge of claim 1 configured for insertion into a portable instrument.

14. The portable instrument microfluidic cartridge of claim 13, wherein said microfluidic cartridge further comprises one or more reagent pouches and wherein said portable instrument comprises a lever arm configured to open and close the instrument as well as move a crush plate forward and backward so as to crush said one or more reagent pouches when the instrument is closed.

15. The microfluidic cartridge of claim 13, wherein said portable instrument further comprises a hinged door comprising protrusions such that when the door is closed, the protrusions come in contact with one or more reagent pouches on the microfluidic cartridge.

16. The microfluidic cartridge of claim 15, wherein said portable instrument is configured such that after the microfluidic cartridge is inserted into the instrument and the instrument is closed, one or more actuator plates comprising spatially oriented magnets and/or mechanical elements rotates and interacts with said microfluidic cartridge.

17. The microfluidic cartridge of claim 1 further comprising a wick valve comprising a wick and a fluidic channel within which said wick is positioned wherein said wick absorbs a transfer liquid as said transfer liquid flows through said fluidic channel and wherein said wick valve is configured to dispense/transfer liquid in the microfluidic cartridge with zero dead volume/loss of the dispensed/transferred liquid.

18. The microfluidic cartridge of claim 1, wherein said immiscible reagent is oil.

19. The microfluidic cartridge of claim 1 further comprising a plurality of reagent pouches in fluidic connection with said primary channel and/or said plurality of wells configured to receive one or more reagents.

20. The microfluidic cartridge of claim 19 wherein at least one of said plurality of reagent pouches is a flow through reagent pouch.

* * * * *